United States Patent [19]
Mazaki

[11] Patent Number: 6,003,967
[45] Date of Patent: *Dec. 21, 1999

[54] IMAGE FORMING APPARATUS

[75] Inventor: Takeshi Mazaki, Chigasaki, Japan

[73] Assignee: Ricoh Company Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/407,131

[22] Filed: Mar. 16, 1995

[30]     Foreign Application Priority Data

Mar. 18, 1994 [JP] Japan .................................. 6-072854

[51] Int. Cl.$^6$ .................................................. B41J 29/393
[52] U.S. Cl. .............................................. 347/19; 347/14
[58] Field of Search ................................. 347/19, 23, 14, 347/15, 43; 358/504, 406, 404, 524

[56]     References Cited

U.S. PATENT DOCUMENTS

| | | | |
|---|---|---|---|
| 4,977,413 | 12/1990 | Yamanaka et al. | 346/140 R |
| 5,128,691 | 7/1992 | Millet et al. | 346/1.1 |
| 5,132,711 | 7/1992 | Shinada et al. | 346/140 R |
| 5,175,566 | 12/1992 | Ejiri et al. | 346/140 R |
| 5,177,620 | 1/1993 | Fukushima | 358/404 |
| 5,345,315 | 9/1994 | Shalit | 358/406 |
| 5,502,468 | 3/1996 | Knierim | 347/19 |
| 5,519,418 | 5/1996 | Nishikawa et al. | 347/19 |
| 5,519,419 | 5/1996 | Stephany et al. | 347/19 |
| 5,528,270 | 6/1996 | Tajika et al. | 347/19 |
| 5,581,367 | 12/1996 | Oogiri et al. | 358/404 |

FOREIGN PATENT DOCUMENTS

| | | |
|---|---|---|
| 0348234 | 12/1989 | European Pat. Off. . |
| 0500281 | 8/1992 | European Pat. Off. . |
| 4313605 | 10/1996 | Germany . |
| 2-221814 | of 1990 | Japan . |
| 5-220973 | of 1993 | Japan . |
| 5220973 | 8/1993 | Japan . |

OTHER PUBLICATIONS

Patents Abstracts of Japan, M–1523 Dec. 8, 1993 vol. 17/No. 664.

Primary Examiner—Safet Metjahic
Assistant Examiner—John Chizmar
Attorney, Agent, or Firm—Cooper & Dunham LLP

[57]     ABSTRACT

A density measuring unit is provided for measuring a density of a printing substance such as ink or toner fixed on a paper sheet and producing a value of the printing substance's density. Further, a determining unit is provided for determining whether or not the value of said printing substance's density obtained from the density measuring unit is lower than a predetermined value. The density of the printing substance measured by the density measuring unit is either a density of the printing substance representing a predetermined mark which has been printed in addition to printing out received image information or a density of said printing substance representing said received image information. A blockage removal unit is provided for performing a blockage removal operation for removing any blockage which prevents a printing unit from normally printing out the received image information. The blockage removal unit performs the blockage removal operation if the determining unit has determined that the value of the printing substance's density obtained from the density measuring unit is lower than the predetermined value immediately after the printing substance is supplied to the printing unit.

21 Claims, 50 Drawing Sheets

FIG. 4
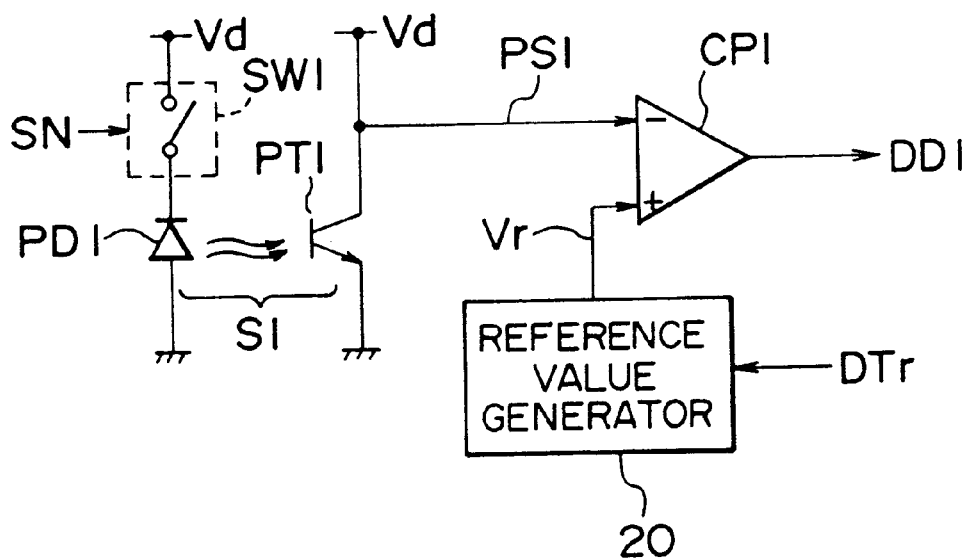
FIG. 5A   IMAGE DENSITY
FIG. 5B   PSI
FIG. 5C   DDI
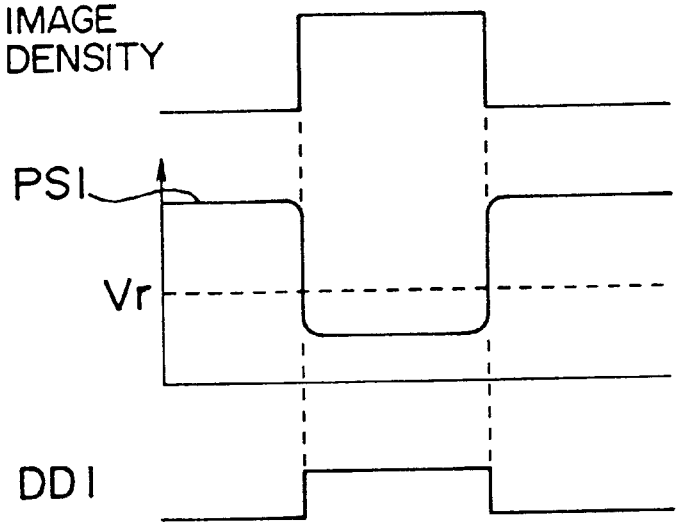

F I G. 15
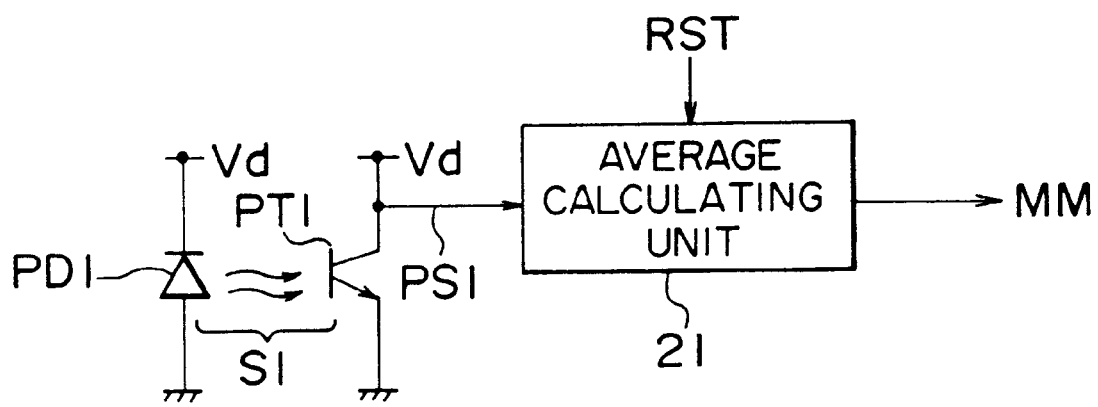

F I G. 29
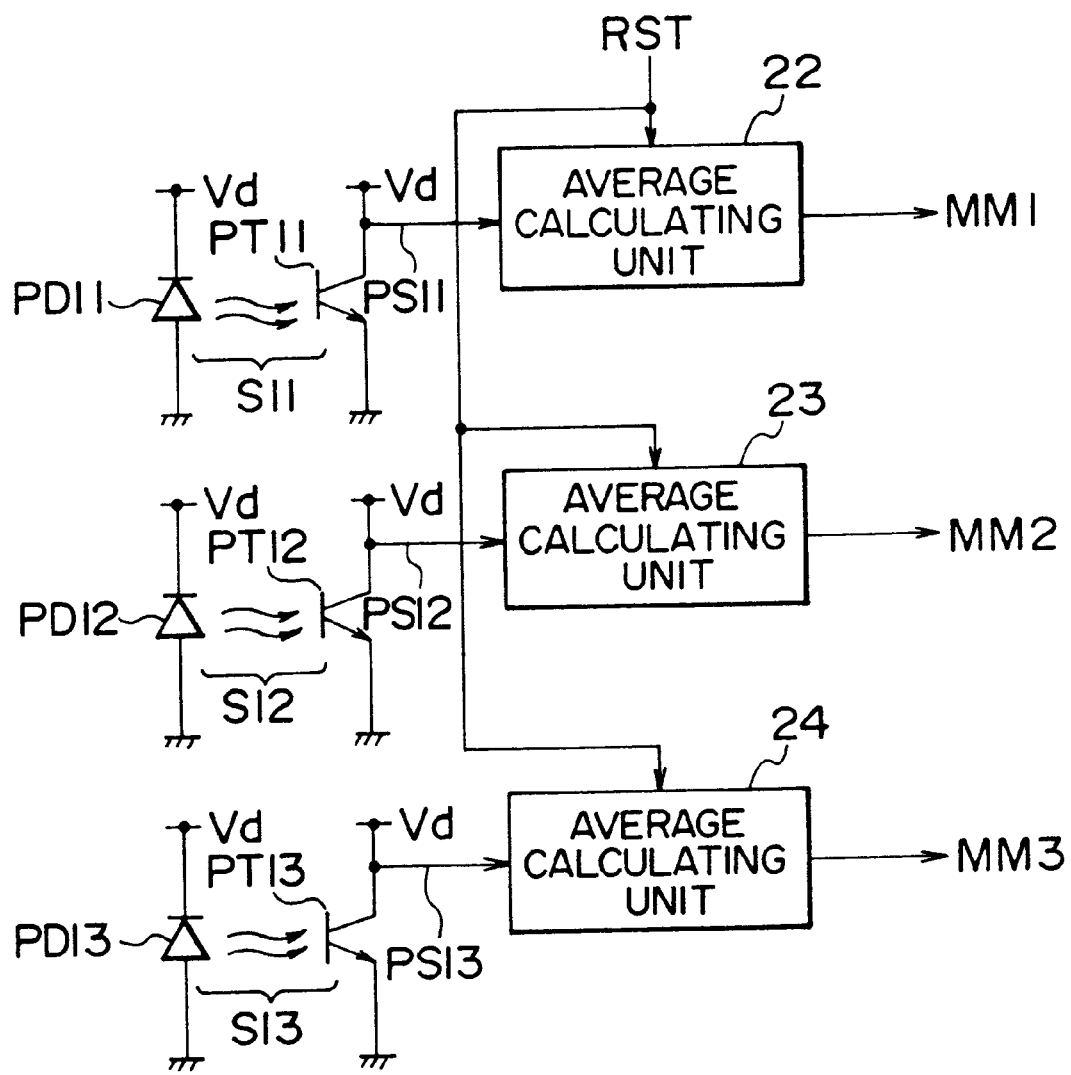

IMAGE FORMING APPARATUS

BACKGROUND OF THE INVENTION

1. Field of the Invention

The present invention relates to an image forming apparatus which receives image data and prints it out with printing substance such as ink. One example of such an image forming apparatus is an ink-jet printer in which each ink nozzle of a group of ink nozzles provided in a print head jets ink drops on a paper sheet and thus prints an image. Another example of the image forming apparatus is a facsimile apparatus using such an ink-jet printer. The facsimile apparatus receives an image signal and then once stores image data carried by the image signal in image data storing means. After the image signal reception has been terminated, the image data thus-stored in the image data storing means is used to print out relevant images.

2. Description of the Related Art

Such a facsimile apparatus using the ink-jet printer is advantageous in view of quietness in operation thereof, a overall size thereof and a cost thereof. Further, an image printed out from the facsimile apparatus on a paper sheet is well preserved in comparison to a facsimile apparatus using a thermal printer. Further, the facsimile apparatus using the ink-jet printer can provide a relatively high resolution, high quality printed image.

The ink-jet printer needs feeding ink appropriately. A problem in the ink-jet printer is a matter as to when the ink-jet printer needs feeding ink. One method of detecting a time the ink-jet printer needs feeding ink is to measure a weight of a ink tank and thus to measure how much ink remains in the tank. According to the method, when the thus-measured weight of the ink tank is lighter than a predetermined value, it is determined that it is a time the ink-jet printer needs feeding ink.

In another method, a number of black pixels which the printer has processed so as to print out images using the black pixels is counted. According to the method, when the thus-counted number exceeds a predetermined value, it is determined that it is a time the ink-jet printer needs feeding ink.

These methods have problems described below. In the former method measuring the ink tank weight, it is necessary that a high accuracy measuring instrument is used in order to obtain an accurate time the ink-jet printer needs feeding ink. However, such a size of a high accuracy measuring instrument is large and thus the facsimile apparatus becomes larger. Therefore, ordinarily, a weight measuring instrument not having a high accuracy is used there. As a result, an accurate time the ink-jet printer needs feeding ink cannot be obtained and thus it may be determined that it is a time the ink-jet printer needs feeding ink even when a substantially large amount of ink remains in the ink tank. If the determination is made that it is a time the ink-jet printer needs feeding ink, ordinarily, the ink tank present in the facsimile apparatus is replaced by a new ink tank. Due to such a not accurate determination of a time the ink-jet printer needs feeding ink, ink tank replacement operations are performed more frequently than are actually needed. Thus, running costs of the facsimile apparatus become higher.

In the latter method counting the number of black pixels, relationship between the thus-counted number of black pixels and an actual ink consumption may vary depending on environmental factors such as ambient temperature and/or humidity. Therefore, it is difficult to obtain an accurate ink consumption from the counted number of black pixels. Thus, it is difficult to obtain an accurate time the ink-jet printer needs feeding ink.

SUMMARY OF THE INVENTION

An object of the present invention is to provide an image forming apparatus such as a facsimile apparatus which prints out images on paper sheets and which can accurately determine a time the apparatus needs feeding ink.

In order to achieve the object of the present invention, density measuring means is provided for measuring a density of printing substance such as ink or toner fixed on a paper sheet, and then producing a value of the printing substance's density. Further, determining means is provided for determining whether or not the value of said printing substance's density obtained from said density measuring means is lower than a predetermined value.

The density of the printing substance measured by the density measuring means is either a density of the printing substance representing a predetermined mark which has been printed in addition to printing out received image information or a density of said printing substance representing said received image information.

Thus, a remaining amount of the printing substance can be appropriately determined and thus a time at which the printing substance should be supplied can be appropriately determined.

Another problem in use of the ink-jet printer in an image forming apparatus such as a facsimile apparatus is that some ink nozzles of the group of ink nozzles of the print head are blocked by solidified ink. Due to the print head blocking, density of a printed image is disadvantageously low and/or no substantial image printing operation can be performed. If such a problem occurs, ordinarily, an operator manually performs an operation of removing the solidified ink which has blocked the ink nozzles of the print head. Thus, troublesome operations are needed. Another object of the present invention is to provide an image forming apparatus such as a facsimile apparatus in which the above-mentioned troublesome operations are not needed.

In order to achieve this object of the present invention, blockage removal means is provided for performing a blockage removal operation for removing any blockage which prevent printing means from normally printing out the received image information. The blockage removal means performs the blockage removal operation if the determining means has determined that the value of the printing substance's density measured by and then obtained from the density measuring means is lower than the predetermined value immediately after the printing substance being supplied to the printing means. The control means alarms if the determining means has determined that the value of the printing substance's density measured by and then obtained from the density measuring means is lower than the predetermined value after the printing means has performed printing operations at least twice after the printing substance was supplied.

Thus, the printing means blockage can be effectively detected and then the blockage removal operation is automatically performed. Therefore, the operator can be free from maintenance works and the apparatus can be efficiently used.

Further, in a facsimile apparatus which has a function of once storing received image data in the image data storing means so that a time required for the image data reception can be reduced, a problem described below may occur. That is, if a large amount of image data is received continuously such that the amount of the image data exceeds a capacity of the image data storing means, a printing operation is started using the thus-stored image data when the image data storing means has become full. Part of the thus-stored image data, which part has been used to print out relevant images, is deleted from the image data storing means. The subsequently received image data is then stored in a free area of the image data storing means, which area has been obtained as a result of deleting the part of the stored image data having been used in the printing operation. Thus, the large amount of image data can be continuously received. However, if an ink shortage occurs in the facsimile apparatus receiving the large amount of image data when the apparatus continuously receives the image data and in parallel performs the printing operation for the purpose of obtaining a free area in the image data storing means, it is a problematic state. This is because the printing operation cannot provide substantial printed images due to the ink shortage while the stored image data is deleted for the purpose of obtaining a free area in the image data storing means, the free area being then used for storing subsequently received image data. As a result, the thus-deleted image data cannot be substantially used to print out relevant printed images. However, the image data reception is continued subsequently and as a result the image data reception is completed. Ordinarily, due to the image data reception completion, the facsimile apparatus then sends a message, indicating the safely data reception, to another facsimile apparatus which has been transmitting the image data to the former facsimile apparatus.

In such a case, although all of the received image data was not used in the printing operation because of the ink shortage, the facsimile apparatus which transmitted the image data determines that all of the thus-transmitted data was safely received by the facsimile apparatus which received the image data. Therefore, the facsimile apparatus which transmitted the image data does not perform an operation of re-transmitting of the same image data. As a result, the facsimile apparatus which received the image data cannot obtain all of relevant images.

Another object of the present invention is to provide a facsimile apparatus in which a problematic situation in which a transmitting apparatus recognizes safe receipt in a receiving apparatus although relevant images cannot be obtained in the receiving apparatus can be eliminated.

In order to achieve this object of the present invention, the printing means starts printing of the received image information when a free storage area in the image data storage is smaller than a predetermined area even if the received image information is still being received. Further receiving of the received image information is terminated if it has been determined that a value of the printing substance's density measured by and then obtained from the density measuring means is lower than a predetermined value.

Thus, the above-mentioned problematic situation can be eliminated.

Other objects and further features of the present invention will become more apparent from the following detailed description when read in conjunction with the accompanying drawings.

BRIEF DESCRIPTION OF THE DRAWINGS

FIG. 4 shows a circuit diagram of ink density measuring means in the facsimile apparatus in the first through third embodiment of the present invention;

FIGS. 5A, 5B and 5C illustrate operations of a circuit shown in FIG. 4;

FIG. 15 shows a circuit diagram of ink density measuring means in the facsimile apparatus in the fourth through sixth embodiment of the present invention;

FIG. 29 shows a circuit diagram of ink density measuring means in the facsimile apparatus in the seventh through ninth embodiment of the present invention;

DESCRIPTION OF PREFERRED EMBODIMENTS

Figure 1:
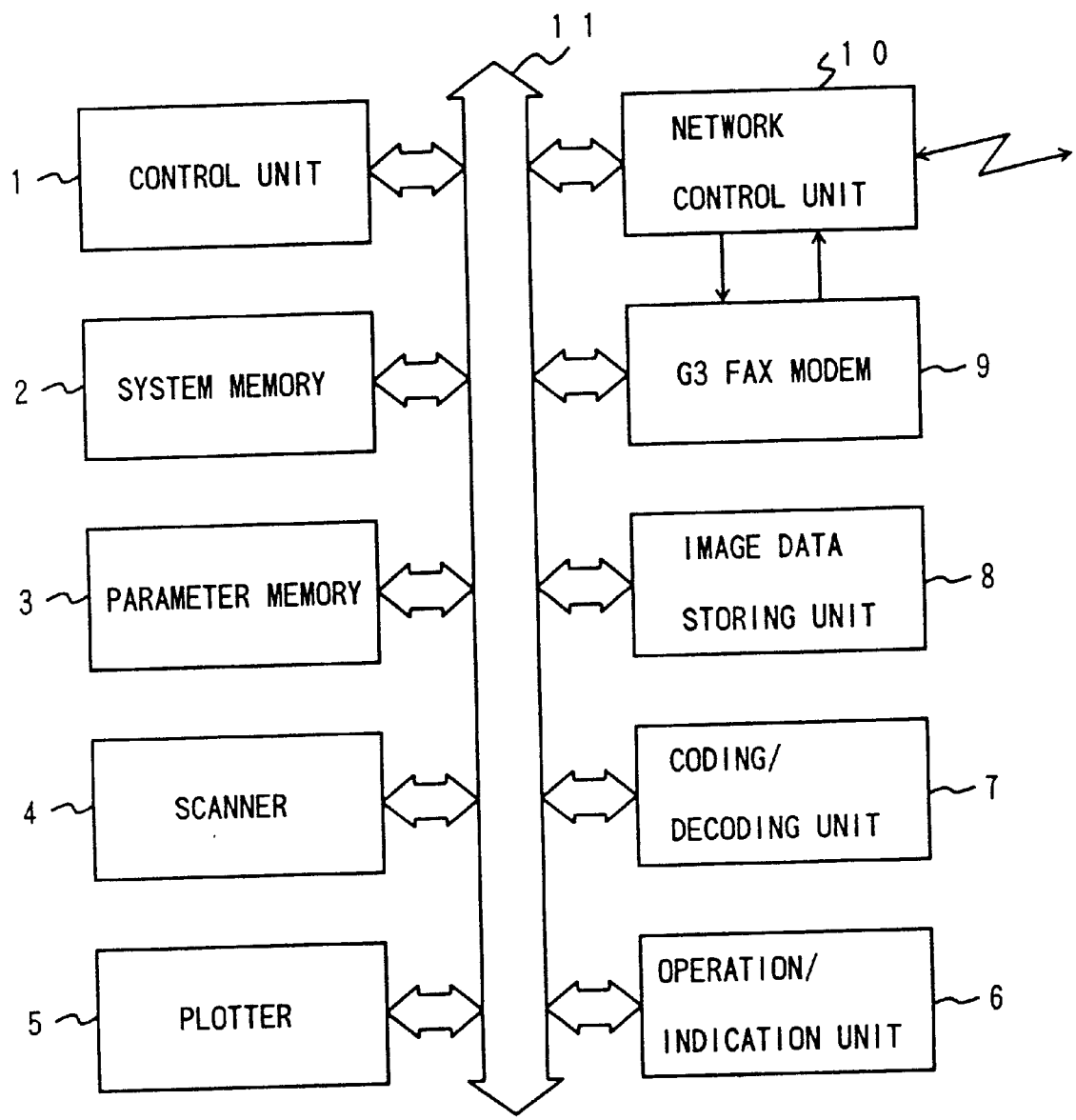
FIG. 1 shows a block diagram of group 3 facsimile apparatuses in first through ninth embodiments of the present invention.

With reference to FIG. 1, a group 3 facsimile apparatus in a first embodiment of the present invention will now be described.

As shown in FIG. 1, the facsimile apparatus includes a control unit 1 for controlling each unit in the apparatus and performing a facsimile transmission control procedure, the control unit 1 further having a clock function for obtaining current date and time. The facsimile apparatus further includes a system memory 2 for storing control processing programs which the control unit 1 executes, and also storing various sorts of data required in executing the control processing programs, the system memory 2 further having a function of providing a work area for the control unit 1. The facsimile apparatus further includes a parameter memory 3 for storing various sorts of information particular to a specific one of the facsimile apparatus.

The facsimile apparatus further includes a scanner 4 for reading in an original image in a predetermined resolution, and a plotter 5 for printing out an image in a predetermined resolution, the plotter 5 being an ink-jet printer. The facsimile apparatus further includes an operation and indication unit 6 for an operator to operate the facsimile apparatus, the operation and display unit 6 including various sorts of operation keys and various sorts of indicators.

The facsimile apparatus further includes a coding and decoding unit 7 for either compressing and thus coding an image signal or decoding image information, which was compressed and thus coded, into an original image signal. The facsimile apparatus further includes a image data storing unit 8 for storing much image information which was obtained as a result of compressing and thus coding image signals.

The facsimile apparatus further includes a group 3 facsimile modem 9 for realizing a group 3 facsimile modem function, the modem 9 being provided with a low speed modem function (V.21 modem) for communicating transmission procedure signals and high speed modem function (V.33 modem, V.29 modem, V.27ter modem or the like) for communicating mainly image information.

The facsimile apparatus further includes a network control unit 10 for connecting the facsimile apparatus to a public telephone network. The network control unit 10 is provided with automatic calling and call accepting functions.

These control unit 1, system memory 2, parameter memory 3, scanner 4, plotter 5, operation and indication unit 6, coding and decoding unit 7, image data storing unit 8, group 3 facsimile modem 9, and network control unit 10 are connected to a system bus 11. The system bus 11 is used for data communication between these units. However, data communication between the network control unit 10 and group 3 facsimile modem 9 is performed directly.

Figure 2:
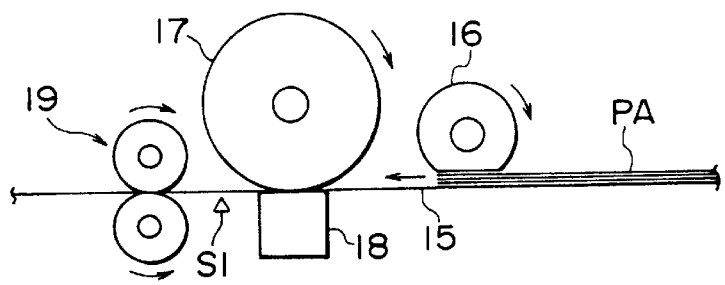
FIG. 2 illustrates a paper printing and transferring system in a plotter used in the facsimile apparatuses in first through sixth embodiments of the present invention.

With reference to FIG. 2, one example of a printing/transferring system included in the plotter 5 will now be described. The printing/transferring system includes a sheet table 15, a feeding roller 16, a platen roller 17, a print head 18, an ejecting roller pair 19, and a sensor S1 (ink mark density measuring means).

With reference to FIG. 2, a plurality of paper sheets PA placed on the sheet table 15 are, one sheet by one sheet from the top sheet, removed from the remaining sheets and then transferred leftward in FIG. 2 by the paper feeding roller 16. Thus, each paper sheet PA passes between the platen roller 17 and the print head 18, and thus a printing unit of the print head 18 prints an image on the thus-passing paper sheet PA one scan line by one scan line.

After the image printing has been completed, the paper sheet PA having the image printed thereon is ejected through the ejecting roller pair 19. The sensor S1 is provided between the position at which the platen roller 17 and the print head 18 are located and the position at which the ejecting roller pair 19 is located. Thus, the paper sheet PA having the image printed thereon moves above the sensor Si before being ejected through the ejecting roller pair 19. Thus, the sensor Si measures a density of an image thus-printed on the paper sheet PA.

The printing unit of the print head 18 includes a group of ink nozzles (40 through 60 pieces) provided in a row extending along a sub-scan direction defined in the plotter 5. The printing unit including the group of ink nozzles is reciprocated in a main scan direction defined in the plotter 5. While printing unit is being reciprocated, and ink drops are jetted from appropriate ones of the ink nozzles when the appropriate ones of the ink nozzles are located at positions at which black pixels are located on the paper sheet PA. Thus, the black pixels are appropriately printed at the positions on the paper sheet PA, and thus a relevant image is printed on the paper sheet PA. A number of pixel lines which the group of ink nozzles provided in the print head 18 can print out when the printing unit is once reciprocated will be referred to as a scan line, hereinafter.

Further, the print head 18 is provided with a blockage removal mechanism (not shown in the figure). The blockage removal mechanism removes blockages which have blocked ink nozzles of the group of ink nozzles and is provided outside the printing unit. The blockage removal mechanism is, for example a mechanism which absorbs or sucks and thus removes blockages such as solidified ink from the group of ink nozzles.

Figure 3:
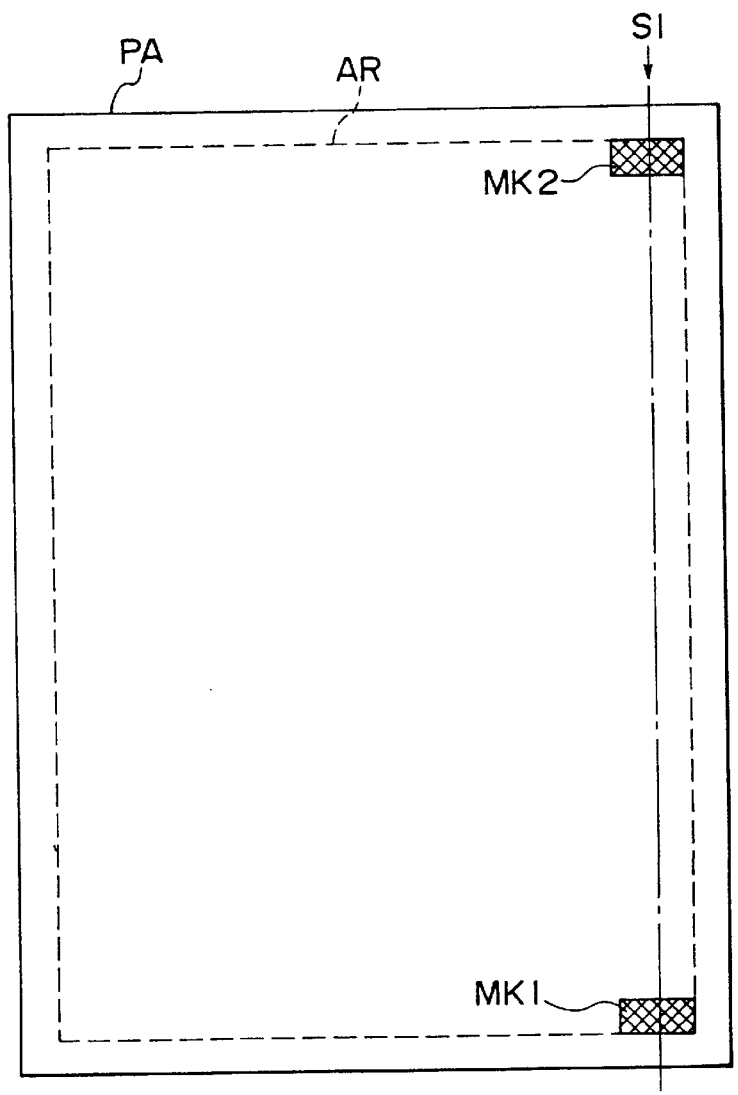
FIG. 3 shows positions of ink marks in a paper sheet printed by the facsimile apparatuses shown in FIG. 1.

Further, the facsimile apparatus in the first embodiment has a function of printing either an ink mark MK1 at the bottom right corner of a printable area AR of each paper sheet PA or an ink mark MK2 at the top right corner thereof, as shown in FIG. 3. A printing position of the ink mark is a position such that the sensor Si can receive light which was emitted thereby and then reflected by the ink mark located at the position. The sensor Si uses the thus-reflected light in measuring a density of the printed ink mark. The facsimile apparatus uses the thus-obtained density of the printed ink mark in determining whether or not the density of ink mark is higher than a predetermined value. If the facsimile apparatus has determined that the density of the ink mark is less than a predetermined value, the facsimile apparatus determines that ink shortage has occurred in the plotter 5.

The ink mark MK1 shown in FIG. 3 is printed in a scan line last printed on a paper sheet PA. The ink mark MK2 shown in the figure is printed in a scan line first printed on a paper sheet PA.

With reference to FIG. 4, one example of signal processing unit for processing a signal provided by the sensor S1 will now be described. Such a signal processing unit is included in a control system included in the plotter 5.

In FIG. 4, the sensor S1 is a reflection type photo-sensor including a light emitting diode PD1 and a photo-transistor PT1. The light emitting diode PD1 is either turned on or turned off through a switch SW1. The control unit 1 shown in FIG. 1 supplies a control signal SN which either turns on or turns off the switch SW1. An output signal supplied by the photo-transistor PT1 is a reflectance signal PS1 and is supplied to a minus input terminal of a comparator CP1 as shown in FIG. 4.

A reference value generator 20 supplies a reference signal Vr, a level of which signal depends on a control signal DTr supplied by the control unit 1. The reference signal Vr is supplied to a plus input terminal of the comparator CP1 as shown in FIG. 4.

The comparator CP1 supplies a detection signal DD1. A level of the detection signal DD1 is a logical H level when a signal level at the pulse input terminal of the comparator CP1 is higher than a signal level at the minus input terminal of the comparator CP1. The level of the detection signal DD1 is a logical L level when a signal level at the pulse input terminal of the comparator CP1 is equal or lower than a signal level at the minus input terminal of the comparator CP1.

While the paper sheet PA having an image printed thereon is moving above the sensor S1, the sensor S1 scans the paper sheet PA as shown in 3. Thus, the sensor S1 scans the ink mark MK 1 if the paper sheet PA has the ink mark MK 1 printed thereon. A density of the paper sheet varies as shown in FIG. 5A as a position moves along a line along which the sensor S1 scans, as shown in FIG. 3, a part of the paper sheet PA having the ink mark MK 1 printed thereon. As shown in FIG. 5A, the density of the paper sheet PA is high in a position in which the ink mark MK 1 is printed thereon, and the density thereon is low in front of this position and subsequent to this position.

While the sensor S1 is scanning this part of the paper sheet PA, a level of the reflectance signal PS1 output from the sensor S1 varies as shown in FIG. 5B. As the density of the paper sheet is low, an intensity of light reflected by the paper sheet is strong and thus the level of the reflectance signal PS1 is high. As the density of the paper sheet is high, an intensity of light reflected by the paper sheet is weak and thus the level of the reflectance signal PS1 is low.

The level of the reflectance signal PS1 is higher than the level of the reference signal Vr when the sensor S1 scans the paper sheet in front of and subsequent of the ink mark MK1 as shown in FIG. 5B. As a result, the detection signal DD1 supplied by the comparator CP1 is the logical L level as shown in FIG. 5C. The level of the reflectance signal PS1 is lower than the level of the reference signal Vr when the sensor S1 scans the ink mark MK1 as shown in FIG. 5B. As a result, the detection signal DD1 supplied by the comparator CP1 is the logical H level as shown in FIG. 5C. Thus, the level of the detection signal DD1 varies so that the level is the logical L level in front of the ink mark MK1, the level rises to be the logical H level at the front edge of the ink mark, the logical H level is maintained in the ink mark, and the level decays to the logical L level at the rear edge of the ink mark.

The plotter 5 has an ink tank (not shown in the figure) therein, ink is contained in the ink tank and is used in jetting through the print head 18. If an amount of ink remaining in the ink tank is little and thus the print head 18 cannot jet sufficient amount of ink, the density of the ink mark MK1 printed on the paper sheet PA is low. As a result, the level of the reflectance signal PS1 is not low enough to be less than the level of the reference signal Vr1 when the sensor S1 scans the ink mark MK1. As a result, the level of the detection signal DD1 does not rise to the logical H when the sensor S1 scans the front edge of the ink mark MK1.

The facsimile apparatus in the first embodiment of the present invention determines that a density of the printed ink mark MK1 is not a sufficient density if the detection signal DD1 has not risen to the logical H level although the sensor S1 has scanned the ink mark MK1. Thus, the facsimile apparatus determines occurrence of ink shortage in the plotter 5. Similarly, if the ink mark MK2 shown in FIG. 3 is printed instead of the ink mark MK1 through the print head 18, the facsimile apparatus determines that a density of the printed ink mark MK2 is not a sufficient density if the detection signal DD1 has not risen to the logical H level although the sensor S1 has scanned the ink mark MK2. Thus, the facsimile apparatus determines occurrence of ink shortage in the plotter 5.

The facsimile apparatus in the first embodiment of the present invention (which will be referred to as first facsimile apparatus) responds to calling given from another facsimile apparatus (which will be referred to as second facsimile apparatus). Then, the first facsimile apparatus accepts the calling and then performs a predetermined pre-reception procedure. Thus, the first and second facsimile apparatuses set relevant image information transmission functions and so forth. Then, the first facsimile apparatus starts receiving image information transmitted from the second facsimile apparatus.

The first facsimile apparatus then stores the thus-received image information in the image data storing unit 8. Simultaneously, the first facsimile apparatus decodes the thus-received image information through the coding and decoding unit 7, and thus performs a reception error detecting operation using the thus-decoded image information. After the first facsimile apparatus has finished receiving of each page of image information, if any reception error has been detected, the first facsimile apparatus informs the second facsimile apparatus of the detection of the reception error. If no reception error has been detected, the first facsimile apparatus informs the second facsimile apparatus of safe reception.

After the first facsimile apparatus has finished receiving of one series of image information and storing thereof in the image data storing unit 8, the first facsimile apparatus performs a predetermined post-reception procedure and then releases a communication line which the first and second facsimile apparatuses has been using in the image information transmission. The first facsimile apparatus decodes the series of image information through the coding and decoding unit 7 after reading it from the image data storing unit 8. The thus-decoded image information is transferred to the plotter 5 and the plotter 5 prints out the thus-transferred image information one page by one page. The first facsimile apparatus then deletes a page of the series of image information, after this page of the series of image information has already been printed out normally. Thus, an enough free area is obtained in the image data storing unit 8, which area is able to be used in storing image information obtained through a subsequent image information reception operation.

While the first facsimile apparatus is printing out the series of image information, the apparatus prints the ink mark MK1 at the bottom of each paper sheet PA. The first facsimile apparatus examines whether or not the ink tank of the plotter 5 contains a sufficient amount of ink using the sensor S1 and the signal processing unit shown in FIG. 4 while performing printing operation for each page of the series of image information as described above. That is, the facsimile apparatus monitors the level of the detection signal DD1 while the sensor S1 is scanning the paper sheet PA having the ink mark MK1 together with a relevant image printed thereon. Thus, the facsimile apparatus examines whether or not the level of the detection signal DD1 rises enough when the sensor S1 scans the front edge of the ink mark MK1. If the facsimile apparatus has determined that no ink shortage occurs in the plotter 5 as a result of the above-described examination using the sensor S1 and the signal processing unit shown in FIG. 4, the facsimile apparatus starts performing a printing operation for a subsequent page.

If the facsimile apparatus determines that ink shortage has occurred in the plotter 5 as a result of the above-described examination using the sensor S1 and the signal processing unit shown in FIG. 4, the facsimile apparatus outputs an "ink shortage indication" through the operation and indication unit 6. Thus, an operator of the first facsimile apparatus can recognize the occurrence of an ink shortage situation. Then, the operator may supply an amount of ink to the plotter 5. The above-mentioned ink supply performed by the operator may be made by, for example, replacement of the existing ink tank (in a form of an ink cartridge or the like) with a new ink tank, or injecting ink into the existing ink tank.

In addition to the outputting of "ink shortage indication" through the operation and indication unit 6, the first facsimile apparatus does not perform deletion of the currently printed out page of the series of image information from the image data storing unit 8. That is, the first facsimile apparatus determines, due to the determination that ink shortage has occurred, that this page of the series of image information has not been normally printed.

After the operator has finished the ink supply and thus the first facsimile apparatus detects the completion of the ink supply, the first facsimile apparatus starts printing out the page of the series of image information. The ink shortage was detected while printing out this page of the series of image information. The thus-started printing out operation is performed using the page of series of image information which was not deleted from the image data storing unit 8 as mentioned above. Thus, all the pages of the received series of image information are prevented from being deleted from the image storing unit 8 although they have not been normally printed out.

The apparatus's detection of the completion of the ink supply may be realized as a result of, for example, the operator will appropriately manipulate a particular key provided on the operation and indication unit 6 if the operator finishes the ink supply operation. The particular key may be provided for the purpose of the apparatus's detection of the completion of the ink supply. It can be assumed that the plotter 5 has a sufficient amount of ink in its ink tank immediately after the ink supply. Thus, after the completion of the ink supply, the facsimile apparatus omits printing the ink mark MK1 and omits performing an ink shortage detecting operation for the series of image information. The ink shortage was detected while printing out this series of image information. The ink shortage detecting operation is an operation of scanning the printed ink mark MK1 and examining whether or not a density of the ink mark is high enough through the sensor S1 and the signal processing unit shown in FIG. 4. By this omission of ink mark printing, the printed images can be prevented from being spotted with the ink marks.

There may be a case where the first facsimile apparatus is receiving a very large amount of image information such as that of halftone images. In such a case, while receiving, that is, before all of the amount of image information has not been received yet, the image data storing unit 8 has been short of a free storage area. At this moment, the first facsimile apparatus starts printing image information already received and then stored in the image data storing unit 8. Simultaneously, the first facsimile apparatus starts deleting the corresponding image information stored in the image data storing unit 8. That is, after part of the image data stored in the image data storing unit 8 has been used in the printing out operation, the part of the image information is deleted from the image data storing unit 8. Thus, a free storage area can be obtained in the image data storing unit 8, the thus-obtained free storage area being than used for storing subsequently received image information. Thus, after the image data storing unit 8 has been short of a free storage area, the printing operation is performed in parallel with the image receiving operation.

Immediately after this printing operation has been started, the first facsimile apparatus prints the ink mark MK2 on a paper sheet PA as shown in FIG. 3. The thus-printed ink mark MK2 is scanned by the sensor S1 and the resulting detection signal DD1 is examined. That is, it is examined whether or not a level of the detection signal DD1 rises to the logical H level when the sensor S1 scans the ink mark MK2. If it is determined that the signal DD1 has risen to the logical H level, it is thus determined that no ink shortage has occurred. The first facsimile apparatus responds to this determination and thus continues to perform the parallel image receiving operation and printing operation.

If it is determined that the signal DD1 has not risen to the logical H level, it is thus determined that ink shortage has occurred. The first facsimile apparatus responds to this determination and thus at the moment stops the currently performed image information receiving operation. The first facsimile apparatus then release the currently used communication line and enters a communication error state. As a result, the second facsimile apparatus can recognize that the currently performed image information transmission operation has been interrupted due to occurrence of an error. Therefore, the second facsimile apparatus may perform, for example, an operation of re-transmitting image information which is the same information as that having been once transmitted to the first facsimile apparatus.

At this case, the first facsimile apparatus performs "ink shortage indication" through the operation and indication unit 6. Thus, the first facsimile apparatus urges the operator to supply ink to the first facsimile apparatus.

With reference to FIGS. 6, 7, 8A and 8B, an example of an operation flow performed by the facsimile apparatus in the first embodiment of the present invention when the first facsimile apparatus has detected calling from the second facsimile apparatus will now be described. The second facsimile apparatus gives calling to the first facsimile apparatus so as to transmit a series of image information thereto.

Figure 6:
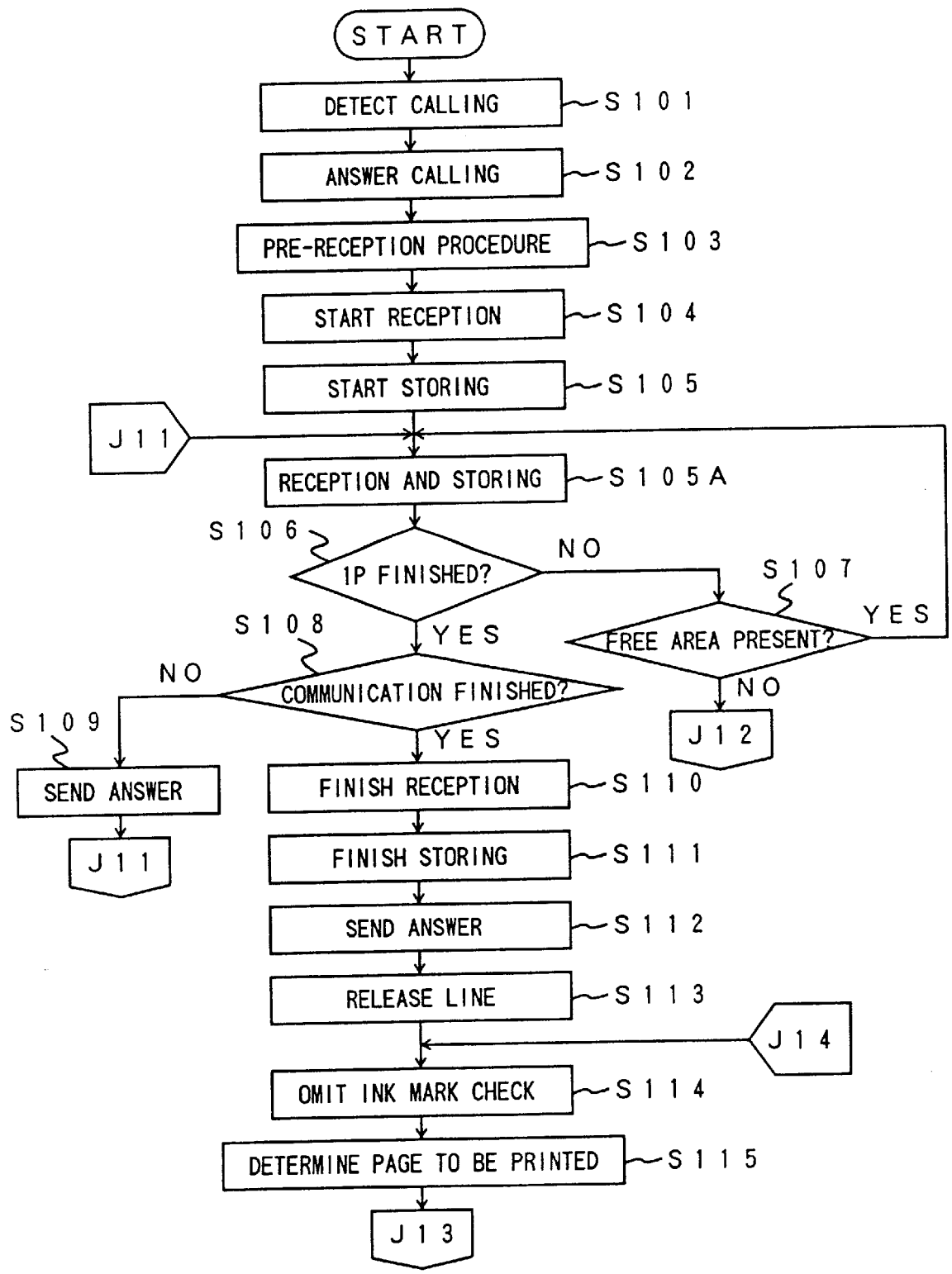
FIGS. 6, 7, 8A and 8B show an example of an operating flow performed by the facsimile apparatus in the first embodiment of the present invention when detecting calling from another apparatus.
Figure 7:
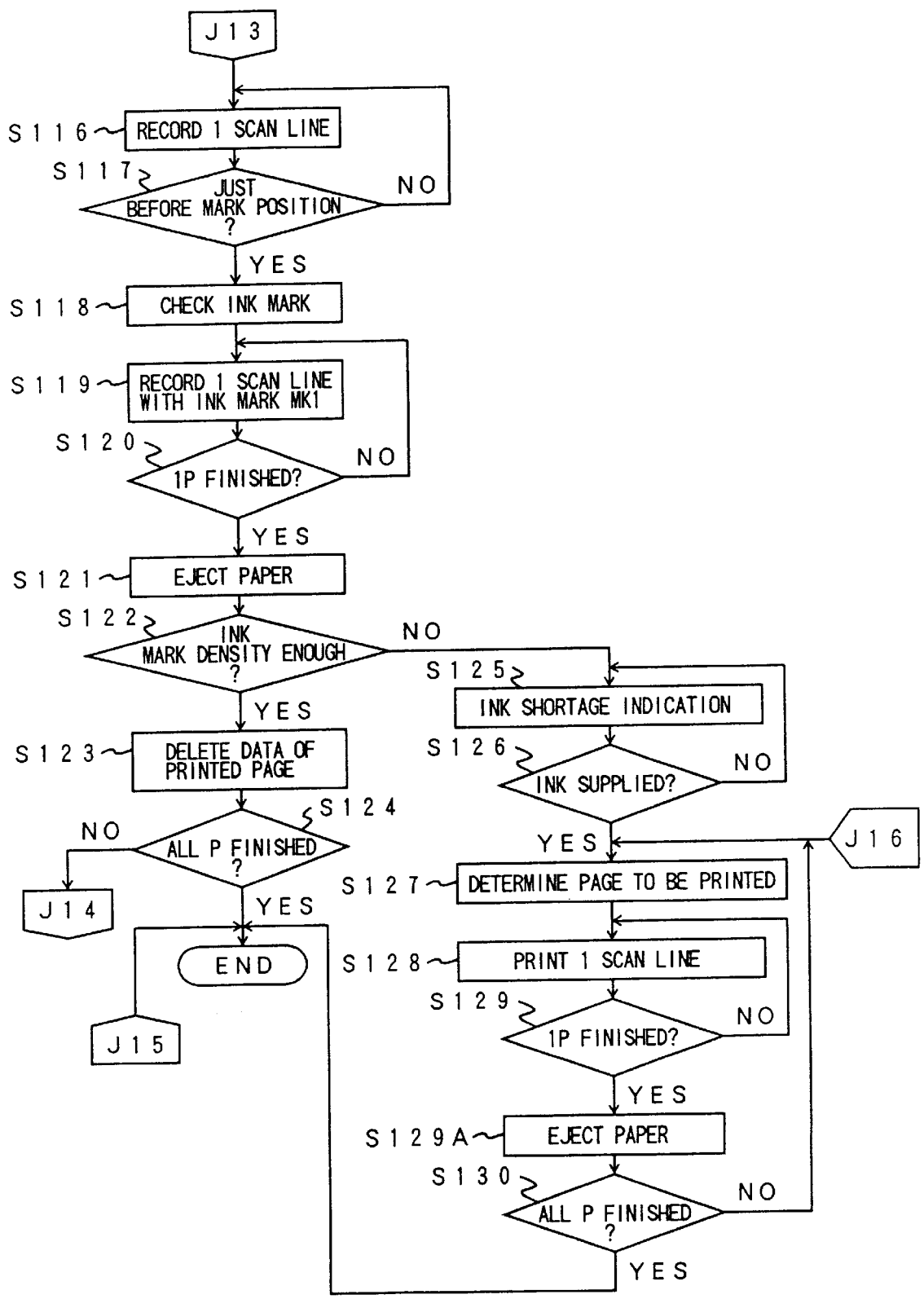

With reference to FIG. 6, when the first facsimile apparatus has detected the calling from the second facsimile apparatus in a step S101 (the term "step" will be omitted, hereinafter), the first facsimile apparatus connects its own apparatus to a relevant communication line and answers the calling in S102. Then, the predetermined pre-reception procedure is performed in S103 and an image information reception operation is started in S104 so as to receive the series of image information. Simultaneously, an operation of storing the thus-received image information in the image data storing unit 8 is started in S105.

In the above-mentioned image information reception operation performed in S105A, the coding and decoding unit 7 decodes a thus-received part of the series of image information in accordance with a coding method previously specified by the second facsimile apparatus. The thus-decoded part of the series of image information is then checked one line by one line in a check method. One specific example of the check method will now be described. A number of bits included in one line is counted and the thus-obtained number of bits is compared with a number of bits which is obtained based on a width of a paper sheet having an original image printed thereon and a resolution of the image, the width of the paper sheet and the resolution of the image being previously specified by the second facsimile apparatus. If the former number of bits is equal to the latter number of bits, it can be determined that no error has occurred in the image information transmission.

In the above-mentioned storing operation started in S104 and performed in S105A, the received part of the series of image information is stored in a free storage area of the image data storing unit 8 one page by one page. In addition, relevant management information is produced, which information will be used in accessing the part of the series of image information thus-stored in the image data storing unit 8. The thus-produced management information is stored in a predetermined management information storage area in this storing operation.

In S106, it is determined whether or not the image information reception operation and the storing operation for a page of the series of image information has been finished as a result of thus processing the part of the series of image information. Further, in S106, before the above-mentioned determination In S107, it is determined whether or not an amount of a free storage area currently remaining in the image data storing unit 8 is larger than a predetermined value.

If the amount of the free area of the image data storing unit 8 is a sufficient amount (thus S107 results in YES) and the image information reception operation and the storing operation for a page of the series of image information has been finished (thus S106 results in YES), S108 is performed. In S108, it is determined whether or not reception of the series of image information has been finished. This determination is performed by checking a post-message command received subsequently to reception of the currently processed page of the series of image information.

If the result of S108 is NO, then an answer signal is sent to the second facsimile apparatus in S109, the signal indicating the safe receipt of the relevant page of the series of image information. Then, the image information reception operation (which will be simply referred to as the reception operation, hereinafter) and the storing operation for a subsequent page of the series of image information is performed in S105A.

If the result of S108 is YES, meaning that the reception of the series of image information has been finished, at the moment, the reception operation is terminated in S110. Then, the storing operation is also terminated in S111. Then, an answer signal is sent to the second facsimile apparatus in S112, the signal indicating the safe receipt of the last page of the series of image information. Then, a predetermined post-reception procedure is performed and then the currently-used communication line is released in S113.

After the reception and storing of the series of image information currently transmitted by the second facsimile apparatus has been finished, the first facsimile apparatus starts printing the thus-stored series of image information as described below.

With reference to FIG. 4, the control signal SN is supplied to the switch SW1 such as that turning it off. As a result, an ink mark MK1 or MK2 checking function is inactivated in S114. In S115, a page to be presently printed is appropriately determined from among the pages of the series of image information stored in the image data storing unit 8. Then, in S116 shown in FIG. 7, one scan line of the thus-determined page of the series of image information is printed by the plotter 5 after being decoded by the coding and decoding unit 7 so as to obtain a corresponding part of an original image information. In S117, it is determined whether or not a scan line subsequent to the thus-printed scan line includes a position at which the ink mark MK1.

If scan lines, the last line of which is a scan line immediately antecedent to the scan line including the ink mark MK1 printing position, have been printed in S116, the control signal SN is supplied the switch SW1 such as that turning it on. As a result, an ink mark MK1 or MK2 checking function is activated in S118.

Then, the scan line including the ink mark MK1 printing position is printed by the plotter 5 in S119, after being decoded by the coding and decoding unit 7 so as to obtain a corresponding part of the original image information. In this printing, an extent of the scan line is printed, the extent corresponding to the ink mark MK1 printing position, after image data of the extent of the scan line is replaced by solid black image data. The solid black image data results in a corresponding extent of a printed image being solid black. In S120, it is determined whether or not the currently processed page of the series of image information has been printed out. If the ink mark MK1 has dimensions such that a plurality of scan lines are required to be printed out for printing the entirety of the ink mark MK1, it is required that S119 and S120 are performed cyclically until the plurality of scan lines have been printed out.

As shown in FIG. 3, the ink mark MK1 extends on the bottom end of the printable area AR of the paper sheet PA. That is, the ink mark MK1 printing position extends across the last scan lines of the relevant page. If a result of S120 is YES, meaning that the currently processed page of the series of image information has been printed out, a paper sheet PA having the thus-printed out page printed thereon is ejected in S121. In this ejecting, the ink mark MK1 printed on the paper sheet PA passes on the sensor S1. If a density of the printed ink mark MK1 is sufficiently high, a level of the detection signal DD1 output by the comparator CP1 shown in FIG. 4 rises to be the logical H level when the sensor S1 scans the front edge of the ink mark MK1, and then the level of the signal DD1 decays to the logical L level when the sensor S1 has scanned the rear edge of the ink mark MK1. The control unit 1 shown in FIG. 1 detects the rising and decaying of the level of the detection signal DD1. As a result, the control unit 1 determines that the density of the ink mark MK1 is sufficiently high. If the level of the detection signal DD1 does not rise to the logical H level and does not decay to the logical L level, and thus the control unit 1 does not detect the level variation of the detection signal DD1, the control unit 1 determines that the density of the ink mark MK1 is not sufficiently high.

If the control unit 1 has determined that the ink mark MK1 has a sufficiently high density (YES in S122), the page of the series of image information is deleted from the image data storing unit 8 in S123, the thus-checked ink mark MK1 being included in the page and printing out of the page having been finished. In S124, it is determined whether or not the series of image information includes other pages remaining than those already printed out. If a result of S124 is NO, S114 is then performed. In the steps starting from S114, a subsequent page of the series of image information is printed out. If a result of S124 is YES, meaning that printing of all the pages of the series of image information has been finished, the current sequence of operations is terminated.

If a result of S122 is NO, meaning that it has been determined that the ink mark MK1 has not a sufficient density, the operation and indication unit 6 performs the ink shortage indication in S125, which indication is maintained in a loop of S126 and S125, until the operator of the first facsimile apparatus has supplied ink to the plotter 5 and then has manipulated the above-mentioned relevant particular key on the operation and indication unit 6. In S126, it is determined whether or not the operator of the first facsimile apparatus has supplied ink to the plotter 5 and then has manipulated the above-mentioned relevant particular key on the operation and indication unit 6.

If a result of S126 is YES, meaning that ink has been supplied, the page of the series of image information having been printed out is determined in S127 to be again printed out. The currently checked ink mark MK1 was included in this page, and there is a possibility that the thus-printed out page has not been printed out with normal densities because of the ink shortage. In a loop of S128 and S129, the page of the series of image information is printed out one scan line by one scan line by the plotter 5 after being decoded by the coding and decoding unit 8. After printing of the page of series of image information has been finished (YES in S129), a paper sheet PA having the page printed thereon is ejected in S129A. In S130, it is determined whether or not printing out of all the pages of the series of image information has been finished.

If a result of S130 is NO, S127 is performed. In the steps starting from S127, remaining pages of the series of image information are printed out. If a result of S130 is YES, the current sequence of operations are terminated.

Figure 8A:
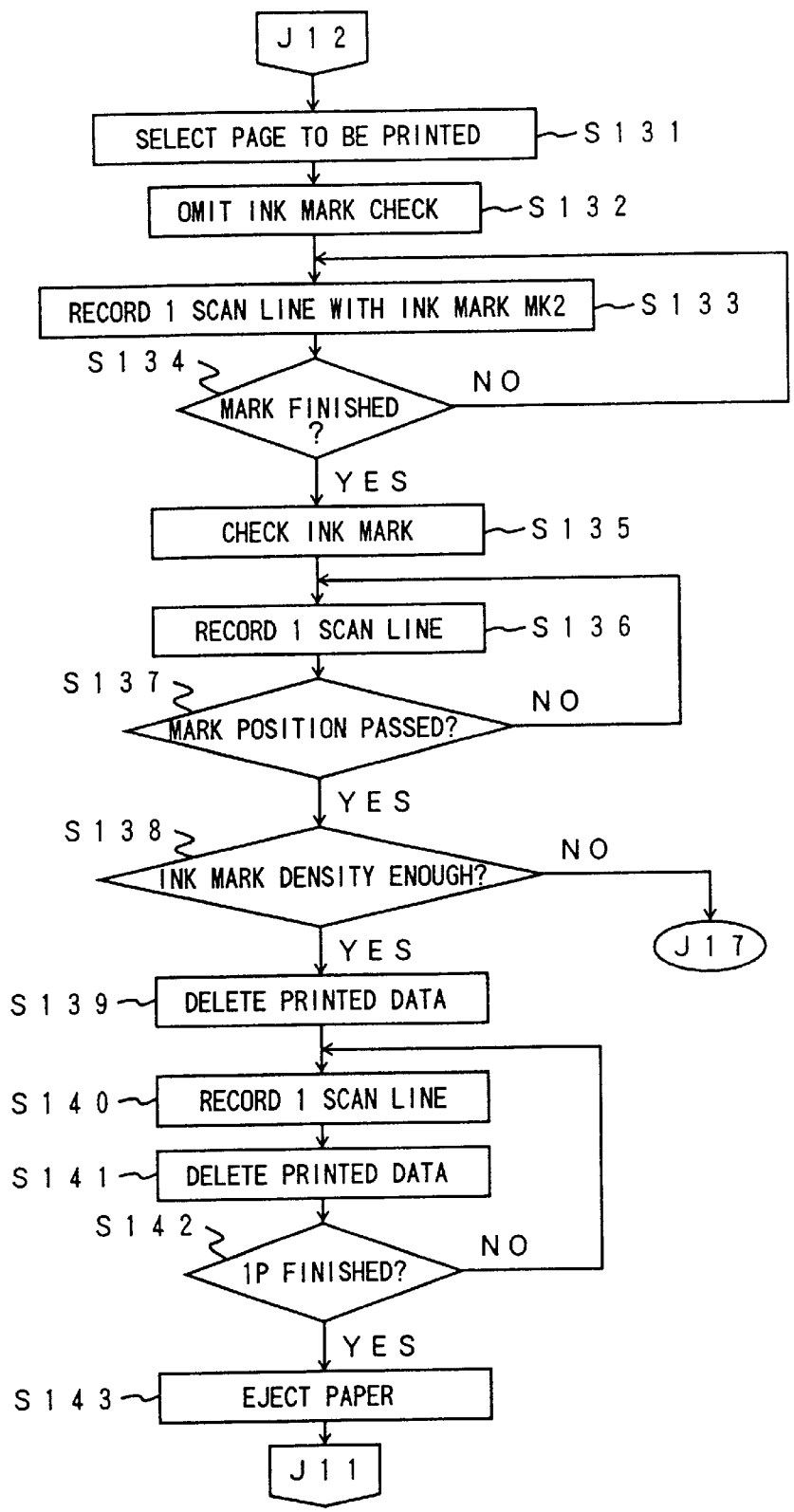

If a result of S107 shown in FIG. 6 is NO, meaning shortage of a free storage area in the image storing unit 8, a page to be presently printed is appropriately determined in S131 shown in FIG. 8A from among the pages of the series of image information stored in the image data storing unit 8. In S132, the control signal SN is supplied to the switch SW1 such as that turning it off. As a result, the ink mark MK1 or MK2 checking function is inactivated in S132.

In a loop of S133 and S134, scan lines including the entirety of the ink mark MK2 printing position are printed by the plotter 5, one scan line by one scan line, after being decoded by the coding and decoding unit 7 so as to obtain a corresponding part of the original image information. In this printing, the same as the ink mark MK1 printing in S119, an extent of the scan line is printed, the extent corresponding to the ink mark MK2 printing position, after image data of the extent of the scan line is replaced by solid black image data. The solid black image data results in a corresponding extent of a printed image being solid black.

After printing out of the scan lines including the entirety of the ink mark MK2 position has been finished and thus the printing of the mink mark MK2 has been finished (YES in S134), the control signal SN is supplied the switch SW1 such as that turning it on. As a result, an ink mark MK1 or MK2 checking function is activated in S135.

With reference to FIG. 2, the front edge of a currently printed paper sheet PA moves leftward from the position of the printing unit of the print head 18 and the position of the sensor S1, while the printing unit of the print head 18 is printing scan lines of the series of image information. As shown in FIG. 3, the ink mark MK2 extends on the top end of the printable area AR of the paper sheet PA. That is, the ink mark MK1 printing position extends across the first scan lines of the relevant page. Then, in a loop of S136 and S137, until the sensor S1 has scanned the ink mark MK2 printed on the paper sheet PA, scan lines of the series of image information are printed out, one scan line by one scan line by the plotter 5, after being decoded by the coding and decoding unit 7 so as to obtain a corresponding part of the original image information.

If a result of S137 is YES, meaning that the sensor S1 has scans the ink mark MK2, it is determined in S138 whether or not the thus-scanned ink mark MK2 has a sufficient high density. If a result of S138 is YES, the scan lines of the series of image information, printing of which scan lines has been finished, are deleted from the image data storing unit 8 in S139. Thus, a free storage area of the image data storing unit 8 can be increased. The storing operation continuing together with the reception operation can use the thus-increased free storage area of the image data storing unit 8 for storing the currently received part of the series of image information.

In a loop of S140, S141 and S142, the remaining part of the series of image information stored in the image data storing unit 8 is printed out, one scan line by one scan line by the plotter 5, after being decoded by the coding and decoding unit 7 so as to obtain a corresponding part of the original image information. Further, scan lines of the series of image information, printing of which scan lines has been finished, are deleted from the image data storing unit 8 one scan line by one scan line. Thus, a free storage area of the image data storing unit 8 can be increased in quick steps.

After printing of the page of series of image information has been finished (YES in S142), a paper sheet PA having the page printed thereon is ejected in S143. Then, S105A shown in FIG. 6 is performed. That is, part of the series of image information which has not been received is received and stored in the image data storing unit 8.

If a result of S138 is NO, meaning that the scanned ink mark MK2 has not a sufficient high density, at the moment, the currently performed reception operation is terminated in S144. Further, the storing operation is also terminated in S145, and the currently performed communication between the first and second facsimile apparatuses is terminated in S146. In S147, the currently used communication line is released. As a result, the second facsimile apparatus can detect that the currently performed image information transmission has been terminated due to an error.

In a loop of S148 and S149, the operation and indication unit 6 of the first facsimile apparatus performs the ink shortage indication, which indication is maintained, until the operator of the first facsimile apparatus has supplied ink to the plotter 5 and then has manipulated the above-mentioned relevant particular key on the operation and indication unit 6.

If a result of S149 is YES, meaning that ink has been supplied, it is determined in S150 whether or not at least one page of the series of image information has been already stored in the image data storing unit 8. If a result of S150 is YES, S127 is performed and in the steps starting from S127, part of the series of image information stored in the image data storing unit 8 is printed out. If a result of S150 is NO, the current sequence of operations is terminated.

The above-described facsimile apparatus in the first embodiment of the present invention determines that ink shortage has occurs if it has been determined that the ink mark MK1 or MK2 which has been scanned by the sensor S1 has not a sufficiently high density. However, there is a possibility that the group of ink nozzles of the print head 18 have been blocked. If the ink nozzles have been blocked, the ink mark MK1 or MK2 cannot be printed in a sufficiently high density although a sufficient amount of ink is contained in the ink tank of the plotter 5. In such a case, if the operator supplies ink to the ink tank, a problematic situation that the printing operation cannot be performed with sufficiently high densities remains. In this case, the ink supply was meaningless.

A group 3 facsimile apparatus in a second embodiment of the present invention will now be described. The facsimile apparatus in the second embodiment detects the ink nozzle blockages and the above-described blockage removal mechanism which is provided in the apparatus is then operated. The blockage removal mechanism is, for example, such as that absorbing or sucking blockages such as solidified ink from the group of ink nozzles. Thus, the blockages such as solidified ink are removed from the group of ink nozzles. After that, the normal printing operation can be performed such that resulting printed images has normal densities.

In the facsimile apparatus in the second embodiment, if a scanned ink mark MK1 or MK2 has not a sufficiently high density even immediately after an operator has supplied ink to the ink tank of the plotter 5, the apparatus determines that the ink nozzle have been blocked. Then, the apparatus causes the blockage removal mechanism to remove the blockages from the ink nozzles. Then, the apparatus can continues the reception operation. As a result, working of the facsimile apparatus is prevented from being halted due to the above-mentioned remaining of the problematic situation that the printing operation cannot be performed with sufficiently high densities. Especially, such an automatic ink nozzle blockage removal method as that mentioned above is effective for a facsimile apparatus using an ink-jet printer which has the print head and an ink cartridge (including the ink tank) integrated to be one body together. This is because, if the print head and ink cartridge are integrated to be one body, replacement of the ink tank means the replacement of the body of the print head and ink cartridge. Thus, the replacement costs much. The above-mentioned automatic blockage removal may eliminate meaningless replacement of the body of the print head and ink cartridge.

With reference to FIGS. 9, 10A, 10B, 11A and 11B, an example of an operation flow performed by the facsimile apparatus in the second embodiment of the present invention when the first facsimile apparatus has detected calling from the second facsimile apparatus will now be described. The second facsimile apparatus gives calling to the first facsimile apparatus so as to transmit a series of image information thereto. However, a structure of the facsimile apparatus in the second embodiment of the present invention is similar to that of the above-described facsimile apparatus in the first embodiment of the present invention. Therefore, the operation flow of the facsimile apparatus in the second embodiment of the present invention is similar to that of the above-described facsimile apparatus in the first embodiment of the present invention. Points at which the operation flow of the facsimile apparatus in the second embodiment of the present invention differs from that of the above-described facsimile apparatus in the first embodiment of the present invention will be mainly described.

Figure 8B:
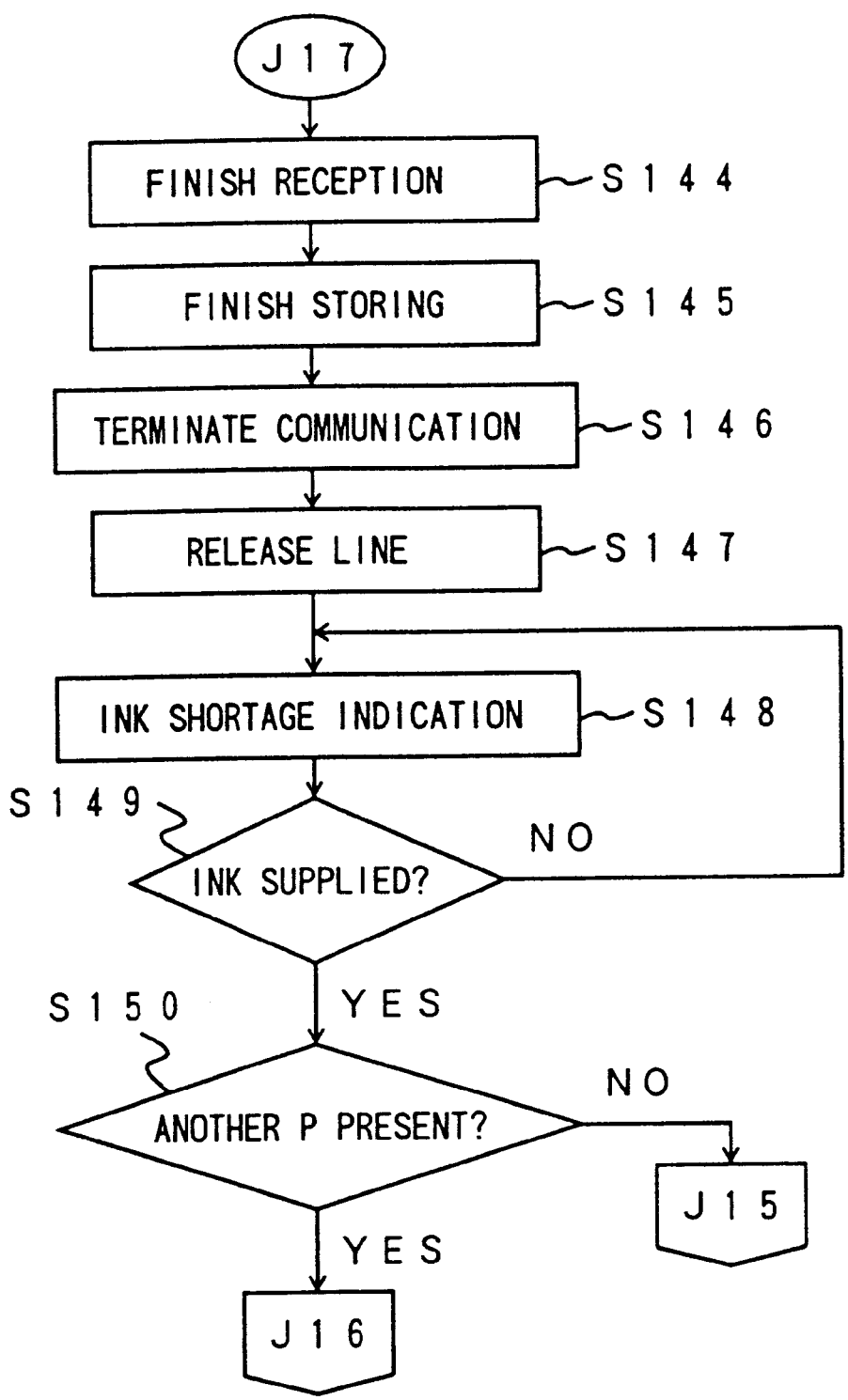
Figure 9:
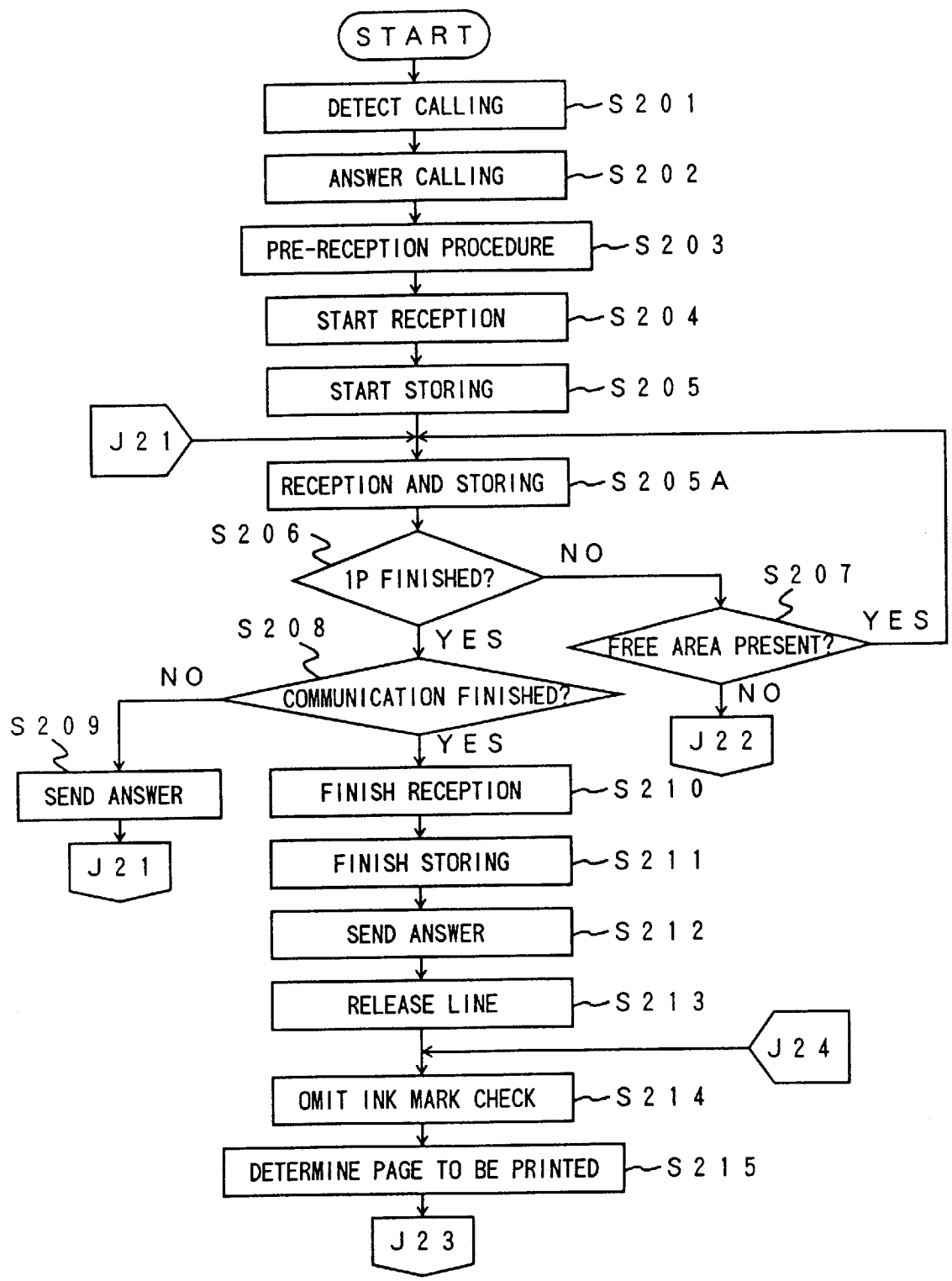
FIGS. 9, 10A, 10B, 11A and 11B show an example of an operating flow performed by the facsimile apparatus in the second embodiment of the present invention when detecting calling from another apparatus.
Figure 10A:
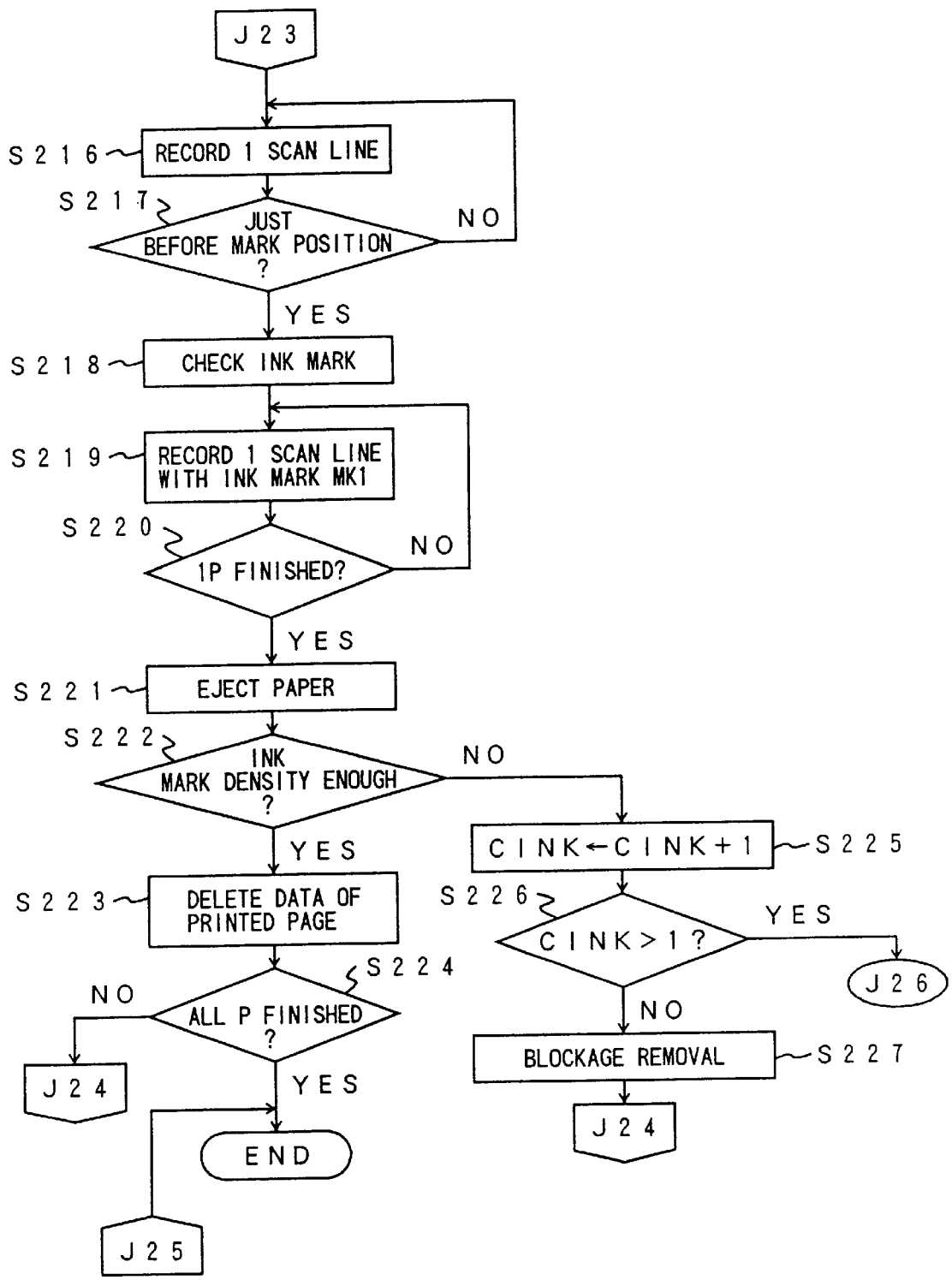
Figure 11A:
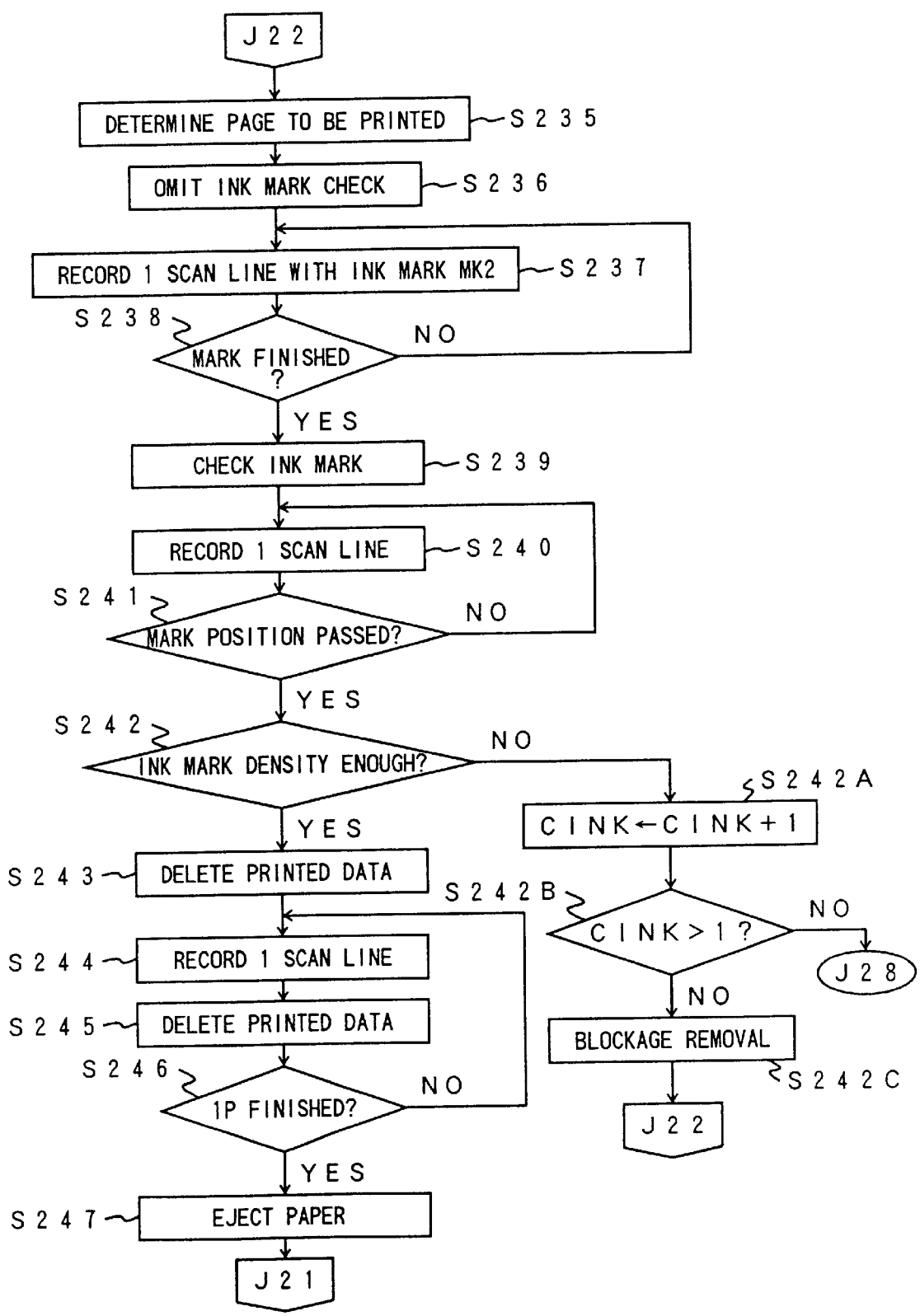
Figure 11B:
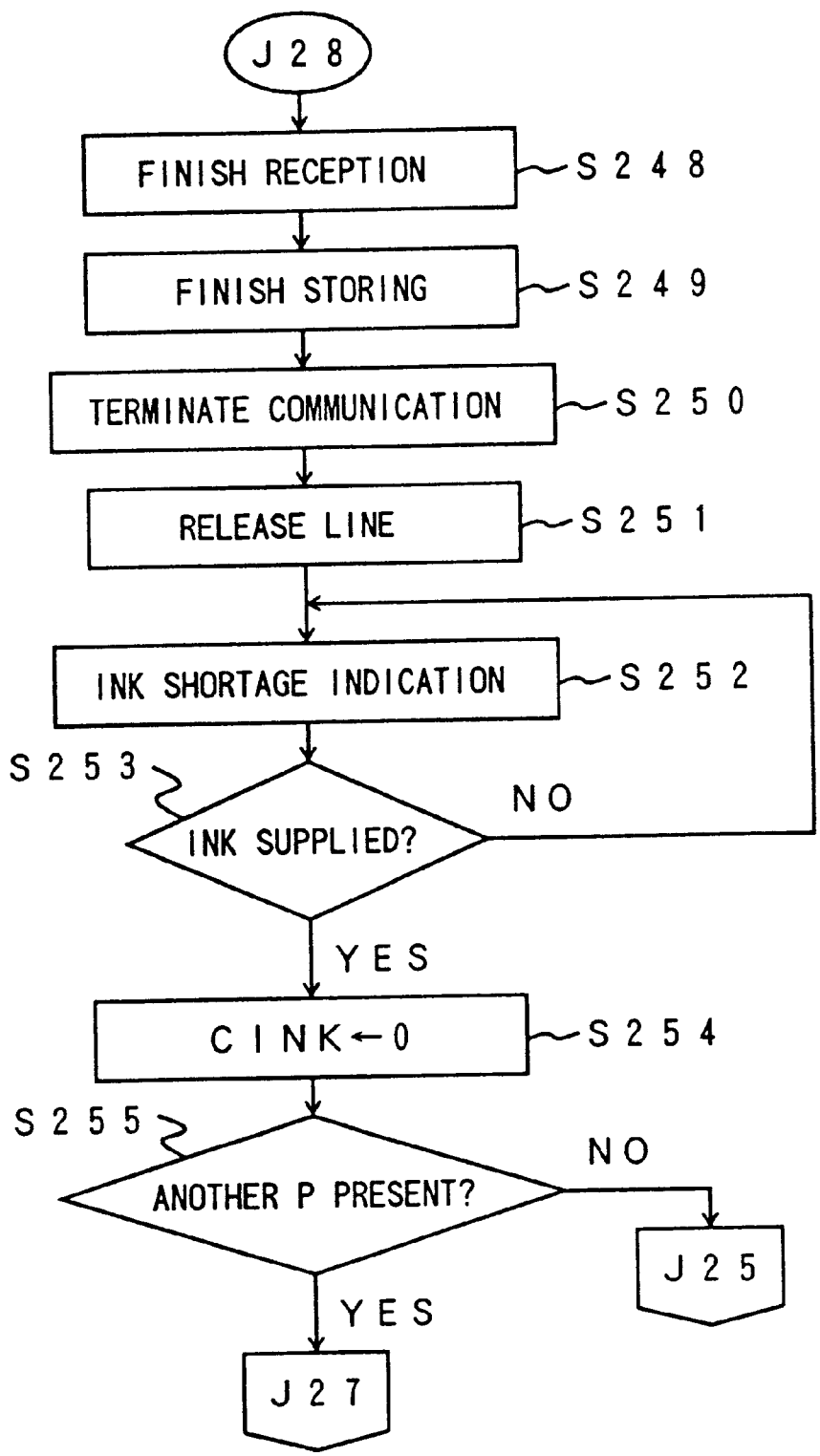

With reference to FIG. 9, operations of S201, S202, S203, S204, S205, S205A, S206, S207, S208, S209, S210, S211, S212, S213, S214, and S215 are the same as those of S101, S102, S103, S104, S105, S105A, S106, S107, S108, S109, S110, S111, S112, S113, S114, and S115 shown in FIG. 6, respectively. With reference to FIG. 10A, operations of S216, S217, S218, S219, S220, S221, S222, S223, and S224 are the same as those of S116, S117, S118, S119, S120, S121, S122, S123, and S124 shown in FIG. 7, respectively. With reference to FIGS. 11A and 11B, operations of S235, S236, S237, S238, S239, S240, S241, S242, S243, S244, S245, S246, S247, S248, S249, S250, S251, S252, S253, and S255 are the same operation as those of S131, S132, S133, S134, S135, S136, S137, S138, S139, S140, S141, S142, S143, S144, S145, S146, S147, S148, S149, and S150 shown in FIGS. 8A and 8B, respectively.

With reference to FIG. 10A, the ink mark MK1 is printed in a loop of S219 and S220 and the thus-printed ink mark MK1 is scanned and thus checked in S222. If a result of S222 is NO, meaning that it has been determined that the scanned ink mark MK1 has not have a sufficient high density, a count value CINK is incremented by 1 in S225. The situation in which it has been determined that the scanned ink mark MK1 has not have a sufficient high density will be simply referred to as low ink density situation, hereinafter. The count value CINK indicates a number of the low ink density situation occurrences after an operator has supplies ink to the plotter 5 of the first facsimile apparatus. In S226, it is determined whether or not the count value CINK is larger than 1.

If a result of S226 is NO, the first facsimile apparatus determines that the currently occurred low ink density situation has occurred due to blockage of the group of ink nozzles of the print head 18 of the plotter 5. In S227, the facsimile apparatus causes the blockage removal mechanism to perform a blockage removal operation for attempting to remove blockages from the group of ink nozzles. Then, S214 is performed. In the steps starting from S214, remaining pages of the series of image information stored in the image data storing unit 8 are printed out. In this case, a page of the series of image information, at which page it was determined that the ink nozzle blockage had occurred, remains in the image data storing unit 8. Therefore, the printing operation is started from this page.

If a result of S226 is YES, it is determined that the ink shortage has occurred in the plotter 5. Then, in a loop of S228 and S229 shown in FIG. 10B, same as the loop of S125 and S126 shown in FIG. 7, the ink shortage indication is performed until the operator has supplied ink to the plotter 5. After the operator's ink supply has been determined in S229, the count value CINK is initialized to be 0 in S230. Then, S231 is performed. In steps S231, S232, S233, and S234, as the steps S127, S128, S129 and S130 shown in FIG. 7, pages of the series of image information which are stored in the image data storing unit 8 and have not been printed out yet are printed out.

With reference to FIG. 11A, the ink mark MK2 is printed in a loop of S237 and S238, and the thus-printed ink mark MK2 is scanned and thus checked in S242. If a result of S242 is NO, in S242A, S242B and S242C, the same operations as those in S225, S226 and S227 are performed. If a result of S242B is YES, meaning that the current occurrence of the low ink density situation is not the first time occurrence after the operator supplied ink to the plotter 5, the first facsimile apparatus determines that the ink shortage has occurred. Then, the reception operation, storing operation, and communication between the first and second facsimile apparatuses are terminated, and the used communication line is released in S248, S249, S250 and S251 shown in FIG. 11B, as S144, S145, S146, and S147 shown in FIG. 8B. Then, in a loop of S252 and S253, as the loop of S148 and S149 shown in FIG. 8B, the ink shortage indication is performed until the operator has supplied ink to the plotter 5. After the operator's ink supply has been determined in S253, the count value CINK is initialized to be 0 in S254. Then, S255 is performed. In steps starting from S255, the same operations as those in the steps starting from S150 shown in FIG. 8B are performed.

If a result of S242B is NO, meaning that the current occurrence of the low ink density is the first time occurrence after the ink supply, the blockage removal operation is performed in S242C. Then, S235 shown in FIG. 11A is performed. In the steps starting from S235, the same operations as those described above for the same steps are performed.

The above-mentioned facsimile apparatus in the second embodiment of the present invention determines that the first occurrence of the low ink situation after ink supply has occurred due to the ink nozzle blockage in the print head 18. However, a method for determining the ink nozzle blockage is not limited to the above-mentioned method. Instead of that, for example, another method will now be described. If the facsimile apparatus has not performed the printing operation, that is, the plotter 5 has not been used for long time such as, for example, 3 days, ink nozzle blockage is likely to occur due to drying of ink remaining in the group of ink nozzles. Therefore, by measuring a time from a time the plotter 5 performed the printing operation last to a time the low ink density situation has occurred, if the thus-measured time is longer than a predetermined value, such as, for example, 3 days, the currently occurred low ink density situation has occurred due to the ink nozzle blockage. If the thus-measured time is equal to or shorter than the predetermined value, the currently occurred low ink density situation has occurred due to the ink shortage. A group 3 facsimile apparatus in a third embodiment of the present invention uses this method.

With reference to FIGS. 12, 13A, 13B, 14A and 14B, an example of an operation flow performed by the facsimile apparatus in the third embodiment of the present invention when the first facsimile apparatus has detected calling from the second facsimile apparatus will now be described. The second facsimile apparatus gives calling to the first facsimile apparatus so as to transmit a series of image information thereto. However, a structure of the facsimile apparatus in the third embodiment of the present invention is similar to that of the above-described facsimile apparatus in the second embodiment of the present invention. Therefore, the operation flow of the facsimile apparatus in the third embodiment of the present invention is similar to that of the above-described facsimile apparatus in the second embodiment of the present invention. Points at which the operation flow of the facsimile apparatus in the third embodiment of the present invention differs from that of the above-described facsimile apparatus in the second embodiment of the present invention will be mainly described.

Figure 12:
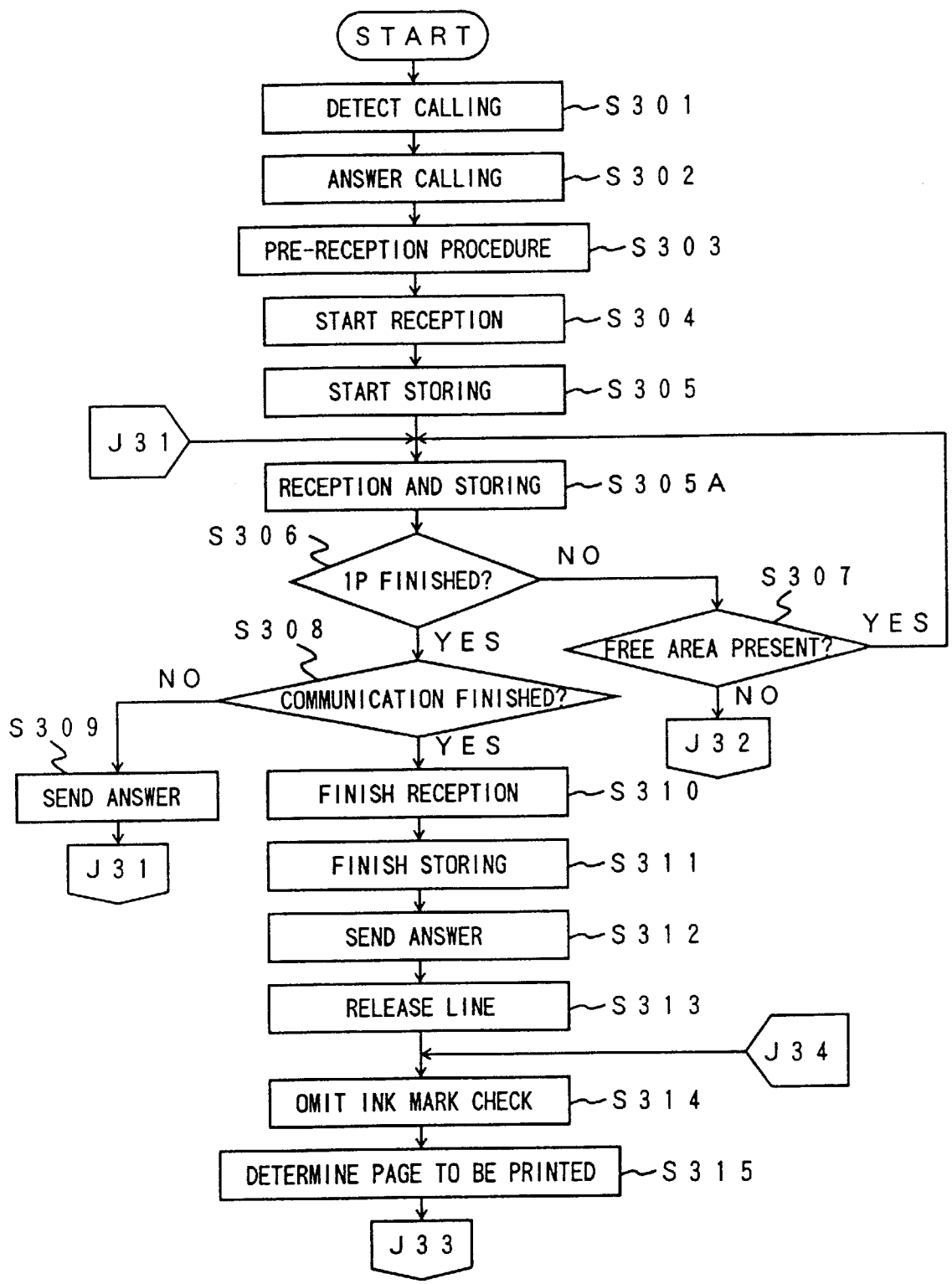
FIGS. 12, 13A, 13B, 14A and 14B show an example of an operating flow performed by the facsimile apparatus in the third embodiment of the present invention when detecting calling from another apparatus.
Figure 13A:
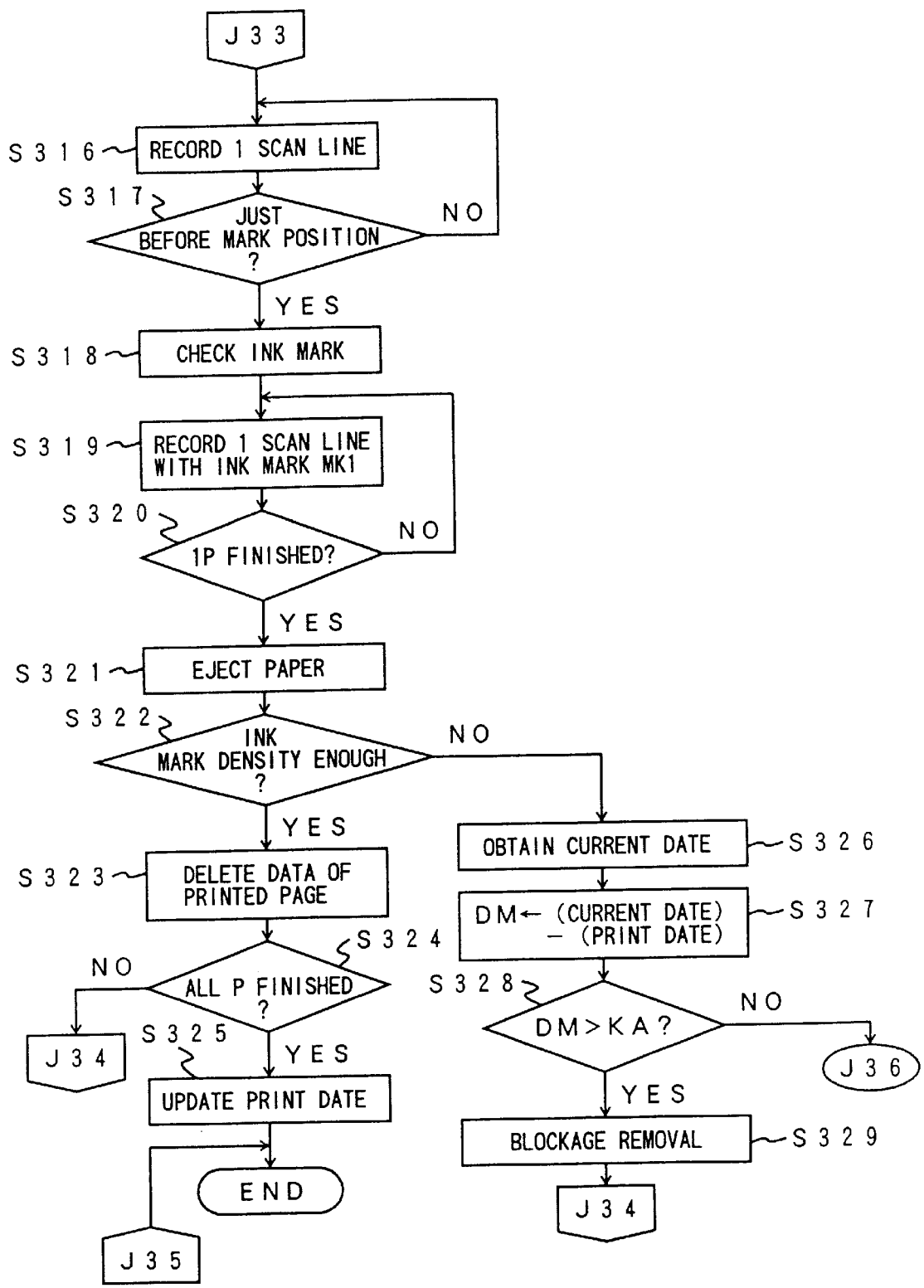
Figure 13B:
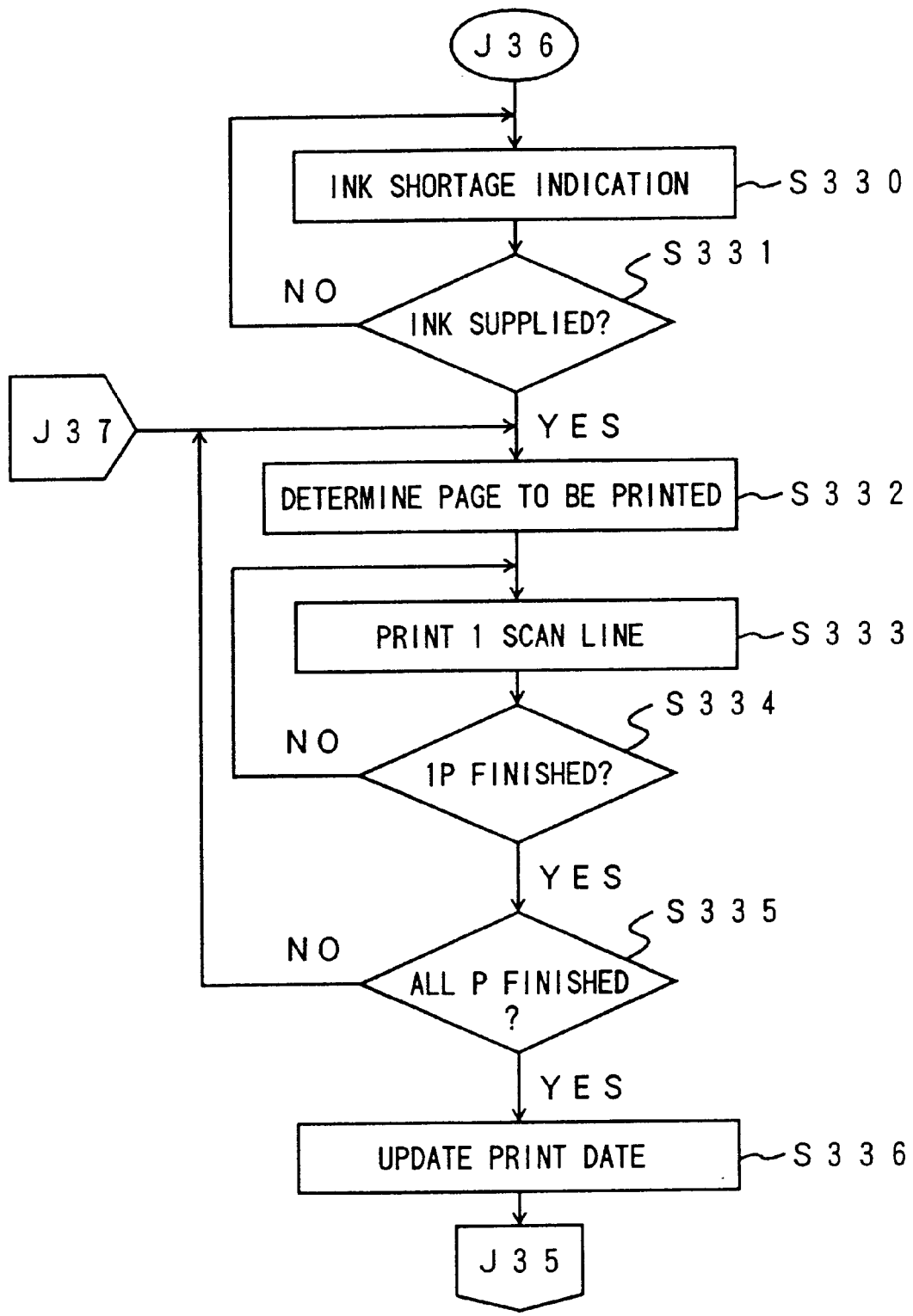
Figure 14A:
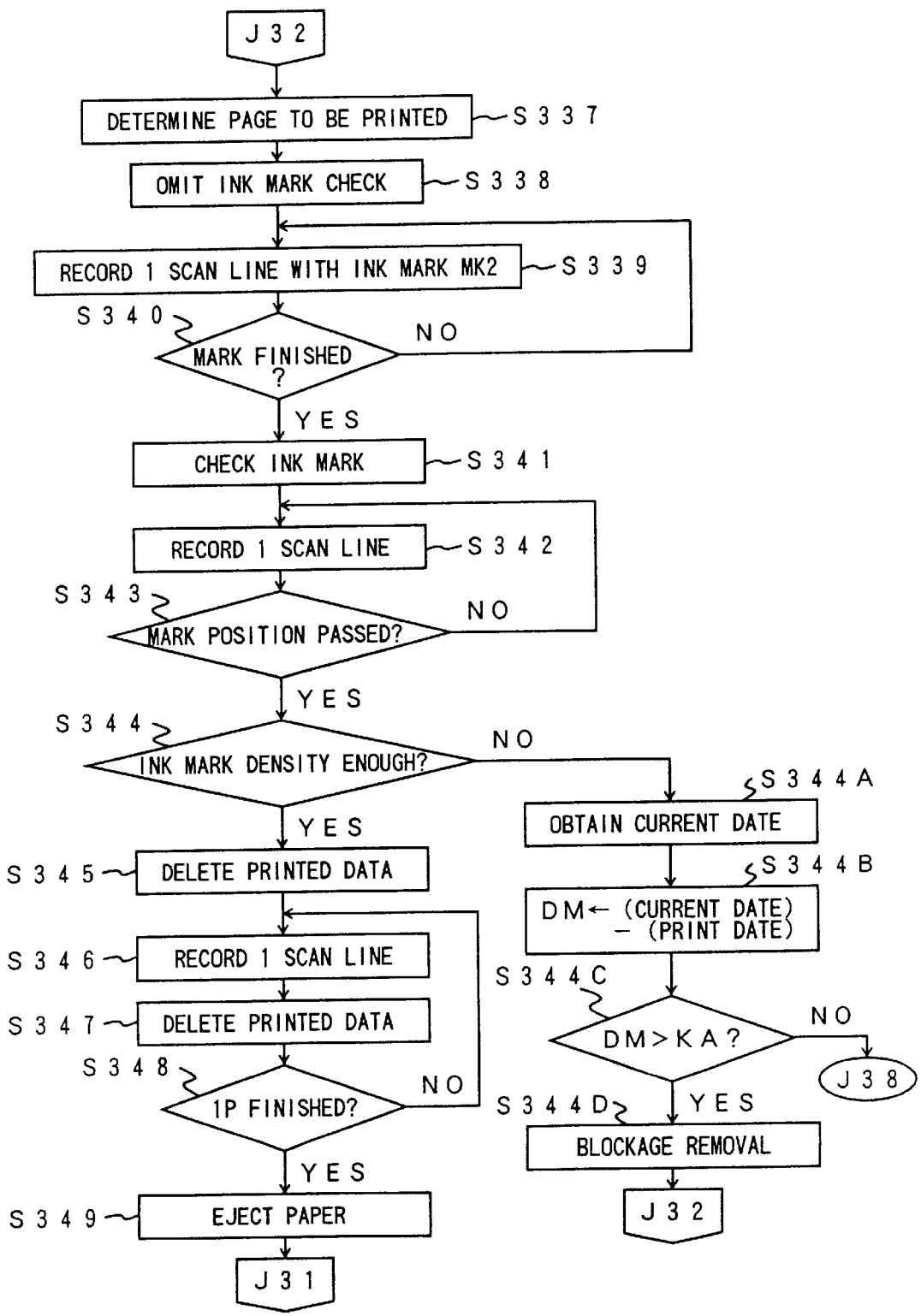
Figure 14B:
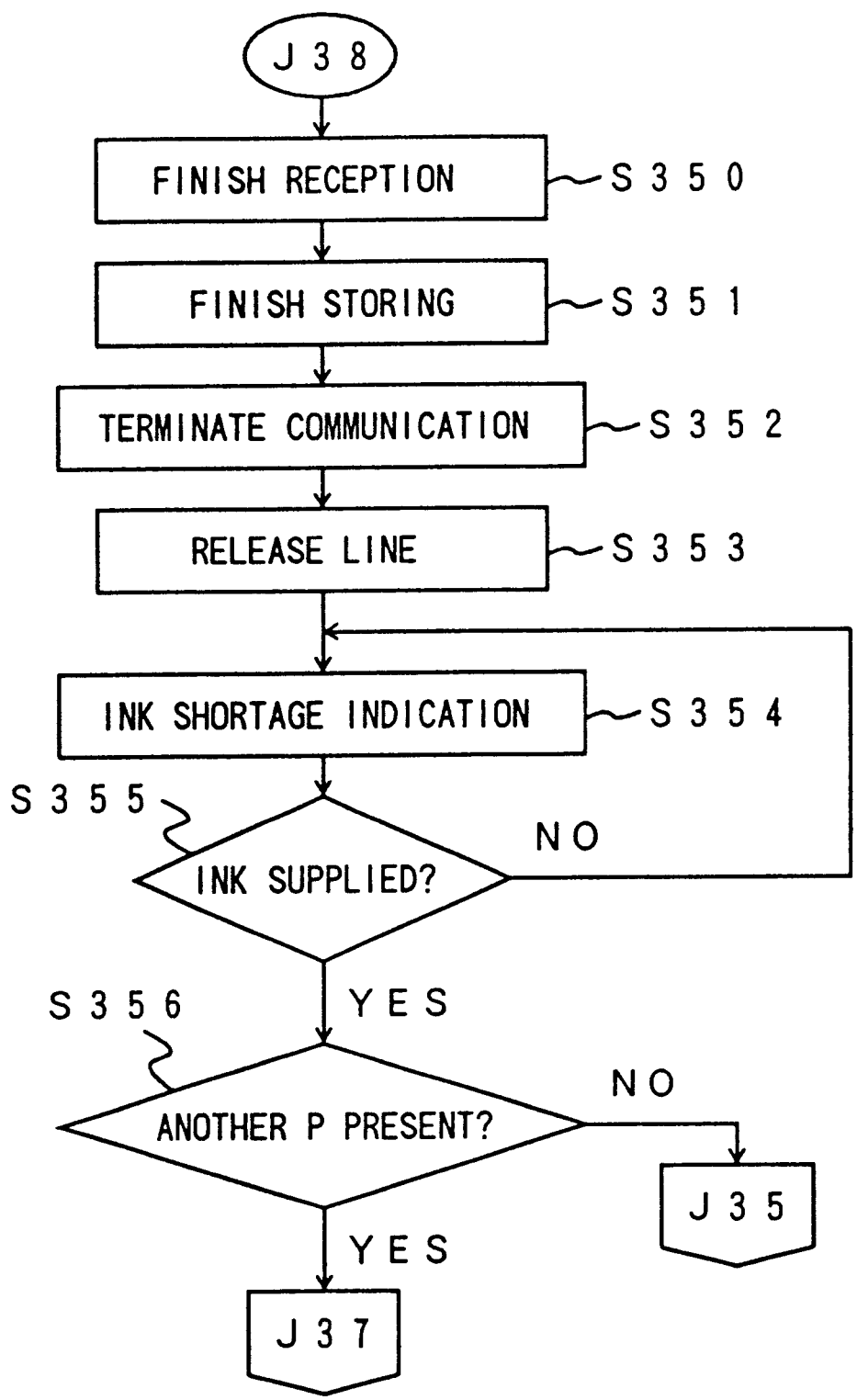

With reference to FIG. 12, operations of S301, S302, S303, S304, S305, S305A, S306, S307, S308, S309, S310, S311, S312, S313, S314, and S315 are the same as those of S201, S202, S203, S204, S205, S206, S206A, S207, S208, S209, S210, S211, S212, S213, S214, and S215 shown in FIG. 9, respectively. With reference to FIG. 13A, operations of S316, S317, S318, S319, S320, S321, S322, S323, S324, and S325 are the same as those of S216, S217, S218, S219, S220, S221, S222, S223, S224, and S225 shown in FIG. 10A, respectively. With reference to FIG. 13B, operations of S330, S331, S332, S333, S334, and S335 are the same operations as those of S228, S229, S231, S232, S233, and S234 shown in FIG. 10B, respectively. With reference to FIG. 14A, operations of S337, S338, S339, S340, S341, S342, S343, S344, S345, S346, S347, S348, and S349 are the same as those of S235, S236, S237, S238, S239, S240, S241, S242, S243, S244, S245, S246, and S247 shown in FIG. 11A, respectively. With reference to FIG. 14B, operations of S350, S351, S352, S353, S354, S355, and S356 are the same as those of S248, S249, S250, S251, S252, S253, and S255 shown in FIG. 11B, respectively.

In FIG. 13A, S324 is inserted immediately after S323 corresponding to S224 shown in FIG. 10A. In S325, a current date is obtained from a clock provided in the facsimile apparatus, and the thus-obtained current date is set as a record date which is stored.

Further, instead of operations of S225, S226, and S227 shown in FIG. 10A, operations of S326, S327, S328 and S329 shown in FIG. 13A are performed in the facsimile apparatus in the third embodiment. If a result of S322 corresponding to S222 shown in FIG. 10A is NO, indicating the occurrence of the low ink density situation, a current date is obtained in S326. In S327, a difference between the thus-obtained current date and a stored print date is calculated. The stored print date is either a print date previously set in S325 or a print date previously set in S336. The stored print date is a date at which the plotter 5 performed the printing operation last. The thus-obtained difference is set as a variable DM. In S328, it is determined whether or not the thus set variable DM is larger than a predetermined reference value KA. The reference value KA is ordinarily set as being 3 (days) but the operator may change the value KA to be one of three values: 1 (day), 2 (days) and 3 (days).

If a result of S328 is YES, the facsimile apparatus determines that the currently occurred low ink density situation has occurred due to blockage of the group of ink nozzles of the print head 18 of the plotter 5. Then, S329 corresponding to S227 shown in FIG. 10A is performed. Operations performed in the steps starting from S329 are performed as the same as those of the corresponding steps starting from S227.

Figure 10B:
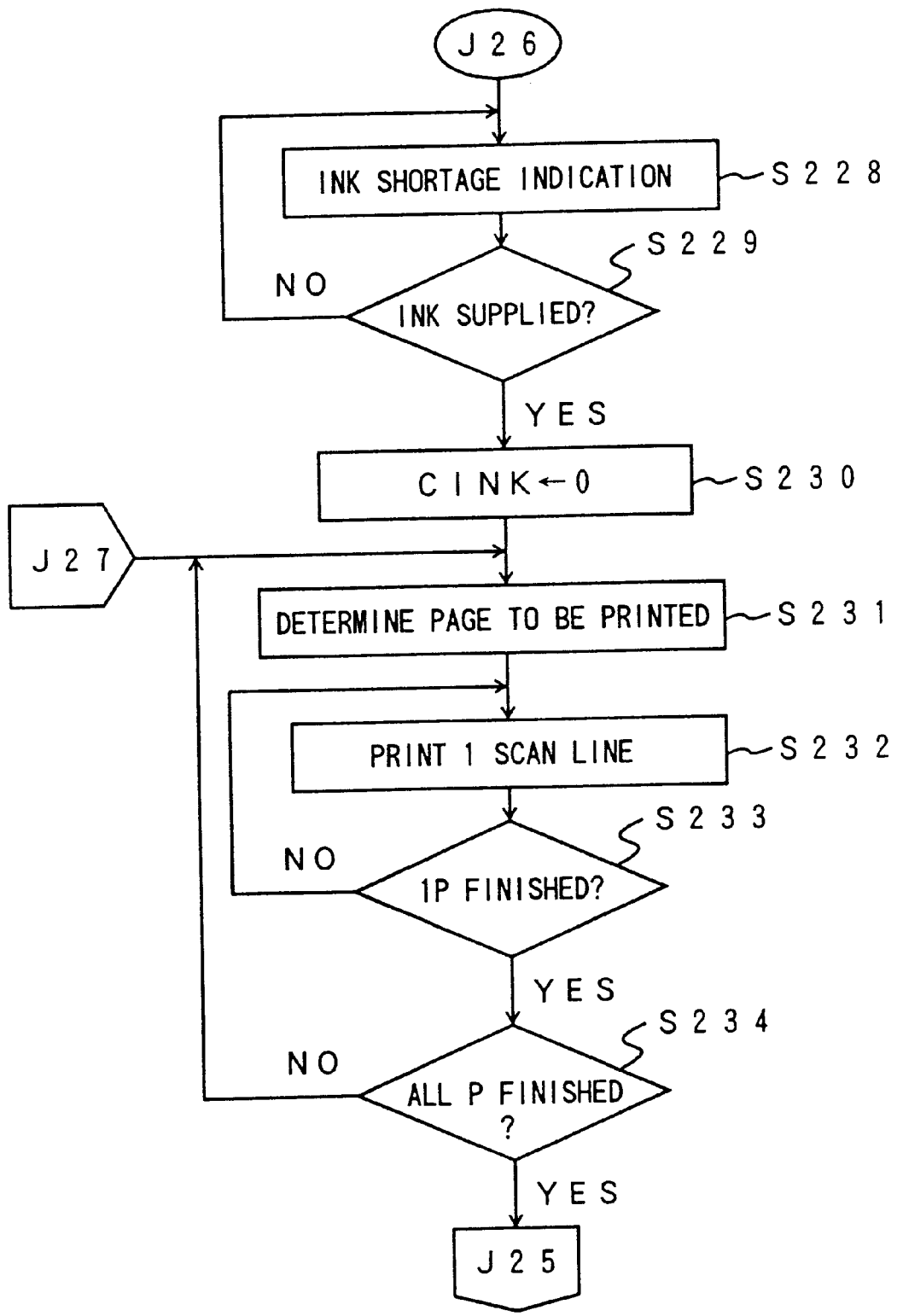

If a result of S328 is NO, it is determined that the ink shortage has occurred in the plotter 5. Then, S330 corresponding to S228 shown in FIG. 10B is performed. Operations performed in the steps starting from S330 are performed as the same as those of the corresponding steps starting from S228.

No step corresponding to S230 shown in FIG. 10B is included in the steps starting from S330 shown in FIG. 13B. Therefore, if a result of S331 corresponding to S229 shown in FIG. 10B is YES in FIG. 13B, S332 corresponding to S231 shown in FIG. 10B is performed soon. Further, if a result S335 corresponding to S234 shown in FIG. 10B is YES, S336 is performed before termination of the current sequence of operations. In S336, a current date is obtained from the clock provided in the facsimile apparatus, and the thus-obtained current date is set as a record date which is stored.

No step corresponding to S254 shown in FIG. 11B is included in the steps shown in FIG. 14B. Therefore, if a result of S355 corresponding to S253 is YES, S356 corresponding to S255 is performed soon.

Further, instead of S242A, 242B, and 242C shown in FIG. 11A, S344A, S344B, S344C and S344D shown in FIG. 14A are performed in the facsimile apparatus in the third embodiment. In S344A, S344B, S344C and S344D, the same operations as those performed in S326, S327, S328 and S329 are performed. If it is determined in S344 shown in FIG. 14A that the low ink density situation has occurred, S344A, S344B, S344C and S344D are performed. If a result of S344C corresponding to S328 is NO, meaning that the set variable DM is not larger than a predetermined reference value KA, operations starting from S350 corresponding to those starting from S248 shown in FIG. 11B is performed. If a result of S344C is YES, meaning that the set variable DM is larger than a predetermined reference value KA, S344D corresponding to S329 is performed. After that, operations starting from S337 corresponding to those starting from S235 shown in FIG. 11A are performed.

In each of the facsimile apparatuses in the first and second embodiments, the ink mark MK1 or MK2 is printed as shown in FIG. 3 for the purpose of detecting the low ink density situation. However, such ink marks are useless directly for the users and rather problematic. This is because the ink marks are printed out paper sheets PA together with images relevant to received image information and the ink marks thus may degrade the relevant images. Therefore, it is preferable that such ink marks are omitted.

In a facsimile apparatus of a fourth embodiment of the present invention, printing of such problematic ink marks is omitted from an operation for detecting the low ink density situation detection. In the fourth embodiment, a density of an actually printed image are measured. If the thus-measured density is equal to or larger than a predetermined threshold level, it is determined that the thus-printed image has sufficiently high densities. If the thus-measured density is less than the threshold level, it is determined that the low ink density situation has occurred.

Such a density of an actually printed image to be used in detecting the low ink density situation may be either an average one of densities of a part of an image or the highest one thereof (in the fourth embodiment, the average is used). If an average one of the densities is used, it is preferable that the threshold level to be used in the low ink density situation detection is not a fixed value but a variable varying depending on a black pixel ratio of received image information. The black pixel ratio is a ratio of a number of black pixels among the number of all pixels represented by a part of the received image information.

However, in the facsimile apparatus in the fourth embodiment, if the black pixel ratio of received image information is too small, a resulting average density has a too small value. If the average density value is too small, it may be not possible to perform accurate detection of the low ink density situation. In order to eliminate such a problem, it is possible to print the ink mark MK1 or MK2 only in a case where the average density is too low. Then, the thus-printed ink mark is used in detecting the low ink density situation in this case.

With reference to FIG. 15, one example of a density measuring means used in the facsimile apparatus in the fourth embodiment will now be described. Such a density measuring means is included in the control system included in the plotter 5.

In a structure shown in FIG. 15, to elements same as those shown in FIG. 4, reference signs the same as those of the corresponding elements shown in FIG. 4 are given, and description thereof will be omitted. In the structure shown in FIG. 15, the switch SW1 shown in FIG. 4 is not used, and instead of the comparator CP1 and reference value generator 20, an average calculating unit 21 is provided for receiving the reflectance signal PS1 supplied from the photo-transistor PT1. The average calculating unit 21 calculates an average of reflectance values carried by the reflectance signal PS1 and obtains a reflectance average as a result of the calculation. Then, the average calculating unit 21 obtains an density average MM as a result of subtracting the reflectance density value from a paper white level value. The thus-obtained density average MM is then supplied to the control unit 1 shown in FIG. 1. The control unit 1 may supply a reset signal RST to the average calculating unit 21. If the RST is supplied to the unit 21, a currently calculated value is initialized to be 0 in the unit 21.

Except for the above-described points, the facsimile apparatus in the fourth embodiment has the same structure as that of the facsimile apparatus in the first embodiment.

With reference to FIGS. 16, 17, 18, 19A and 19B, an example of an operation flow performed by the facsimile apparatus in the fourth embodiment of the present invention when the first facsimile apparatus has detected calling from the second facsimile apparatus will now be described. The second facsimile apparatus gives calling to the first facsimile apparatus so as to transmit a series of image information thereto. However, a structure of the facsimile apparatus in the fourth embodiment of the present invention is similar to that of the above-described facsimile apparatus in the first embodiment of the present invention. Therefore, the operation flow of the facsimile apparatus in the fourth embodiment of the present invention is similar to that of the above-described facsimile apparatus in the first embodiment of the present invention. Points at which the operation flow of the facsimile apparatus in the fourth embodiment of the present invention differs from that of the above-described facsimile apparatus in the first embodiment of the present invention will be mainly described.

In S401, S402, S403, S404, S405, S405A, S406, S407, S408, S409, S410, S411, S412, and S413, the facsimile apparatus in the fourth embodiment performs the same operations as those in S101, S102, S103, S104, S105, S105A, S106, S107, S108, S109, S110, S111, S112, and S113 shown in FIG. 6.

In S414, a page of the series of image information to be printed out is determined. In S415, the reset signal RST is supplied to the average calculating unit 21. For a region of the thus-determined page of the series of image information, the following operations are performed in a loop of S416, S417, S418, and S419. This region of the page of the series of image information is a region starting from the top of the page to a position corresponding to a position at which the ink mark MK1 is printed as shown in FIG. 3. Specifically, in each scan line of the series of image information is decoded through the coding and decoding unit 7 so as to obtain an original image part. In S416, using the thus-decoded data, the black pixel ratio for an area in the scan line is obtained, which area is an area which the sensor S1 can scan. Using the thus-calculated black pixel ratio, a page black pixel ratio RB is updated in S417. In S418, the scan line of the series of image information is printed out through the plotter 5.

If a result of S419 is YES, meaning that an image part corresponding to the above-mentioned region to the ink mark position of the page of the image information has been printed out, S420 is performed. It is determined in S420 whether or not the thus-updated page black pixel ratio RB is larger than a predetermined black pixel ratio Ra. If a result of S420 is YES, a threshold value TTr is calculated in S421 depending on the page black pixel ratio RB. An actual value of the threshold value TTr may be obtained, for example, using a linear function having a variable being the page black pixel ratio.

Then, in a loop of S422 and S423, until the page of the series of image information has been finished, the page of image information is, one scan line by one scan line, decoded through the coding and decoding unit 7 and then printed through the plotter 5. If a result of S423 is YES, meaning that the page of image information has been finished, a paper sheet PA having a relevant image printed thereon is ejected in S424.

If a result of S420 is NO, this means that the densities of the page are too low to be used in the detection of the low ink density situation has occurred. Therefore, the ink mark MK1 is printed, the printed densities of which mark are then used in this detection.

Specifically, if a result of S420 is NO, the scan line including the ink mark MK1 printing position is printed by the plotter 5 in S425, after being decoded by the coding and decoding unit 7 so as to obtain a corresponding part of the original image information. In this printing, an extent of the scan line is printed, the extent corresponding to the ink mark MK1 printing position, after image data of the extent of the scan line is replaced by solid black image data. The solid black image data results in a corresponding extent of a printed image being solid black. In S426, it is determined whether or not the currently processed page of the series of image information has been printed out. In S427, a predetermined value is set at the threshold value TTr. This predetermined value is a value corresponding to a normal printed density of the ink mark MK1. Then, S424 is performed. In S424, the paper sheet PA having a relevant image printed thereon is ejected.

After the page of series of image information has been thus finished and then the paper sheet PA has been ejected, the average MM is supplied from the density measuring means shown in FIG. 15 to the control unit 1 in S428. The average MM had been obtained as a result of the sensor S1 had been scanning the paper sheet PA as the paper sheet PA had been being ejected in S424. An extent on the paper sheet PA for which the sensor S1 scans so that the average MM may be obtained is an extent corresponding to a position at which the ink mark MK1 may be printed as shown in FIG. 3. In S429, it is determined whether or not the average MM is larger than the threshold value TTr.

A case where a result of S420 is YES, meaning that the page black pixel ratio is large enough may be a case where, for example, an image represented by the relevant input image data is an image of a picture represented by halftone. In such a case, almost all area of the printable area AR is occupied by halftone and thus the extent of the printable area AR corresponding to the ink mark MK1 printing position is occupied by halftone. Therefore, the maximum density average MMm obtained as a result of scanning the extent may result in the result YES of S429, meaning that the printed density is sufficiently high as long as no trouble is present in the plotter 5. On the other hand, if the relevant image to be printed is an image of a document consisting of letters, a result of S420 is ordinarily NO and then the ink mark MK1 is printed in S425.

If a result of S429 is YES, meaning that the image which was thus printed out has sufficiently high densities, it can be determined that the low ink density situation has not occurred in the plotter 5. Then, in S430, the thus-printed out page of the series of image information is deleted from the image data storing unit 8. Then, in S431, it is determined whether or not the series of image information includes other pages remaining than those already printed out. If a result of S431 is NO, S414 is then performed. In the steps starting from S414, a subsequent page of the series of image information is printed out. If a result of S431 is YES, meaning that printing of all the pages of the series of image information has been finished, the current sequence of operations is terminated.

If a result of S429 is NO, meaning that the low ink density situation has occurred, it can be determined that ink shortage has occurred in the plotter 5. Therefore, operations in S432, S433, S434, S435, S436, S437 and S438 corresponding to those of S125, S126, S127, S128, S129 and S130 are performed.

Figure 19A:
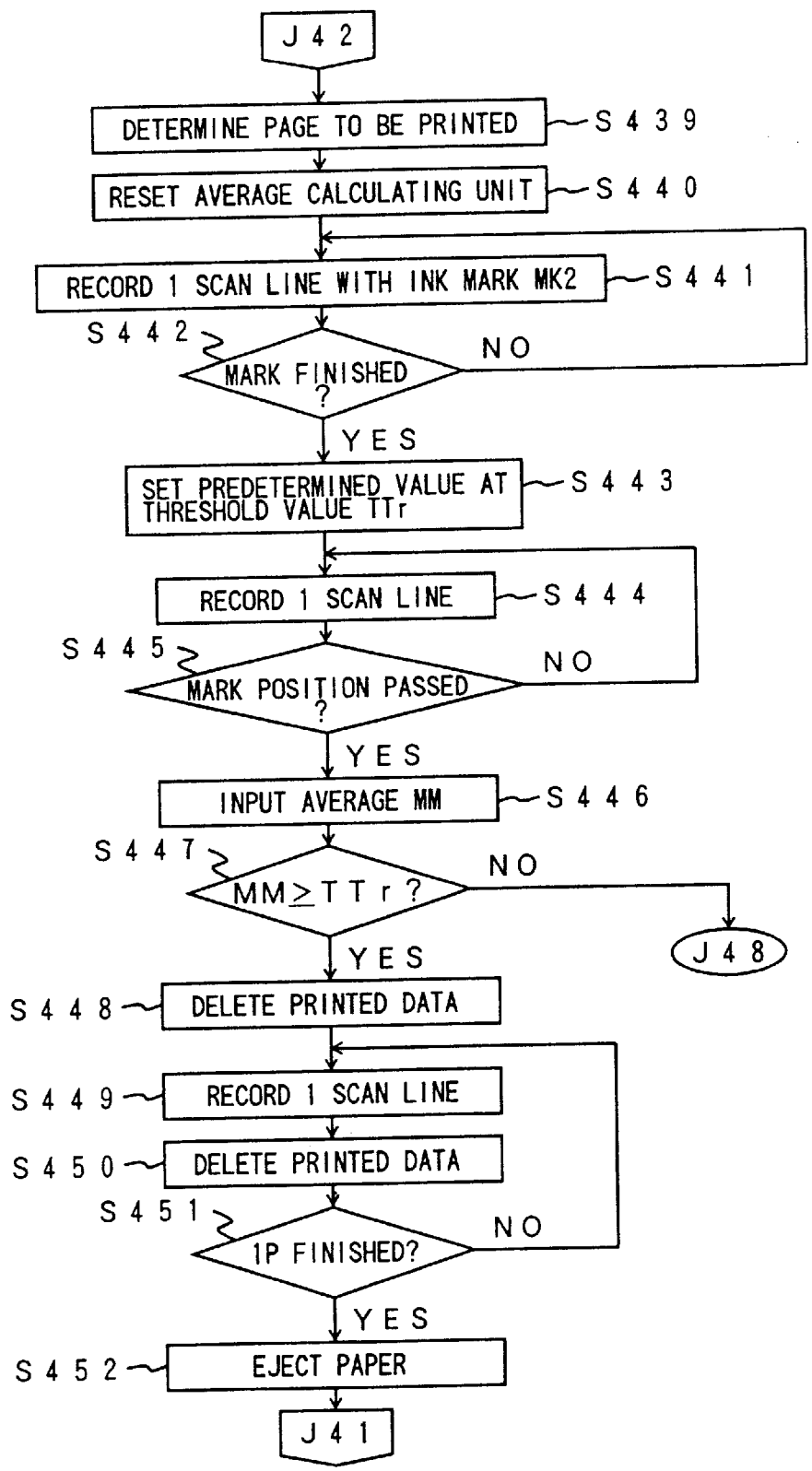

In FIG. 19A, S439, S441, S442, S444, S445, S448, S449, S450, S451 and S452 correspond to S131, S133, S134, S136, S137, S139, S140, S141, S142 and S143 shown in FIG. 8A respectively. However, S440 is provided instead of S132 shown in FIG. 8A, and S443 is provided instead of S135 shown in FIG. 8A. Further, S446 and S447 are provided instead of S138 shown in FIG. 8A.

In S440, the reset signal RST is supplied to the average calculating unit 21 and thus a currently calculated value is initialized to be 0 therein. After an image part including the ink mark MK2 has been printed, in S443, the predetermined value is set at the threshold value TTr, which predetermined value is the same as that used in S427.

If a result of S445 corresponding to S137 shown in FIG. 8A is YES, the average MM is supplied from the density measuring means shown in FIG. 15 to the control unit 1 in S428. The average MM was obtained as a result of the sensor S1 scanning the ink mark MK2 printed on the paper sheet PA while the paper sheet PA had been being moved with the scan lines being printed in a loop of S444 and S445. In S447, it is determined whether or not the average MM is larger than the threshold value TTr.

If a result of S447 is YES, it can be determined that the low ink density situation has not occurred and thus it can be determined that no ink shortage has occurred in the plotter 5. Then, S448 corresponding to S139 shown in FIG. 8A is performed. If a result of S447 is NO, it can be determined that the low ink density situation has occurred and thus it can be determined that ink shortage has occurred in the plotter 5. Then, S448 corresponding to S139 shown in FIG. 8A is performed. Then, operations in S453, S454, S455, S455A, S456, S457, and S458 corresponding to those of S144, S145, S146, S147, S148, S149 and S150 are performed.

An example of the threshold value TTr calculation depending on the page black pixel ratio RB in S421 will now be described. If 30%<(RB)≦50%, a reflectance average TS obtained as a result of averaging reflectance values carried by the reflectance signal PS1 shown in FIG. 15 while the sensor S1 is scanning the image having the page black pixel ratio RB is less than 1.8 volts. The above-mentioned paper white level value is 2.8 volts which is a reflectance value carried by the reflectance signal PS1 when the sensor S1 scans a white paper sheet PA. The threshold value TTr is obtained as being 1.0 volts as a result of subtracting the above-mentioned TS, 1.8 volts from the white paper level value 2.8 volts. Similarly, if 50<(RB)≦75, TS is less than 1.6 volts. Thus, TTr is 1.2 volts. Similarly, if 75<(RB)≦100, TS is less than 1.4 volts. Thus, TTr is 1.4 volts. Further, the predetermined value set in S427 may be, for example, 1.4 volts.

The above-described facsimile apparatus in the fourth embodiment of the present invention determines that ink shortage has occurs if it has been determined that low ink density situation has occurred. However, there is a possibility that the group of ink nozzles of the print head 18 have been blocked. If the ink nozzles have been blocked, a resulting printed image may not have sufficiently high densities although a sufficient amount of ink is contained in the ink tank of the plotter 5. As mentioned above for the second embodiment, in such a case, if the operator supplies ink to the ink tank, a problematic situation that the printing operation cannot be performed with sufficiently high densities remains. In this case, the ink supply was meaningless.

A group 3 facsimile apparatus in a fifth embodiment of the present invention will now be described. The facsimile apparatus in the fifth embodiment detects the ink nozzle blockages and the above-described blockage removal mechanism which is provided in the apparatus is operated. Thus, the blockages such as solidified ink from the group of ink nozzles are removed. After that, the normal printing operation can be performed such that resulting printed images has normal densities.

In the facsimile apparatus in the fifth embodiment, if it has been determined that low ink density situation has occurred even immediately after an operator has supplied ink to the ink tank of the plotter 5, the apparatus determines that the ink nozzle have been blocked. Then, the apparatus causes the blockage removal mechanism to remove the blockages from the ink nozzles. Then, the apparatus can continues the reception operation. As a result, working of the facsimile apparatus is prevented from being halted due to the above-mentioned remaining of the problematic situation that the printing operation cannot be performed with sufficiently high densities. Especially, such an automatic ink nozzle blockage removal method as that mentioned above is effective for a facsimile apparatus using an ink-jet printer which has the print head and an ink cartridge (including the ink tank) integrated to be one body together. This is because, if the print head and ink cartridge are integrated to be one body, replacement of the ink tank means the replacement of the body of the print head and ink cartridge. Thus, the replacement costs much. The above-mentioned automatic blockage removal may eliminate meaningless replacement of the body of the print head and ink cartridge.

With reference to FIGS. 20, 21, 22, 23A and 23B, an example of an operation flow performed by the facsimile apparatus in the fifth embodiment of the present invention when the first facsimile apparatus has detected calling from the second facsimile apparatus will now be described. The second facsimile apparatus gives calling to the first facsimile apparatus so as to transmit a series of image information thereto. However, a structure of the facsimile apparatus in the fifth embodiment of the present invention is similar to that of the above-described facsimile apparatus in the fourth embodiment of the present invention. Therefore, the operation flow of the facsimile apparatus in the fifth embodiment of the present invention is similar to that of the above-described facsimile apparatus in the fourth embodiment of the present invention. Points at which the operation flow of the facsimile apparatus in the fifth embodiment of the present invention differs from that of the above-described facsimile apparatus in the fourth embodiment of the present invention will be mainly described.

Figure 16:
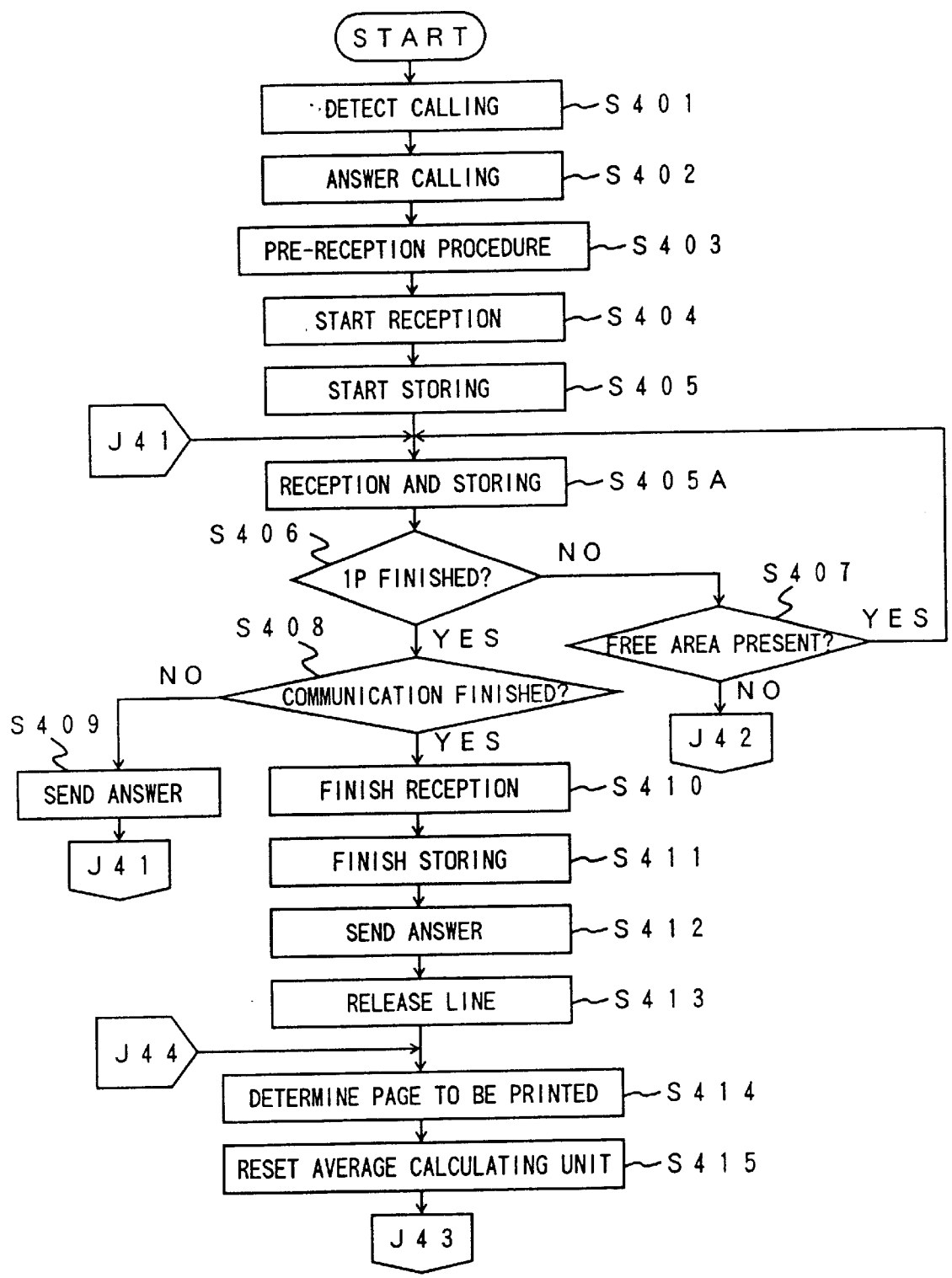
FIGS. 16, 17, 18, 19A and 19B show an example of an operating flow performed by the facsimile apparatus in the fourth embodiment of the present invention when detecting calling from another apparatus.
Figure 20:
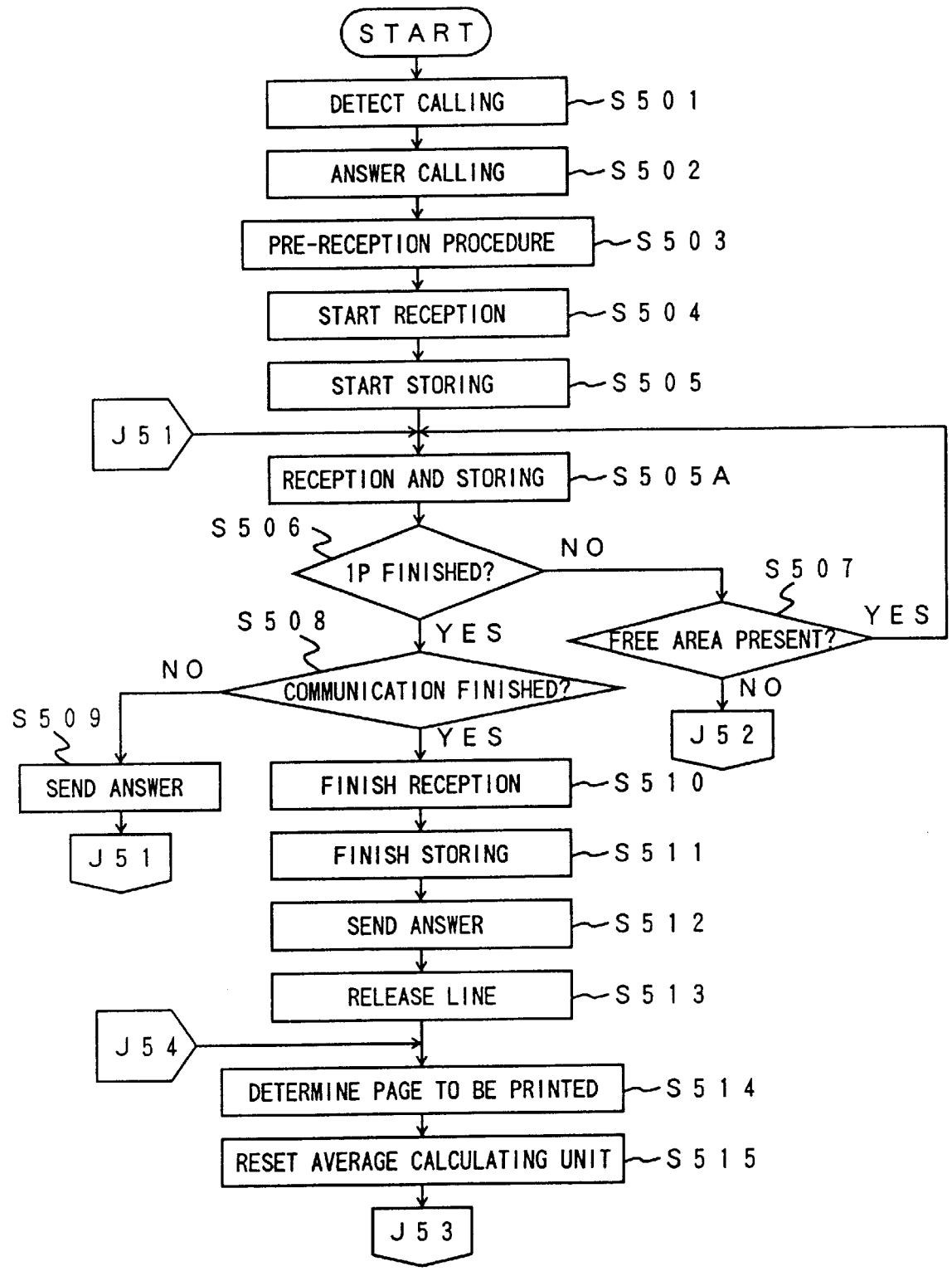
FIGS. 20, 21, 22, 23A and 23B show an example of an operating flow performed by the facsimile apparatus in the fifth embodiment of the present invention when detecting calling from another apparatus.

The operations of S501, S502, S503, S504, S505, S505A, S506, S507, S508, S509, S510, S511, S512, S513, S514, and S515 shown in FIG. 20 are the same as those of S401, S402, S403, S404, S405, S405A, S406, S407, S408, S409, S410, S411, S412, S413, S414, and S415 shown in FIG. 16.

Figure 17:
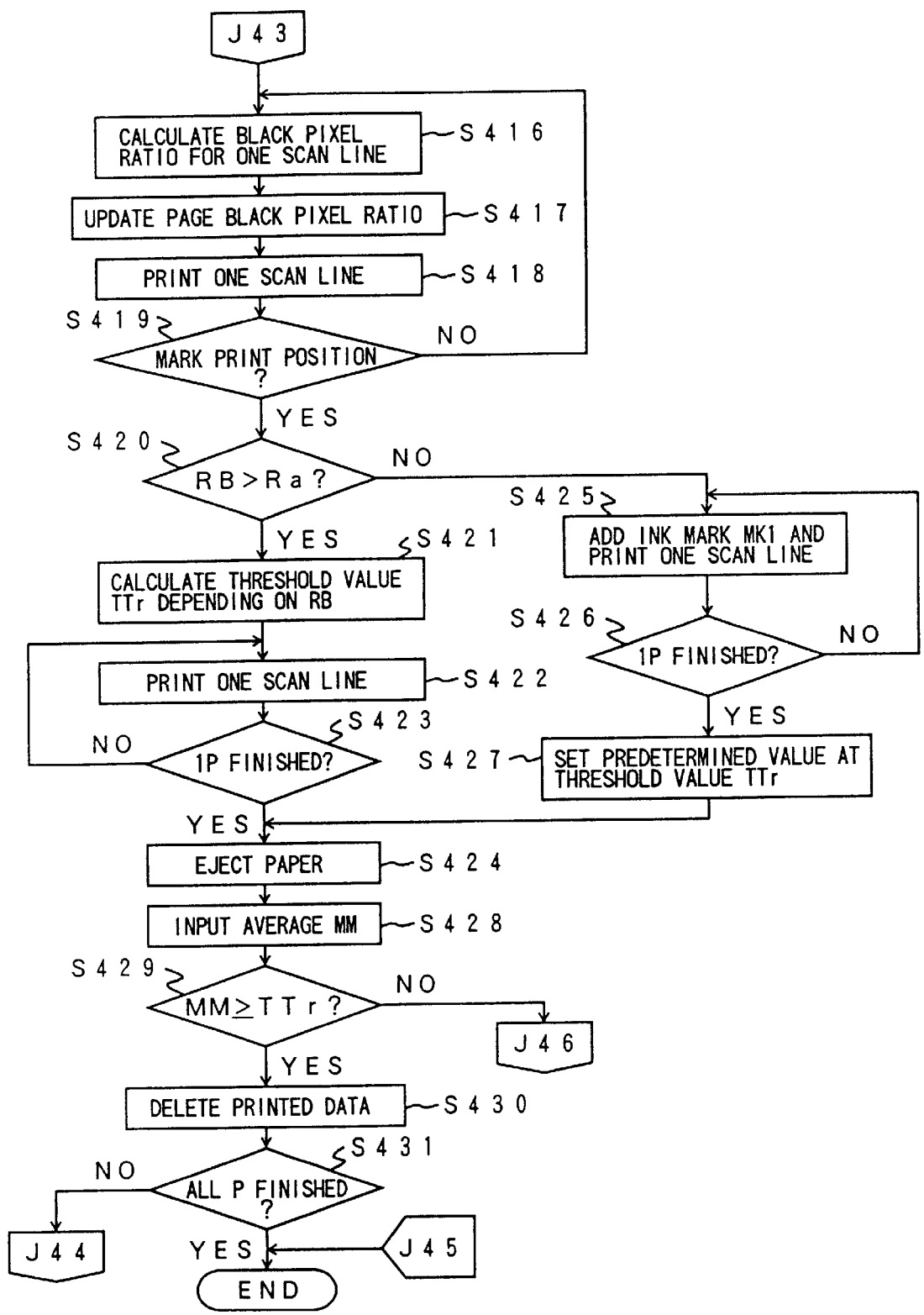
Figure 21:
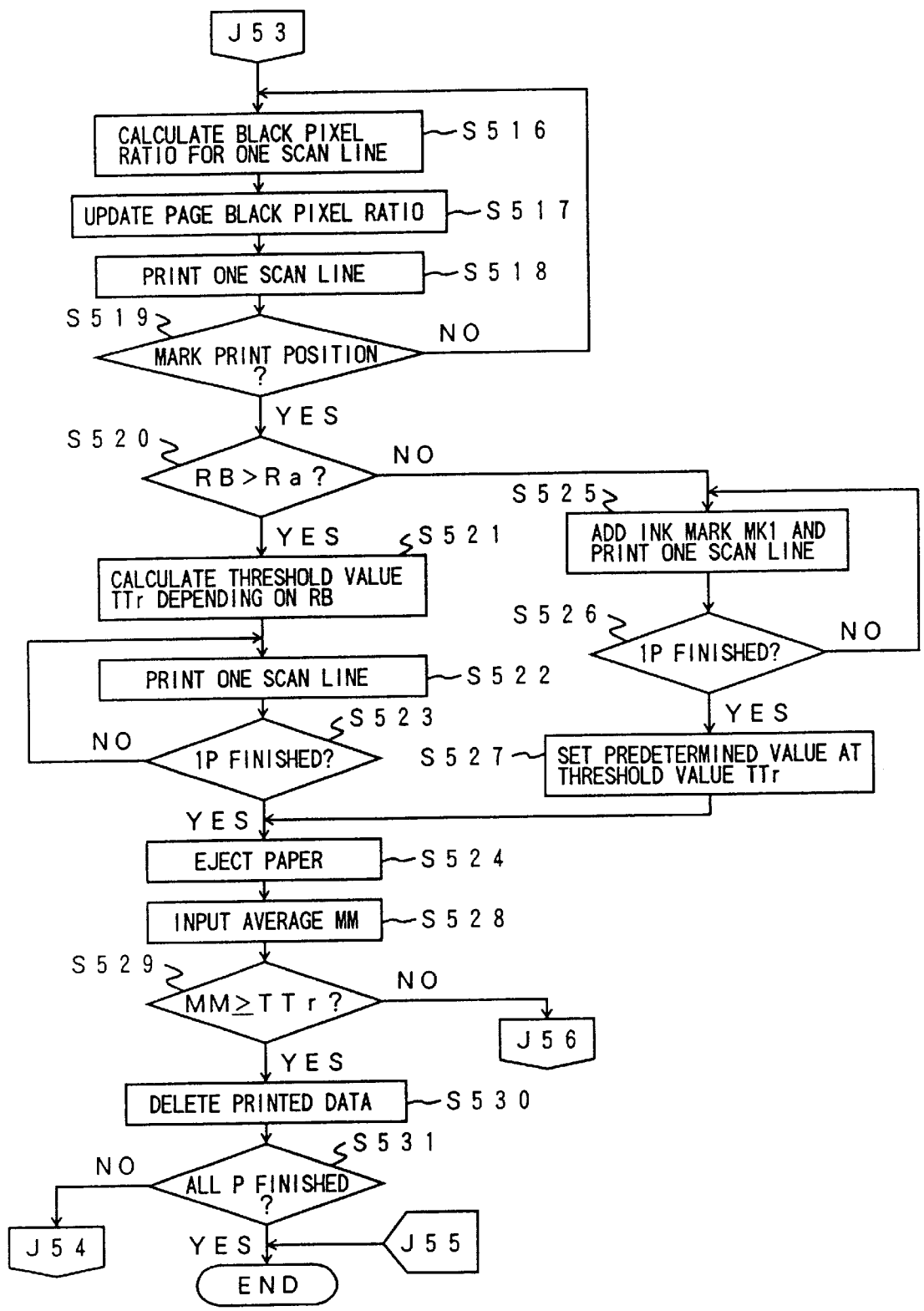

The operations of S516, S517, S518, S519, S520, S521, S522, S523, S524, S525, S526, S527, S528, S529, S530, and S531 shown in FIG. 21 are the same as the operations of S416, S417, S418, S419, S420, S421, S422, S423, S424, S425, S426, S427, S428, S429, S430, and S431 shown in FIG. 17.

Figure 22:
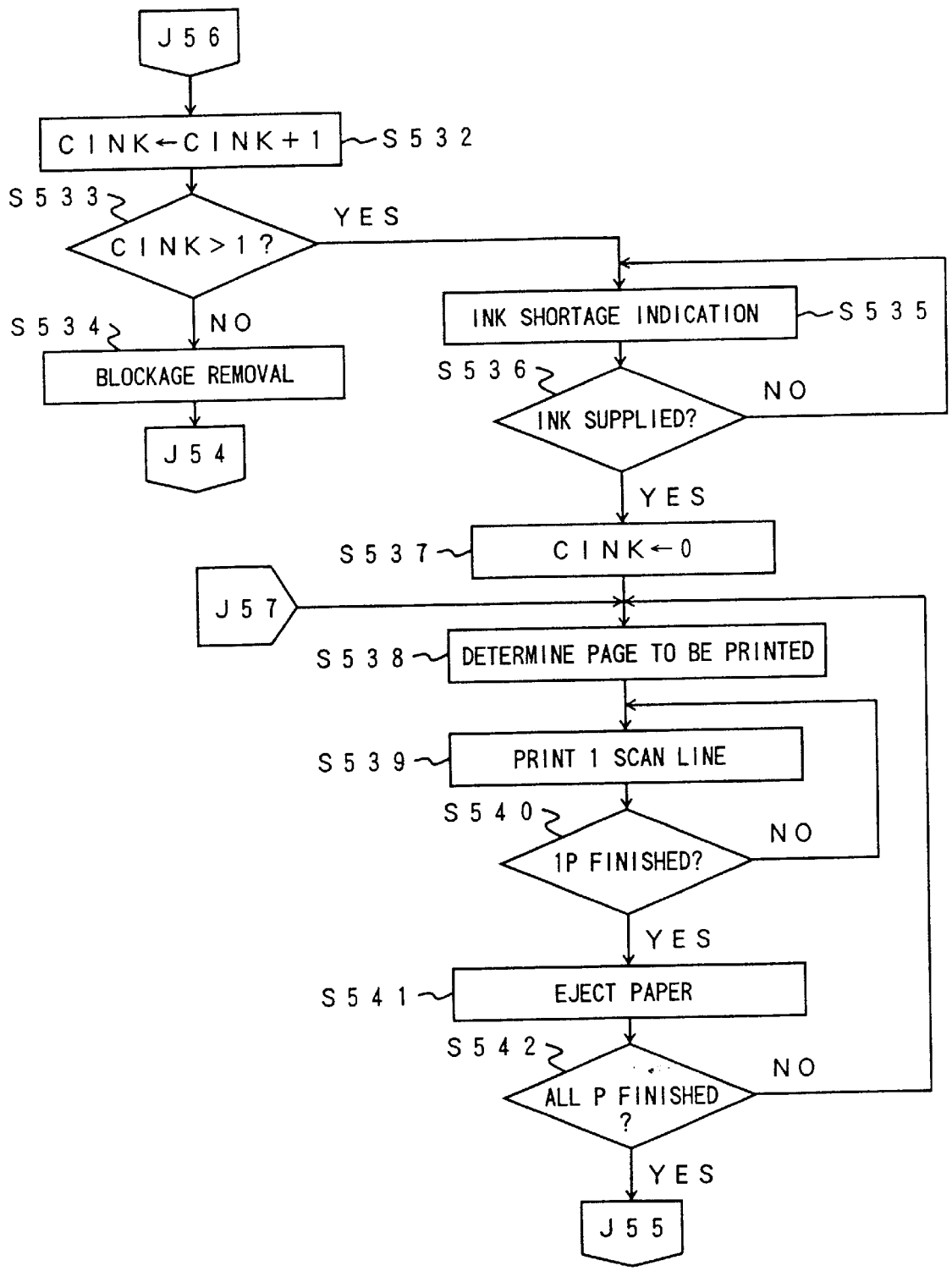

The operations of S532, S533, S534, S535, S536, S537, S538, S539, S540, S541, and S542 shown in FIG. 22 are the same as those of S225, S226, and S227 shown in FIG. 10A, and S228, S229, S230, S231, S232, S233, and S234 shown in FIG. 10B. Thus, the operations performed in the facsimile apparatus in the second embodiment are used instead of the operations shown in FIG. 18 of the apparatus in the fourth embodiment.

Operations of S543, S544, S545, S546, S547, S548, S549, S550, S551, S552, S553, S554, S555, and S556 are the same as those of S439, S440, S441, S442, S443, S444, S445, S446, S447, S448, S449, S450, S451, and S452 shown in FIG. 19A. However, S551A, S551B, and S551C are added as contrasted with the operations shown in FIG. 19A. The operations of S551A, S551B, and S551C are the same as those of S242A, S242B and S242C shown in FIG. 11A.

Figure 19B:
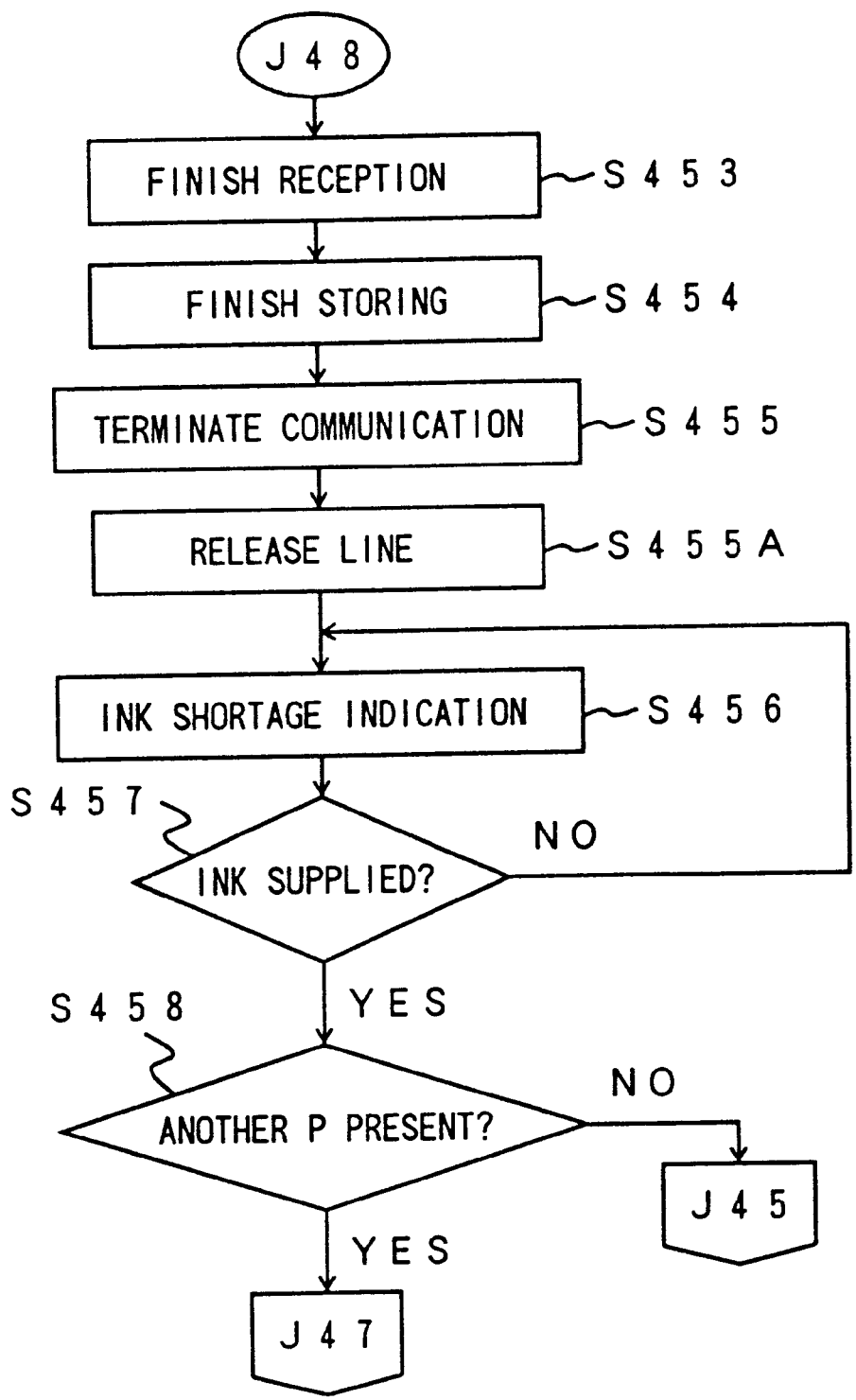
Figure 23A:
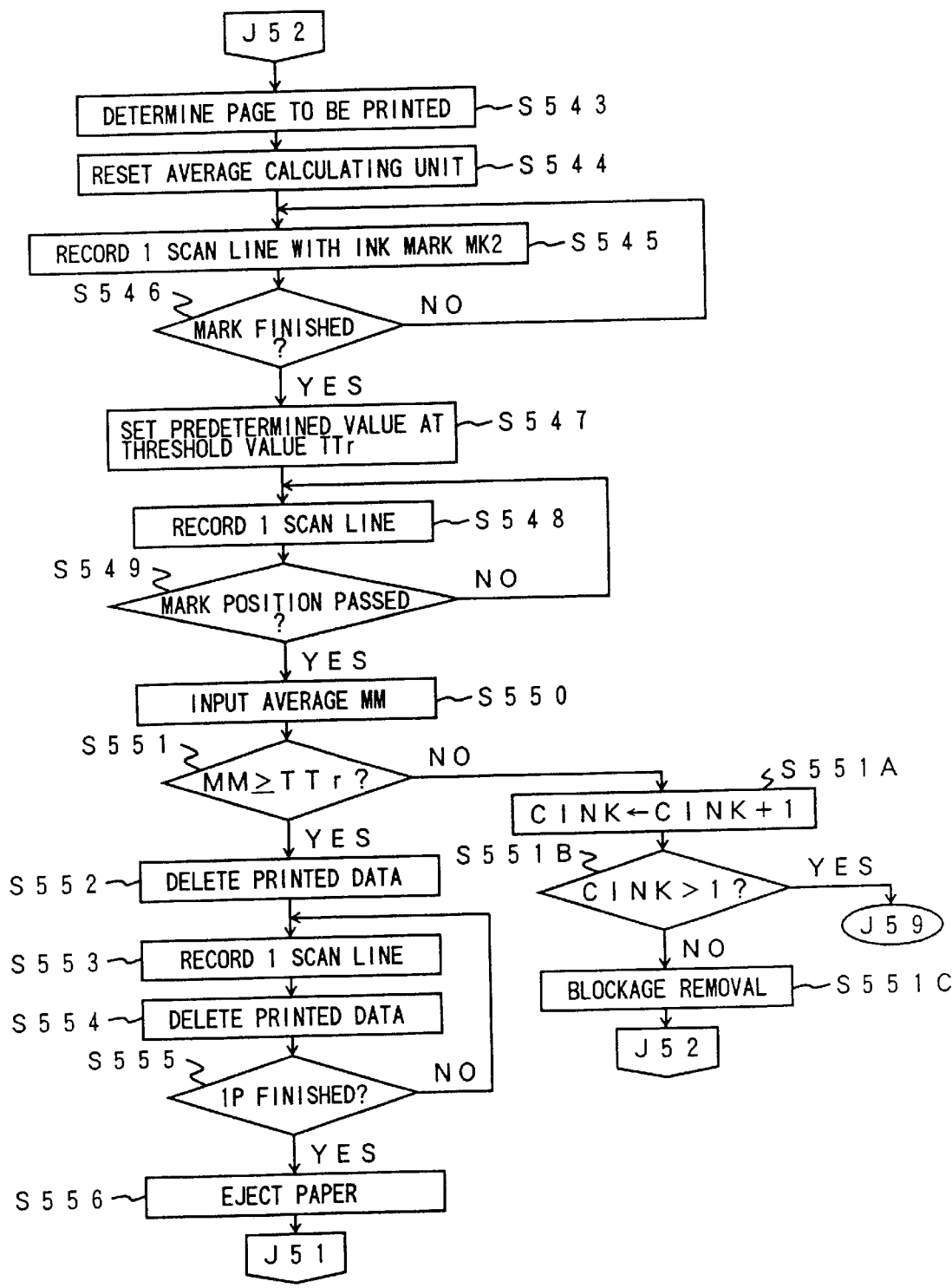
Figure 23B:
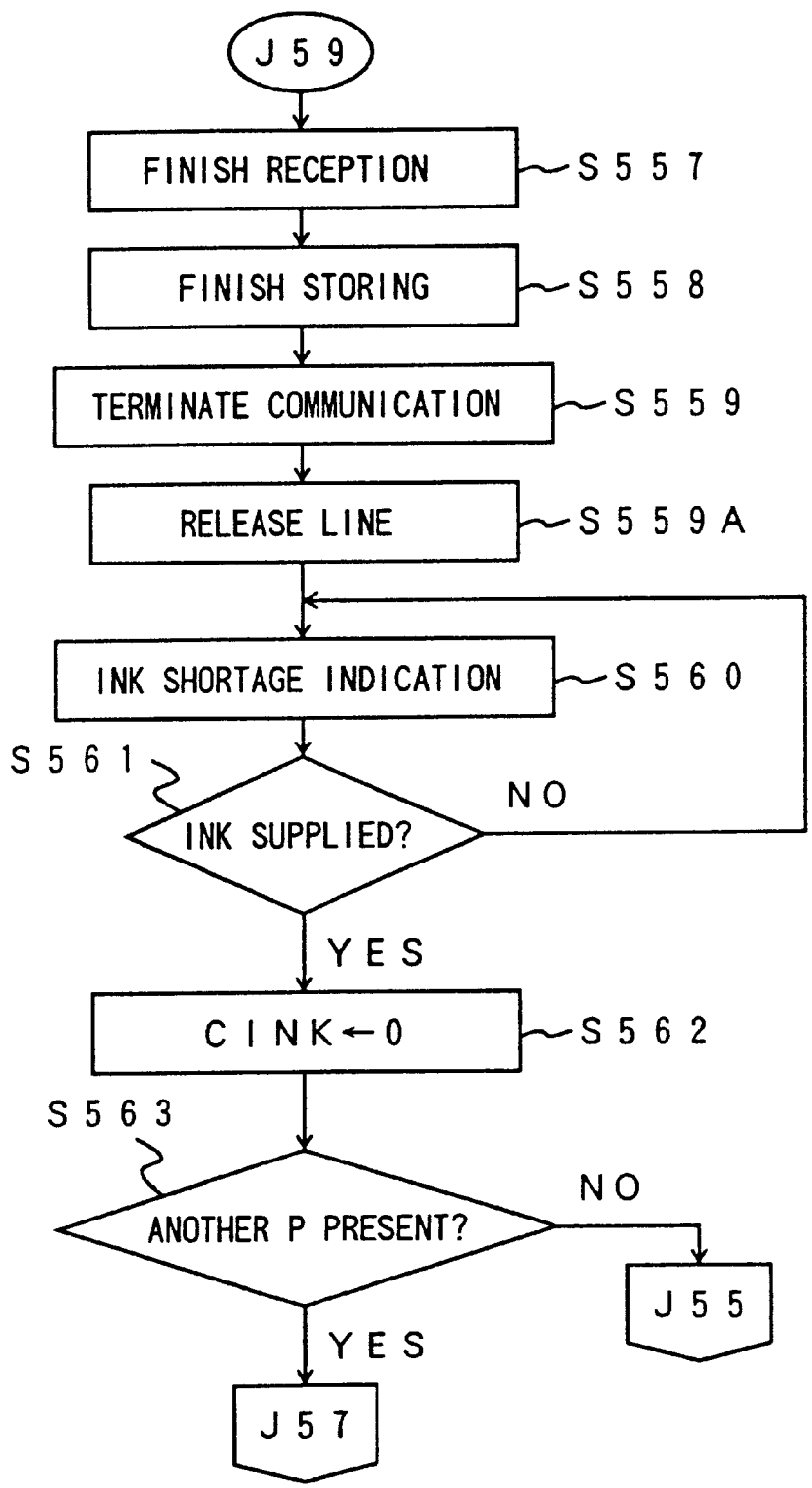

Further, operations of S557, S558, S559, S559A, S560, S561, and S563 shown in FIG. 23B correspond to S453, S454, S455, S455A, S456, S457, and S458 shown in FIG. 19B, respectively. However, S562 is inserted as contrasted with the operations show in FIG. 19B. Thus, the operations of S557, S558, S559, S559A, S560, S561, S562 and S563 shown in FIG. 23B are the same as those of S248, S249, S250, S251, S252, S253, S254 and S255 shown in FIG. 11B.

The above-described facsimile apparatus in the fifth embodiment of the present invention determines that the first occurrence of the low ink situation after ink supply has occurred due to the ink nozzle blockage in the print head 18. However, as mentioned above, a method for determining the ink nozzle blockage is not limited to the above-mentioned method. Instead of that, for example, another method will now be described. As mentioned above, if the facsimile apparatus has not performed the printing operation, that is, the plotter 5 has not been used for long time such as, for example, 3 days, ink nozzle blockage is likely to occur due to drying of ink remaining in the group of ink nozzles. Therefore, by measuring a time from a time the plotter 5 performed the printing operation last to a time the low ink density situation has occurred, if the thus-measured time is longer than a predetermined value, such as, for example, 3 days, the currently occurred low ink density situation has occurred due to the ink nozzle blockage. If the thus-measured time is equal to or shorter than the predetermined value, the currently occurred low ink density situation has occurred due to the ink shortage. A group 3 facsimile apparatus in a sixth embodiment of the present invention uses this method.

With reference to FIGS. 24, 25, 26, 27A and 27B, an example of an operation flow performed by the facsimile apparatus in the sixth embodiment of the present invention when the first facsimile apparatus has detected calling from the second facsimile apparatus will now be described. The second facsimile apparatus gives calling to the first facsimile apparatus so as to transmit a series of image information thereto. However, a structure of the facsimile apparatus in the sixth embodiment of the present invention is similar to that of the above-described facsimile apparatus in the fifth embodiment of the present invention. Therefore, the operation flow of the facsimile apparatus in the sixth embodiment of the present invention is similar to that of the above-described facsimile apparatus in the fifth embodiment of the present invention. Points at which the operation flow of the facsimile apparatus in the sixth embodiment of the present invention differs from that of the above-described facsimile apparatus in the fifth embodiment of the present invention will be described.

Figure 24:
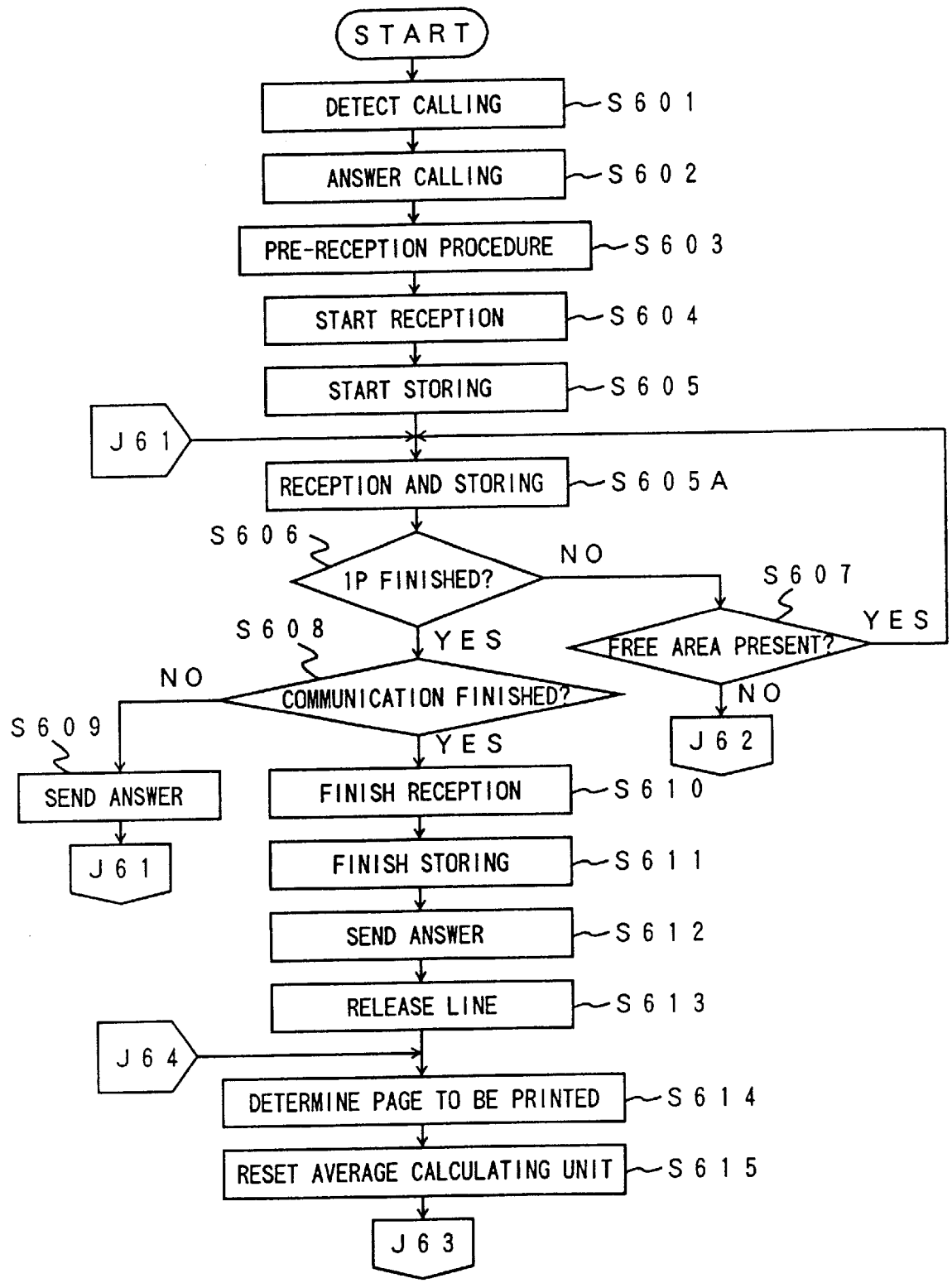
FIGS. 24, 25, 26, 27A and 27B show an example of an operating flow performed by the facsimile apparatus in the sixth embodiment of the present invention when detecting calling from another apparatus.

Operations in S601, S602, S603, S604, S605, S605A, S606, S607, S608, S609, S610, S611, S612, S613, S614 and S615 shown in FIG. 24 are the same as the operations in S501, S502, S503, S504, S505, S505A, S506, S507, S508, S509, S510, S511, S512, S513, S514 and S515 shown in FIG. 10.

Figure 25:
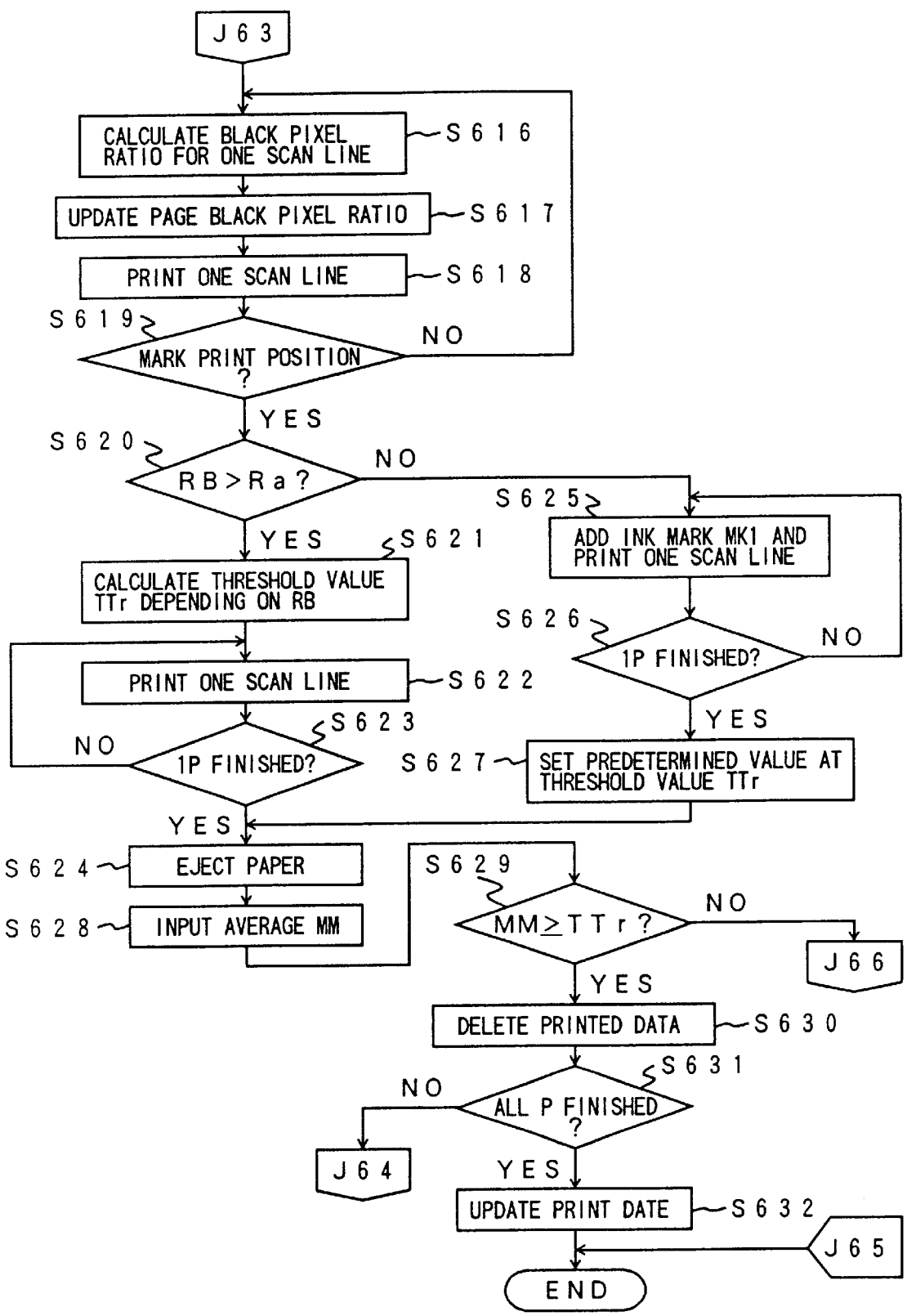

Operations in S616, S617, S618, S619, S620, S621, S622, S623, S624, S625, S626, S627, S628, S629, S630 and S631 shown in FIG. 25 are the same as those in S516, S517, S518, S519, S520, S521, S522, S523, S524, S525, S526, S527, S528, S529, S530 and S531 shown in FIG. 21. However, S632, an operation of which is the same as that of S325 shown in FIG. 13A of the facsimile apparatus in the third embodiment is inserted immediately after S631 corresponding to S531.

Figure 26:
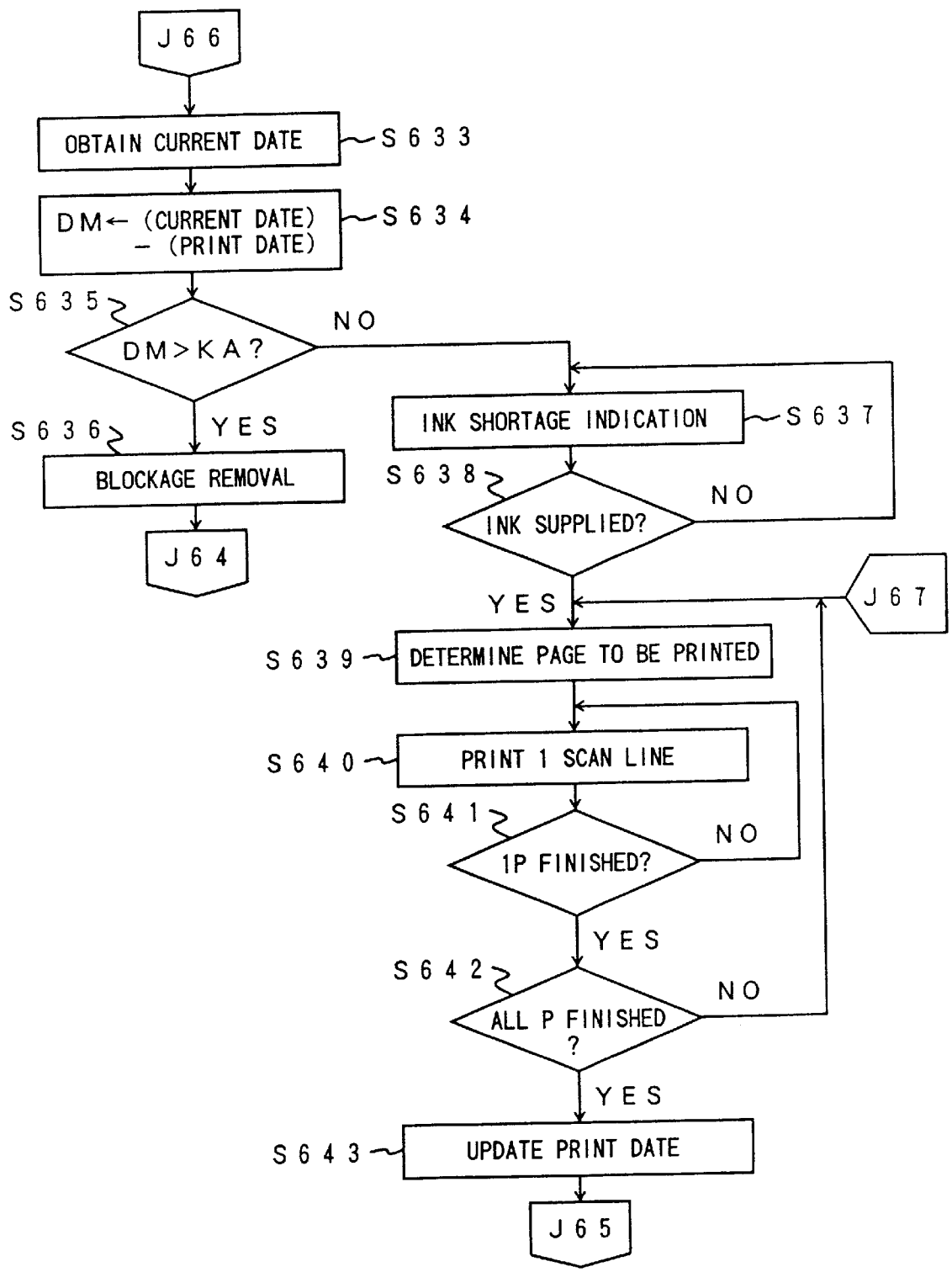

Operations in S633, S634, S635, S636, S637, S638, S639, S640, S641, S642 and S643 shown in FIG. 26 are the same as the operations in S326, S327, S328, S329, S330, S331, S332, S333, S334, S335 and S336 shown in FIGS. 13A and 13B of the facsimile apparatus in the third embodiment.

Figure 27A:
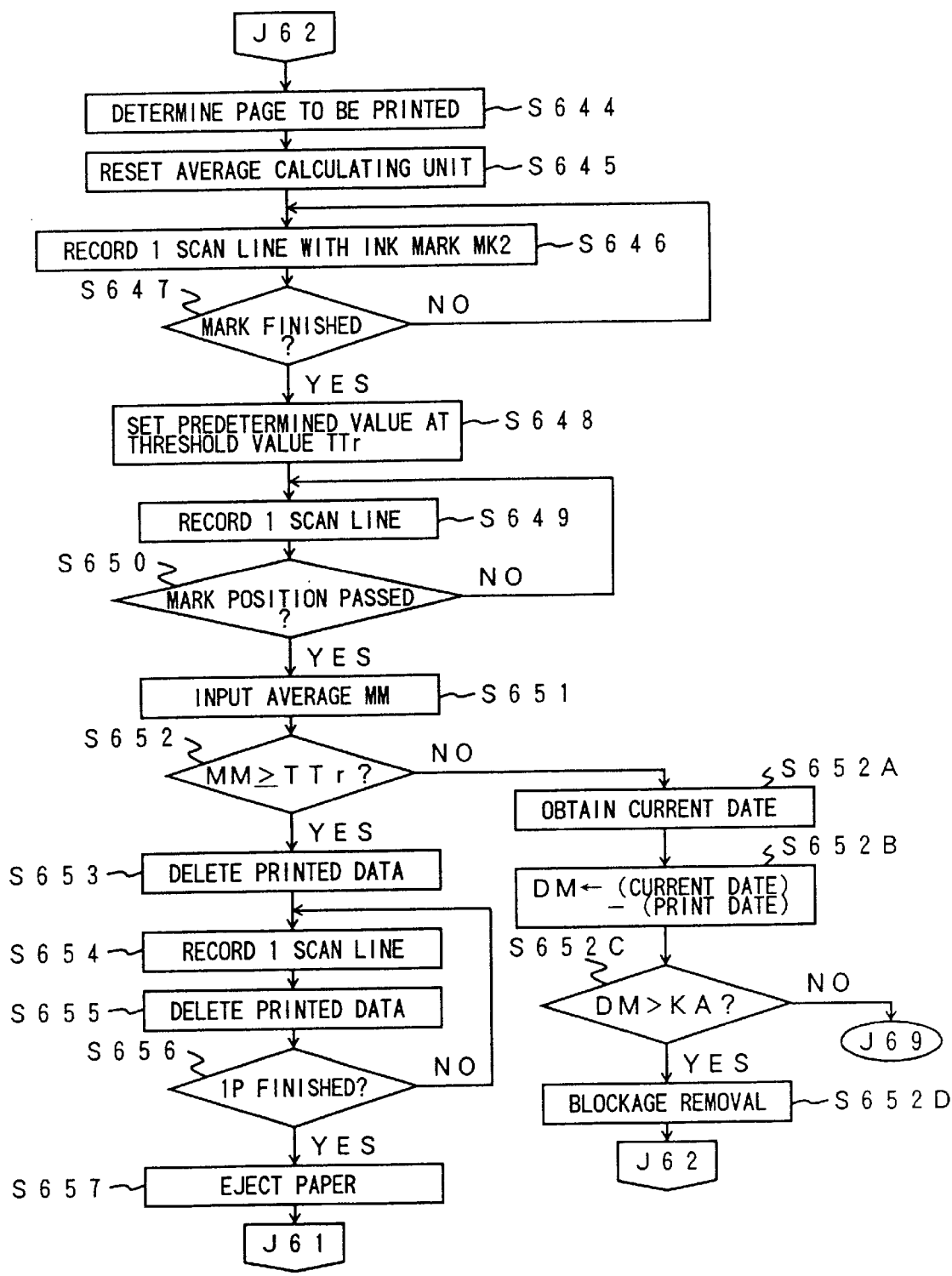
Figure 27B:
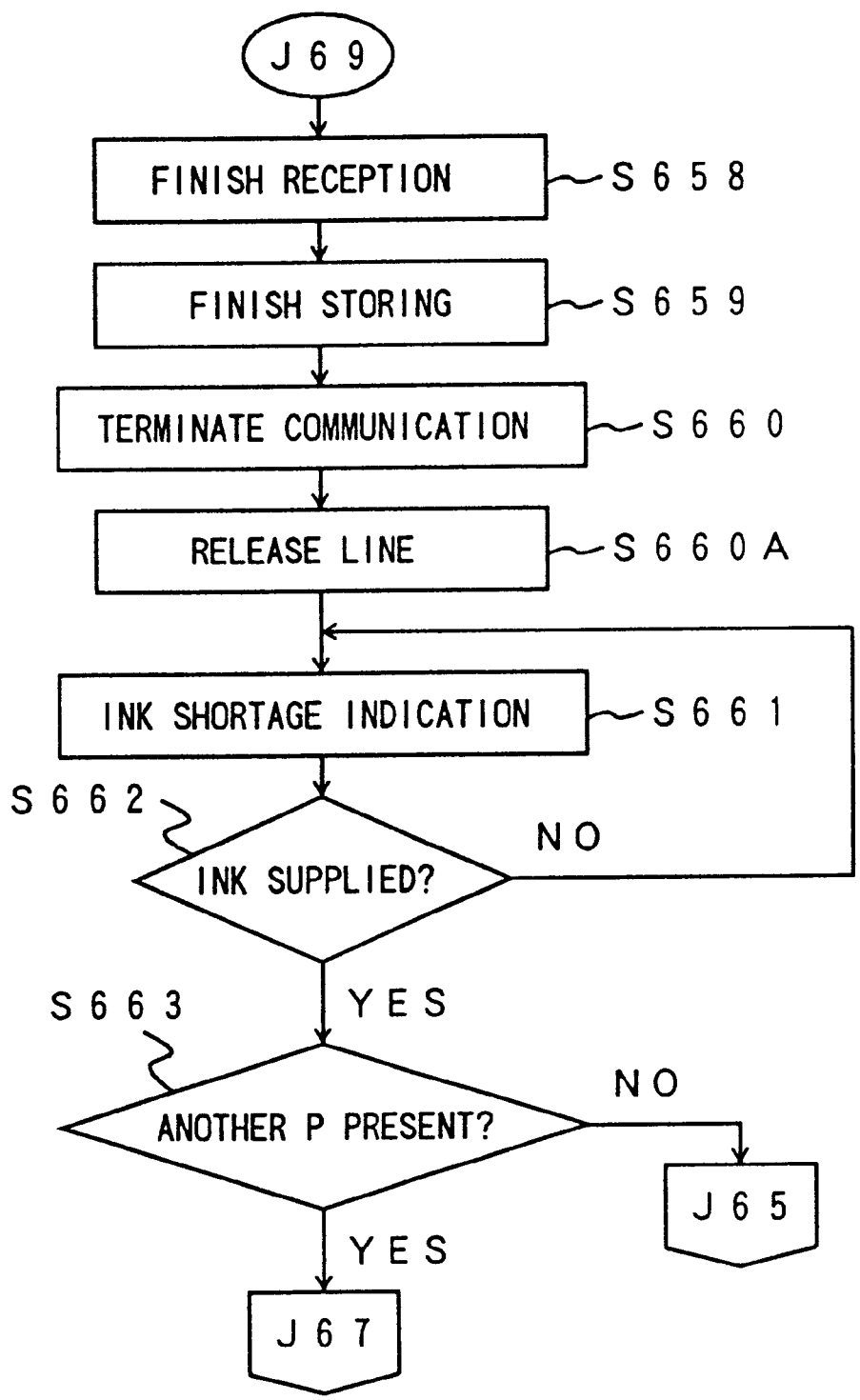

Operations in S644, S645, S646, S647, S648, S649, S650, S651, S652, S653, S654, S655, S656, S657, S658, S659, S660, S660A, S661, S662 and S663 shown in FIGS. 27A and 27B are the same as those in S439, S440, S441, S442, S443, S444, S445, S446, S447, S448, S449, S450, S451, S452, S453, S454, S455, S455A, S456, S457 and S458 shown in FIGS. 19A and 19B of the facsimile apparatus in the fourth embodiment. However, operations of S652A, S652B, S652C and S652D, the same as the operations of S344A, S344B, S344C and S344D shown in FIG. 14B of the facsimile apparatus in the third embodiment, are additionally performed as contrasted with the operations shown in FIGS. 19A and 19B.

Figure 28:
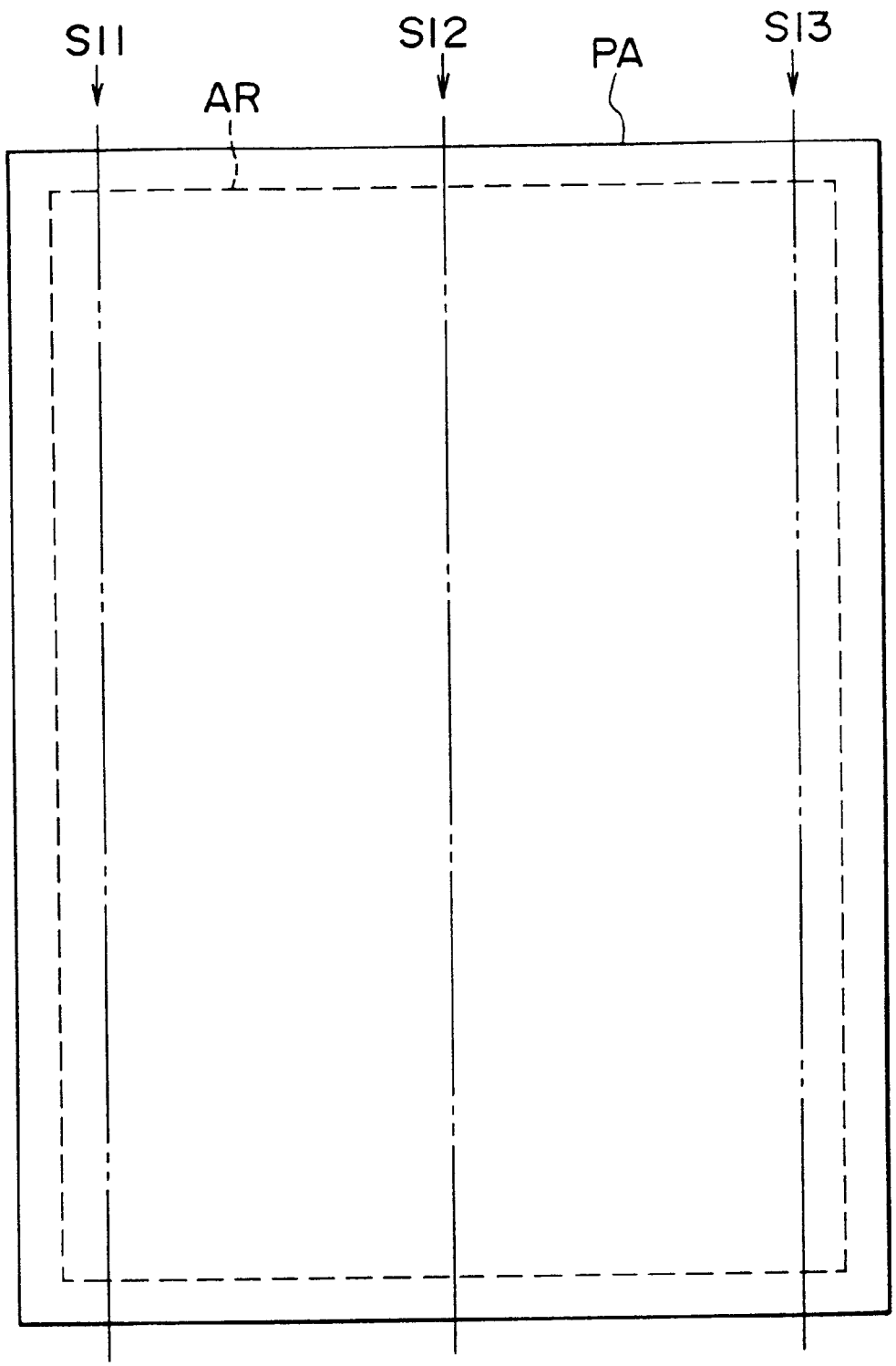
FIG. 28 shows positions sensors to scan an image printed by the facsimile apparatuses in the seventh through ninth embodiment of the present invention.

Each of the above-described facsimile apparatuses in the fourth, fifth, sixth embodiments uses a single sensor S1 shown in FIG. 2 for measuring image densities on a paper sheet PA so as to detect the low ink density situation. However, if, instead of using a single sensor, a plurality of sensors are used for the same purpose, the image densities can be measured more finely and thus the low ink density situation detection can be performed more accurately. A facsimile apparatus in a seventh embodiment of the present invention which will now be described uses three sensors S1, S12 and S13. Each of the three sensors is located in the plotter 5 as shown in FIG. 2. As shown in FIG. 28, the sensor S11 is used to scan a paper sheet PA so as to measure image densities along a line near the left edge of a printable area AR on the paper sheet PA. Similarly, the sensor S12 is used to scan the paper sheet along a center line of the printable area, and the sensor S13 is used to scan the paper sheet so as to measure image densities along a line near the right edge of the printable area AR.

Further, the control system included in the plotter 5 of the facsimile apparatus in the seventh embodiment has density measuring means shown in FIG. 29. A structure of the density measuring means shown in FIG. 29 includes three of a structure of the density measuring means shown in FIG. 15. Each of the three sensors: S11 including a light emitting diode PD11 and a photo-transistor PT11, S12 including a light emitting diode PD12 and a photo-transistor PT12, and S13 including a light emitting diode PD13 and a photo-transistor PT13 corresponds to the sensor S1 including the light emitting diode PD1 and photo-transistor PT1.

Each of reflectance signals PS11, PS12 and PS13 supplied by the sensors S11, S12 and S13 respectively corresponds to the reflectance signal PS1 supplied by the sensor S1. Similarly, each of the three average calculating unit 22, 23 and 24 shown in FIG. 29 corresponds to and has the same function as that of the average calculating unit 21 shown in FIG. 15. The average calculating units 22, 23 and 24 supply density averages MM1, MM2 and MM3, respectively, each of the density averages supplied as a result of processing a respective one of the reflectance signals PS11, PS12 and PS13 corresponding to the density average MM supplied as result of processing the reflectance signal PS1.

Further, the reset signal RST supplied by the control unit 1 is supplied to and then initialize a current calculation value to be 0 in each of the average calculating units 22, 23 and 24.

Except for the above-described points, the facsimile apparatus in the seventh embodiment has the same structure as that of the facsimile apparatus in the fourth embodiment.

The facsimile apparatus in the seventh embodiment is thus almost the same as the above-described facsimile apparatus in the fourth embodiment. Therefore, an operation flow of the facsimile apparatus in the seventh embodiment of the present invention is similar to that of the above-described facsimile apparatus in the fourth embodiment of the present invention. Points at which the operation flow of the facsimile apparatus in the seventh embodiment of the present invention differs from that of the above-described facsimile apparatus in the fourth embodiment of the present invention will be mainly described.

Figure 30:
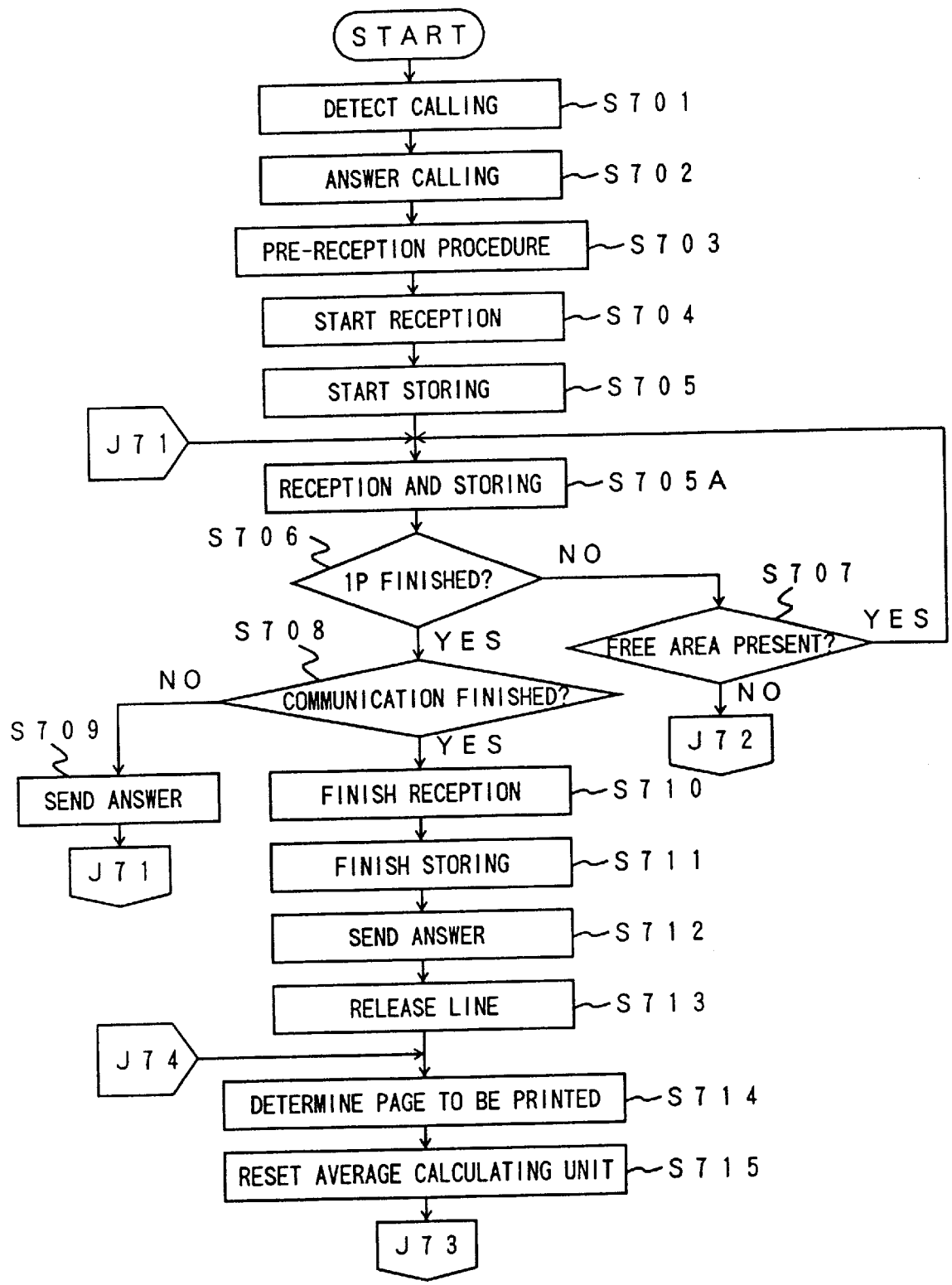
FIGS. 30, 31, 32, 33A and 33B show an example of an operating flow performed by the facsimile apparatus in the seventh embodiment of the present invention when detecting calling from another apparatus.

The operations of S701, S702, S703, S704, S705, S705A, S706, S707, S708, S709, S710, S711, S712, S713, S714, and S715 shown in FIG. 30 are the same as those of S401, S402, S403, S404, S405, S405A, S406, S407, S408, S409, S410, S411, S412, S413, S414, and S415 shown in FIG. 16.

Figure 18:
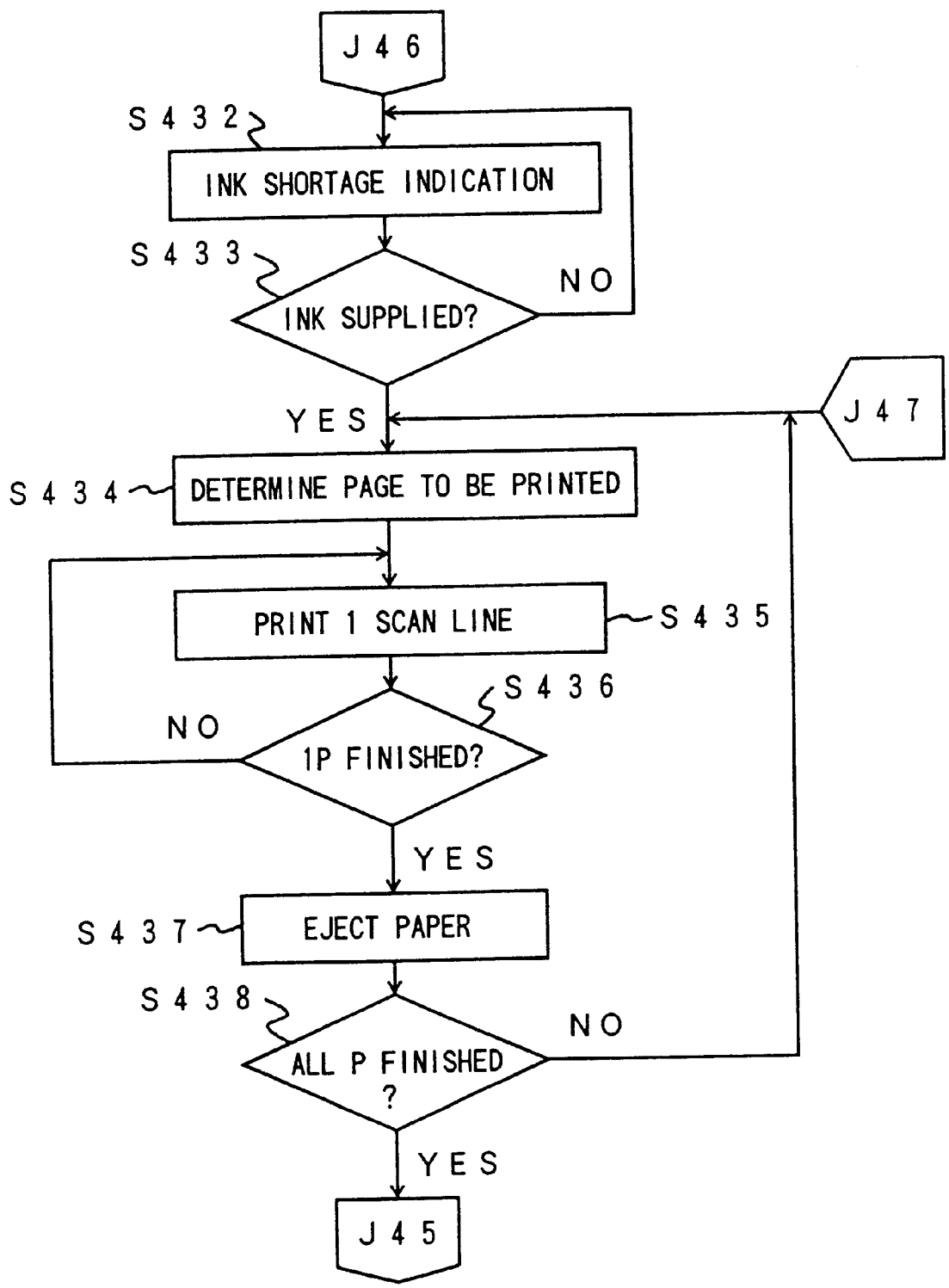
Figure 31:
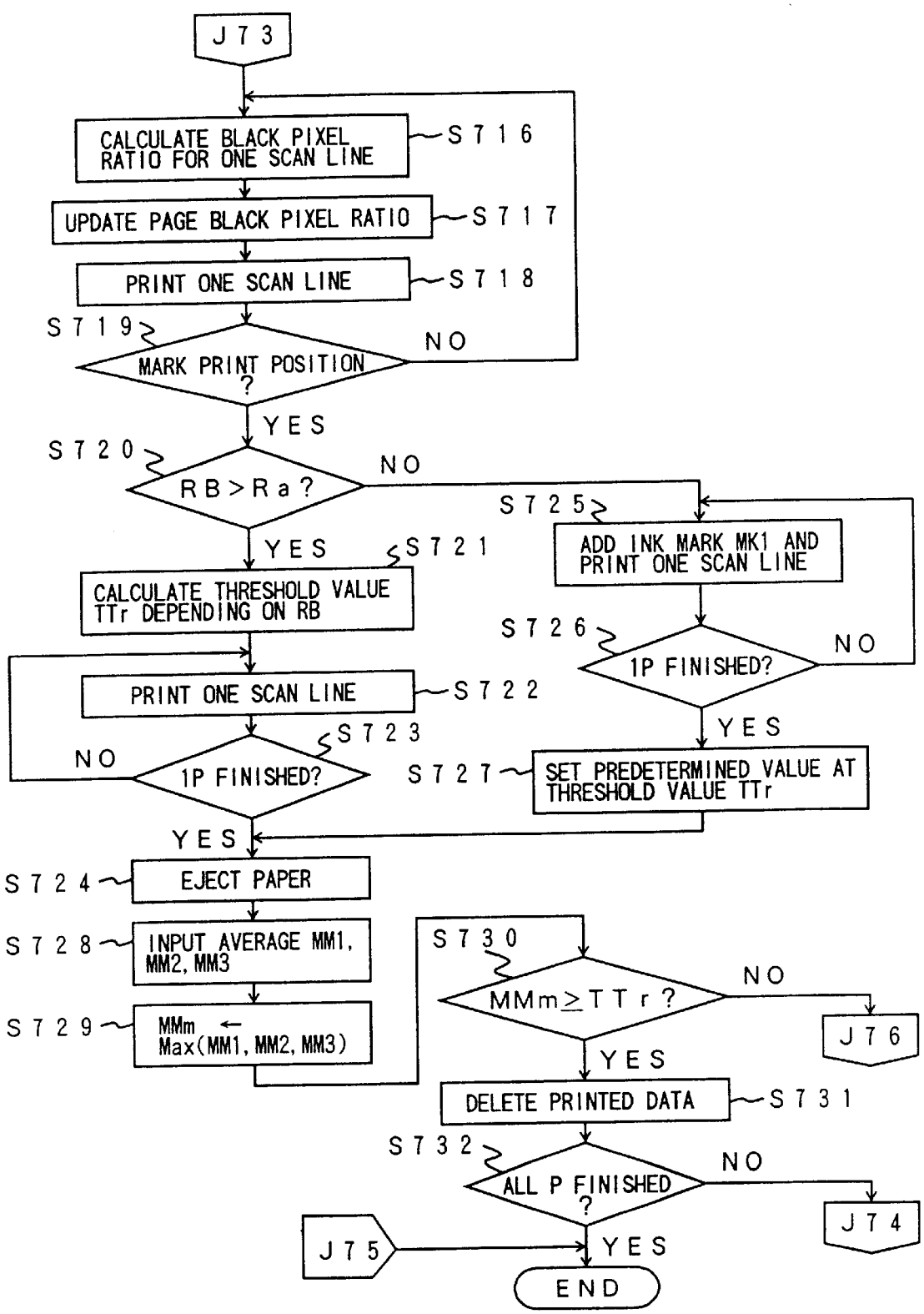
Figure 32:
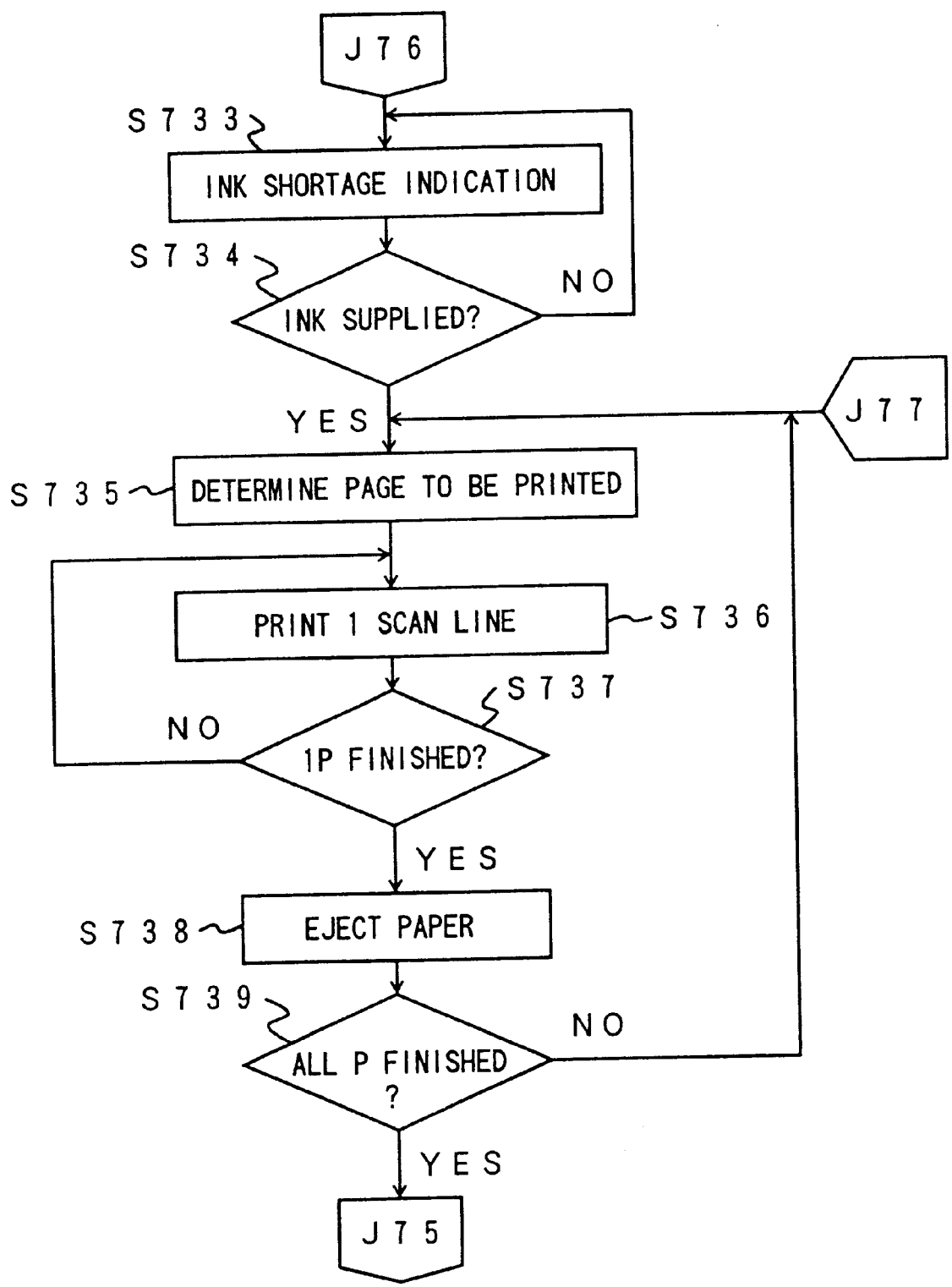

Operations of S716, S717, S718, S719, S720, S721, S722, S723, S724, S725, S726, S727 and S731 shown in FIG. 31 and S733, S734, S735, S736, S737, S738 and S739 shown in FIG. 32 are the same as the operations of S416, S417, S418, S419, S420, S421, S422, S423, S424, S425, S426, S427, S430 and S431 shown in FIG. 17 and S432, S433, S434, S435, S436, S437 and S438 shown in FIG. 18, respectively. However, operations in S728, S729, S730 shown in FIG. 31 are different from those in S428 and S429.

In S728, the three sensors S11, S12 and S13 are used instead of the single sensor S1, thus, as mentioned above, the three sensors scan three points at the same time on a paper sheet PA as shown in FIG. 28. In S729, a maximum density average MMm is obtained, which average is a maximum one of three averages MM1, MM2 and MM3 which were supplied by the average calculating units 22, 23 and 24, respectively, as a result of the three sensors scanning the paper sheet PA. An extent on the paper sheet PA for which the three sensors S11, S12, and S13 scan so that the three averages MM1, MM2, and MM3 may be obtained is an extent corresponding to a position at which the ink mark MK1 may be printed as shown in FIG. 3. In S730, it is determined whether or not the maximum average MMm is larger than the threshold value TTr.

If the mark MK1 has been printed on the paper sheet PA, the MK1 being thus scanned by the sensor S13, thus the relevant average MM3 is the maximum density average MMm ordinarily.

Figure 33A:
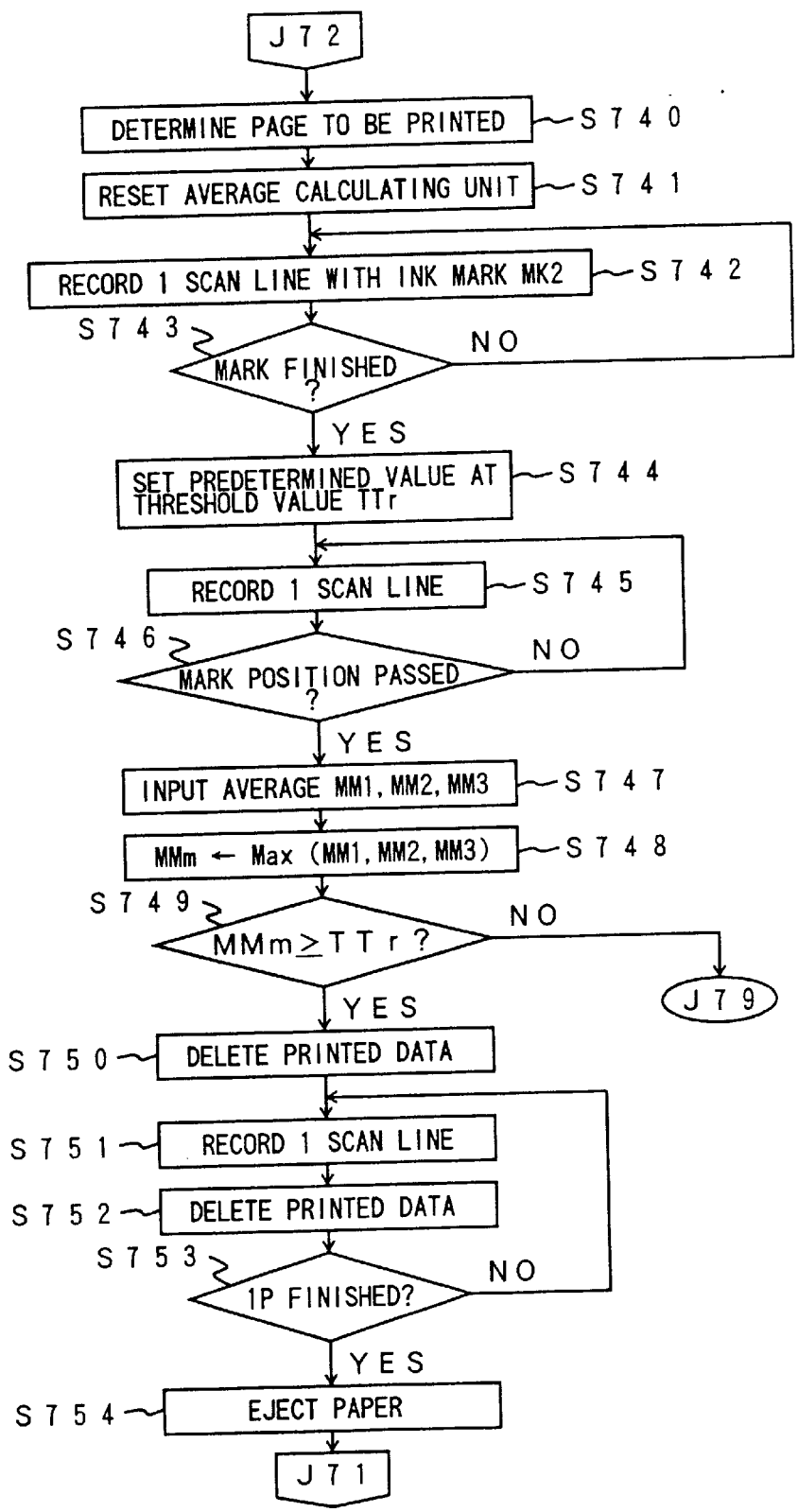
Figure 33B:
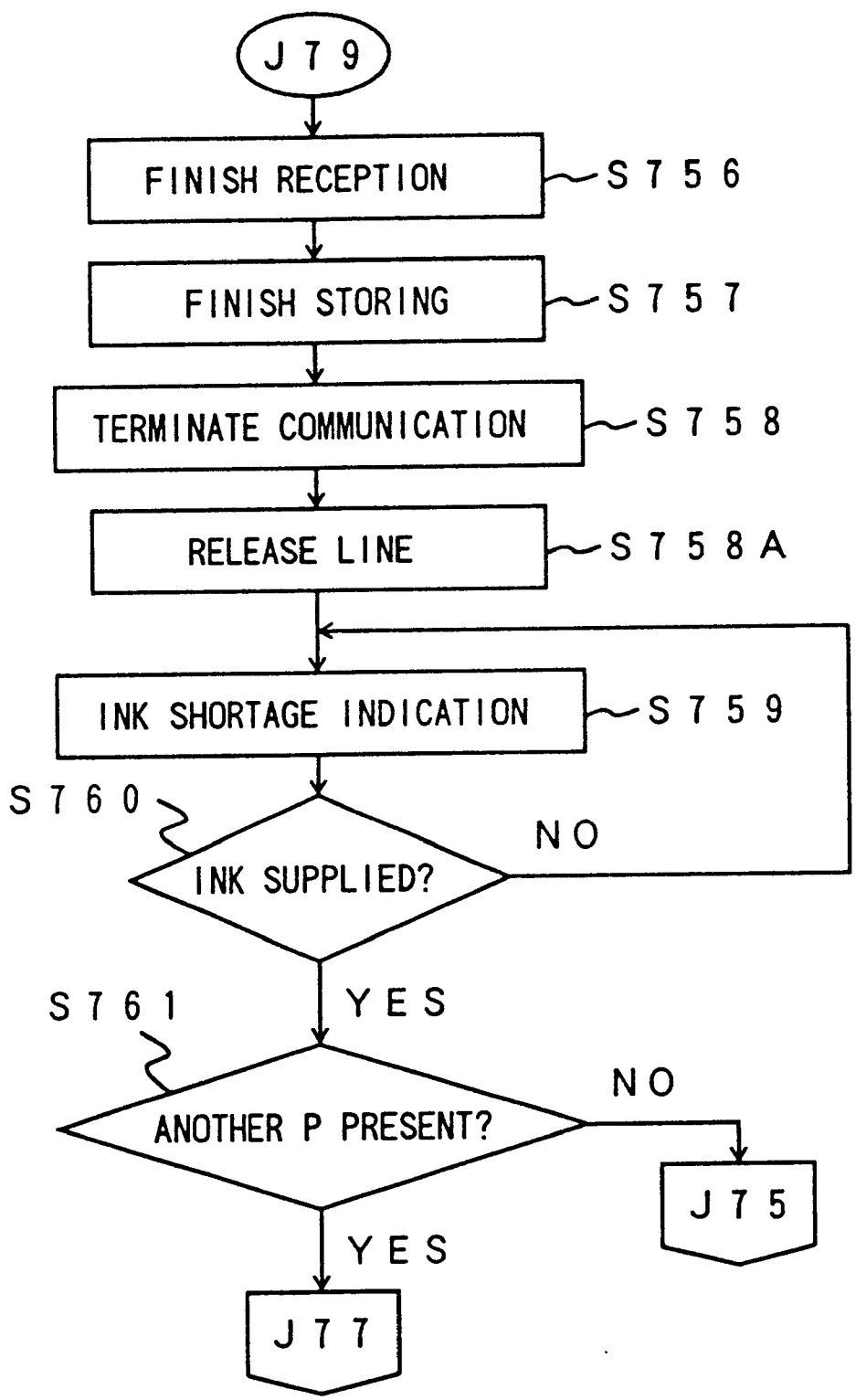

Operations in S740, S741, S742, S743, S744, S745, S746, S750, S751, S752, S753, S754, S756, S757, S758, S758A, S759, S760 and S761 shown in FIGS. 33A and 33B are the same as those of S439, S440, S441, S442, S443, S444, S445, S448, S449, S450, S451, S452, S453, S454, S455, S455A, S456, S457 and S458 shown in FIGS. 19A and 19B respectively. However, operations of S747, S748 and S749 are performed instead of the operations of S446 and S447 shown in FIG. 19A.

In S747, the three sensors S11, S12 and S13 are used instead of the single sensor S1, thus, as mentioned above, the three sensors scan three points at the same time on a paper sheet PA as shown in FIG. 28. In S748, a maximum density average MMm is obtained, which average is a maximum one of averages MM1, MM2 and MM3 which was supplied by the average calculating units 22, 23 and 24 as a result of the three sensors scanning the paper sheet PA. In S749, it is determined whether or not the maximum average MMm is larger than the threshold value TTr.

A facsimile apparatus in an eighth embodiment of the present invention will now be described. The facsimile apparatus in the eighth embodiment is obtained as a result of modifying the above-described facsimile apparatus in the seventh embodiment. A manner as to how to modify the facsimile apparatus in the seventh embodiment so as to obtain the facsimile apparatus in the eighth embodiment is the same as a manner as to how to modify the facsimile apparatus in the fourth embodiment so as to obtain the facsimile apparatus in the fifth embodiment. That is, as a result of the modification, the facsimile apparatus in the eighth embodiment detects the ink nozzle blockage and then performs the blockage removal operation on the group of ink nozzles in the print head 18 in the plotter 5. The ink nozzle blockage detection is performed as a result of counting a number of times in which the facsimile apparatus performs the printing operations after the ink supply.

With reference to FIGS. 34, 35, 36, 37A and 37B, an example of an operation flow performed by the facsimile apparatus in the eighth embodiment of the present invention when the first facsimile apparatus has detected calling from the second facsimile apparatus will now be described. The second facsimile apparatus gives calling to the first facsimile apparatus so as to transmit a series of image information thereto. A structure of the facsimile apparatus in the eighth embodiment of the present invention is similar to that of the above-described facsimile apparatus in the seventh embodiment of the present invention. Therefore, the operation flow of the facsimile apparatus in the eighth embodiment of the present invention is similar to that of the above-described facsimile apparatus in the seventh embodiment of the present invention. Points at which the operation flow of the facsimile apparatus in the eighth embodiment of the present invention differs from that of the above-described facsimile apparatus in the seventh embodiment of the present invention will be mainly described.

Figure 34:
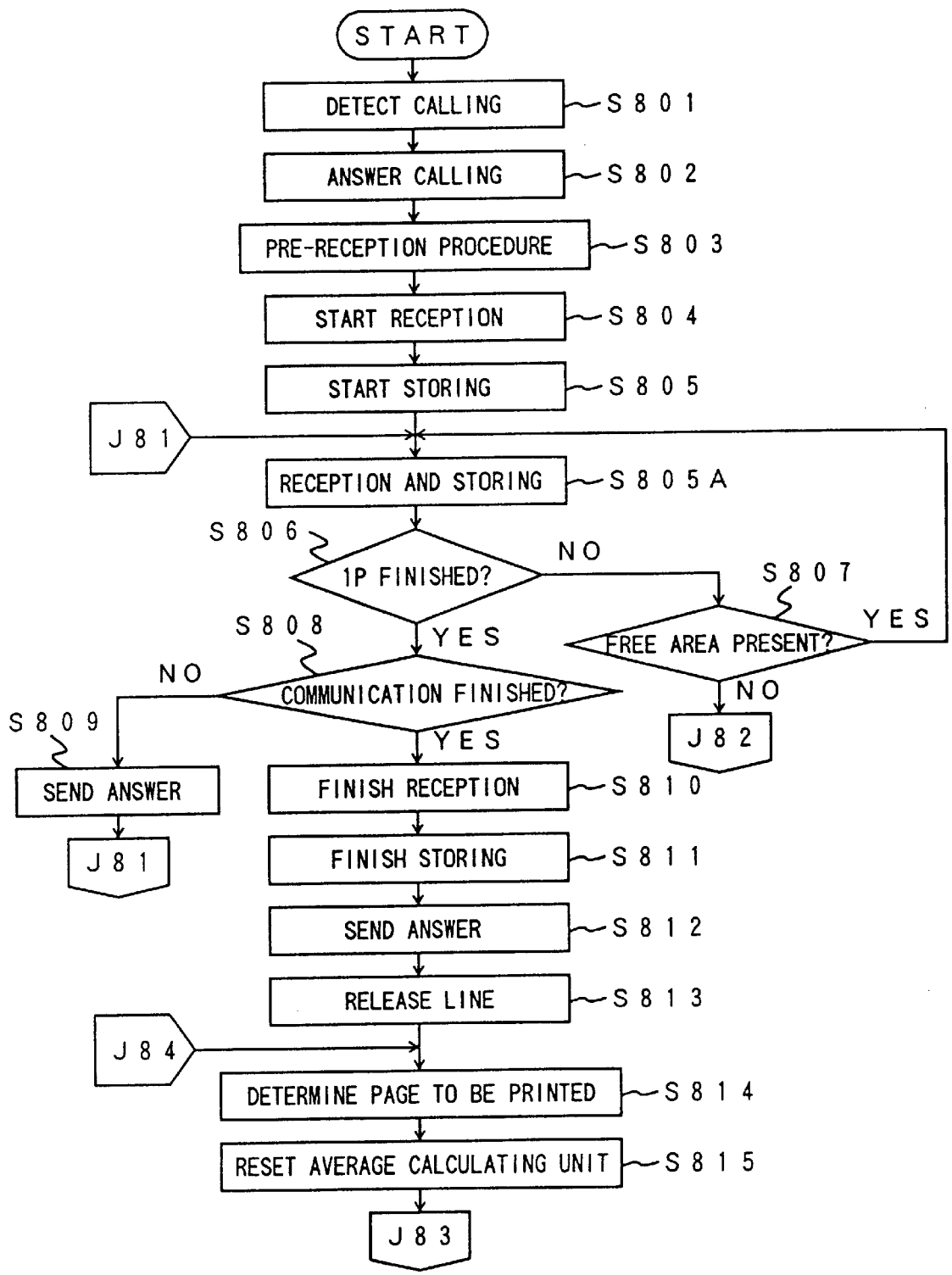
FIGS. 34, 35, 36, 37A and 37B show an example of an operating flow performed by the facsimile apparatus in the eighth embodiment of the present invention when detecting calling from another apparatus.

The operations of S801, S802, S803, S804, S805, S805A, S806, S807, S808, S809, S810, S811, S812, S813, S814, and S815 shown in FIG. 34 are the same as those of S701, S702, S703, S704, S705, S705A, S706, S707, S708, S709, S710, S711, S712, S713, S714, and S715 shown in FIG. 30.

Figure 35:
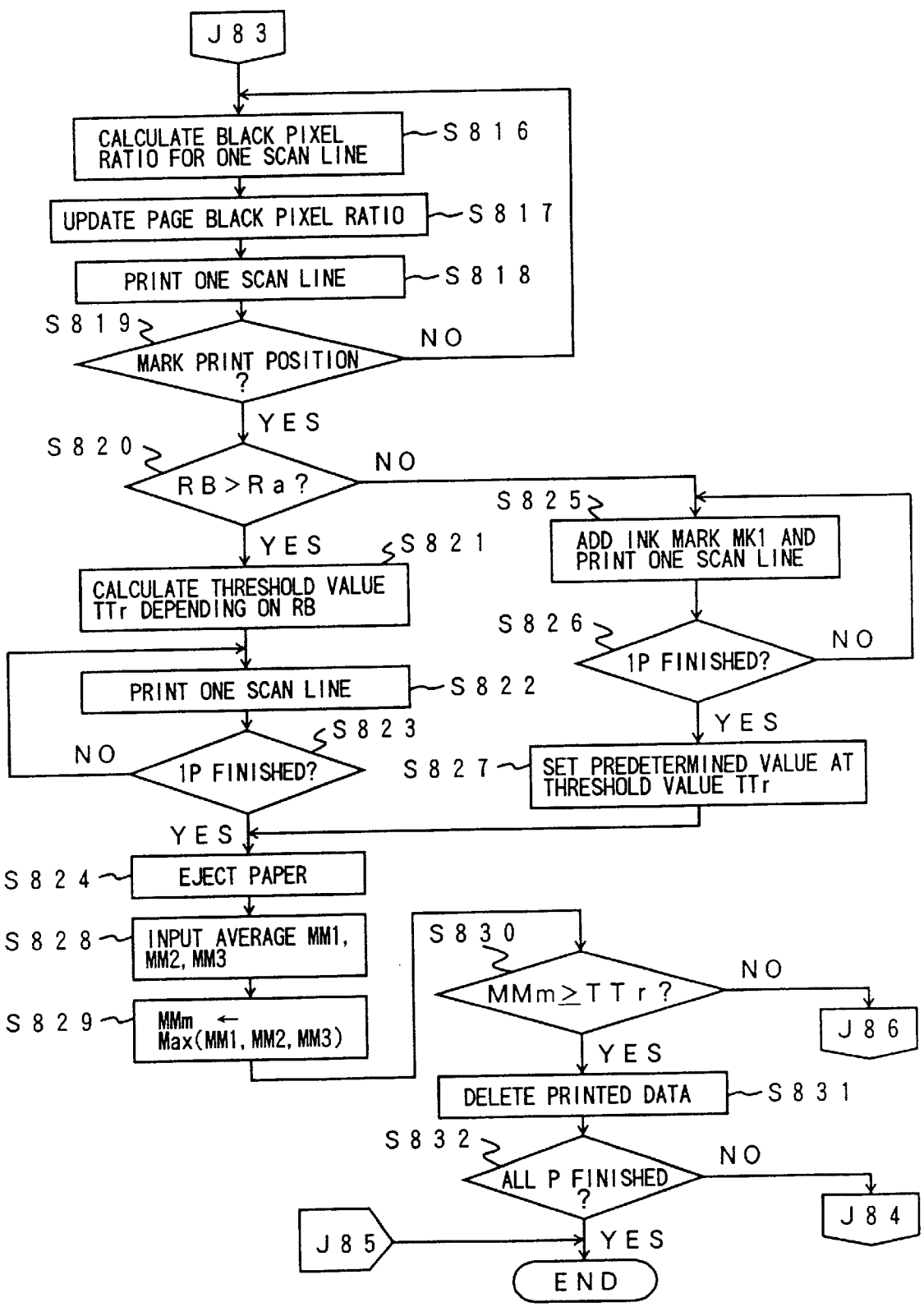

The operations of S816, S817, S818, S819, S820, S821, S822, S823, S824, S825, S826, S827, S828, S829, S830, S831 and S832 shown in FIG. 35 are the same as the operations of S716, S717, S718, S719, S720, S721, S722, S723, S724, S725, S726, S727, S728, S729, S730, S731 and S732 shown in FIG. 31.

Figure 36:
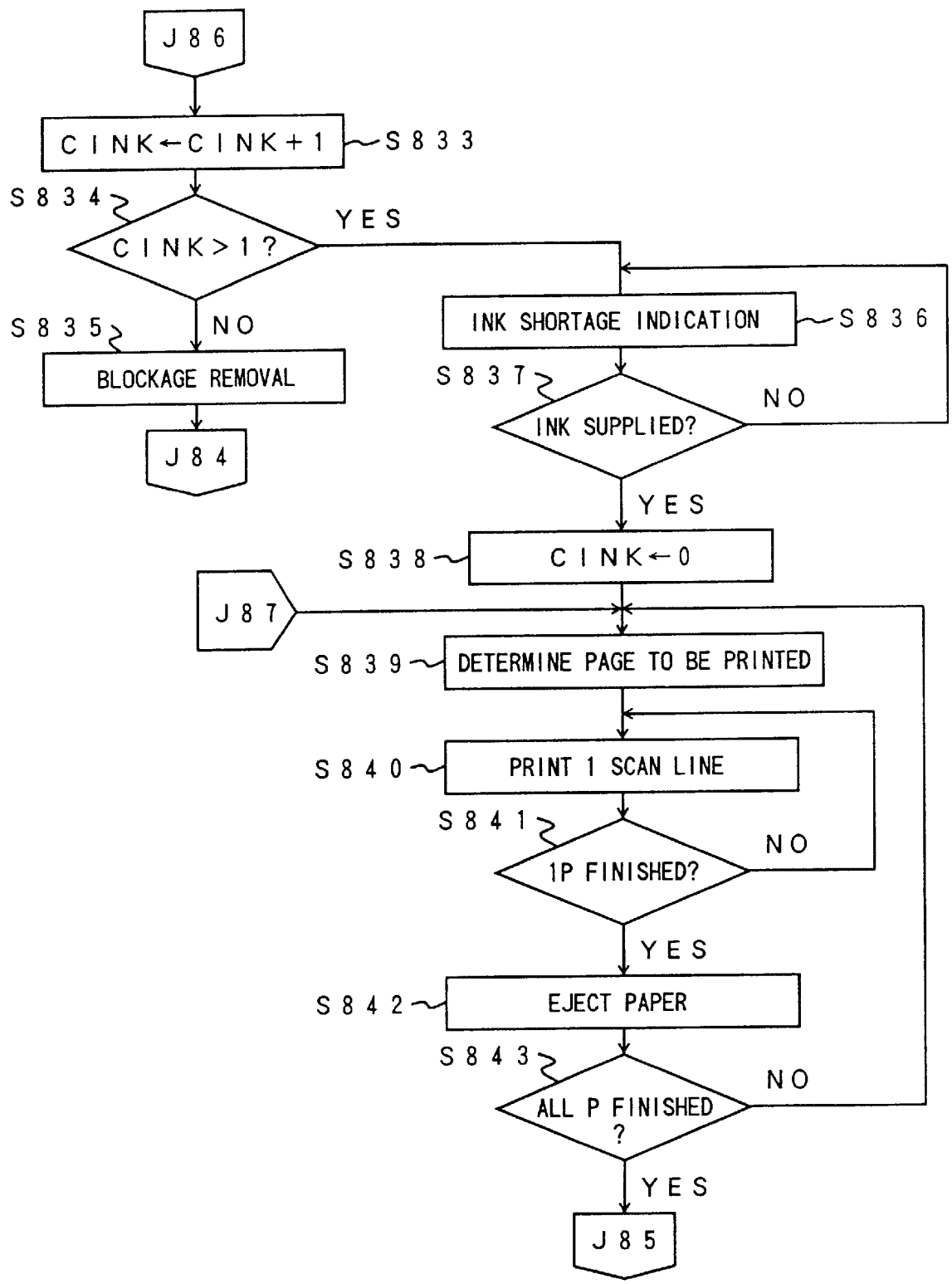

The operations of S833, S834, S835, S836, S837, S838, S839, S840, S841, S842 and S843 shown in FIG. 36 are the same as those of S532, S533, S534, S535, S536, S537, S538, S539, S540, S541 and S542 shown in FIG. 22 of the facsimile apparatus of the fifth embodiment. Thus, the operations performed in the facsimile apparatus in the fifth embodiment are used instead of the operations shown in FIG. 32 of the apparatus in the seventh embodiment.

Figure 37A:
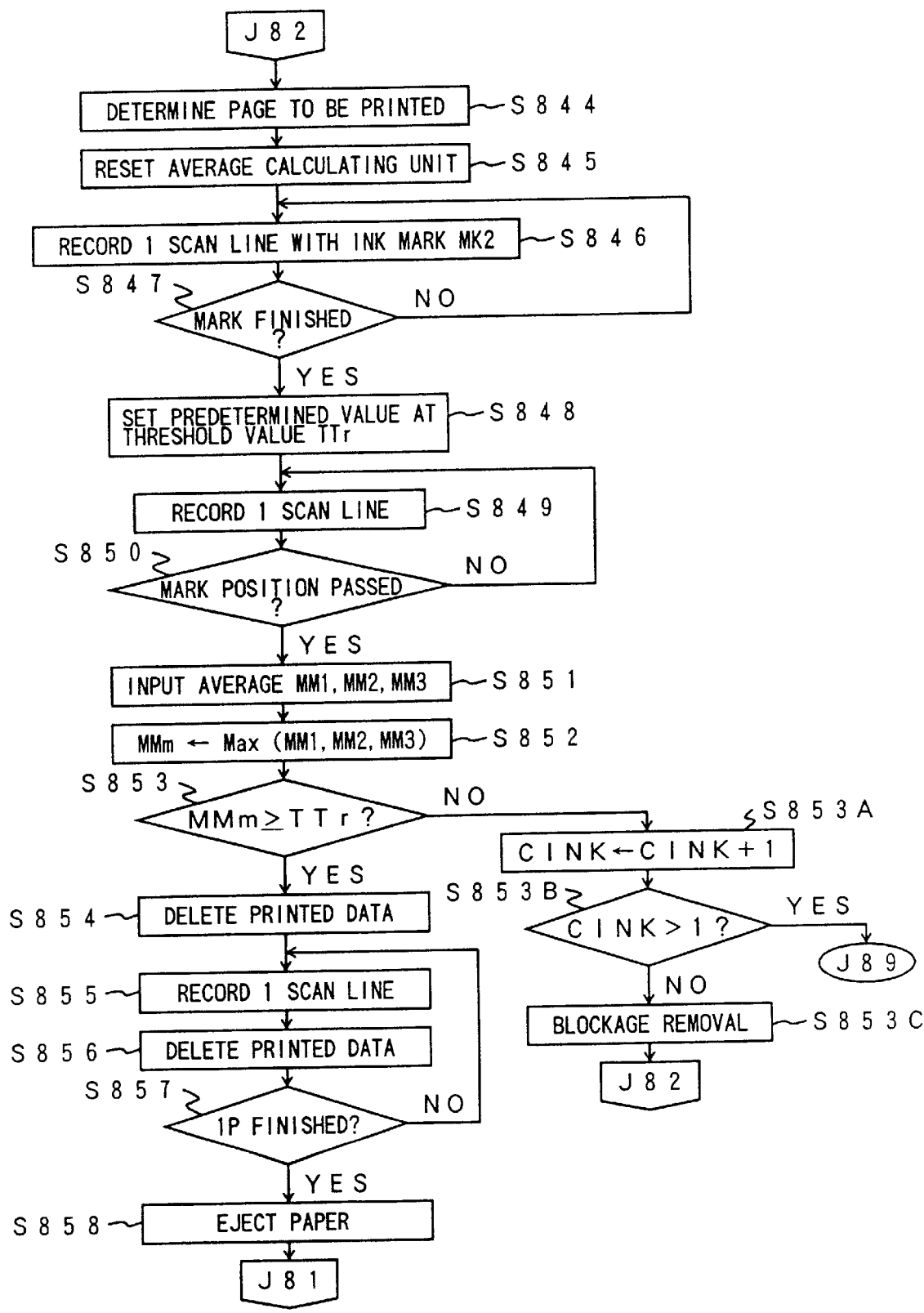

Operations of S844, S845, S846, S847, S848, S849, S850, S851, S852, S853, S854, S855, S856, S857 and S858 shown in FIG. 37A are the same as those of S740, S741, S742, S743, S744, S745, S746, S747, S748, S749, S750, S751, S752, S753, and S754 shown in FIG. 33A. However, operations of S853A, S853B and S853C are additionally performed as contrasted with the those of the steps shown in FIG. 33A. The operations of S853A, S853B and S853C are the same as those of S551A, S551B and S551C shown in FIG. 23B.

Figure 37B:
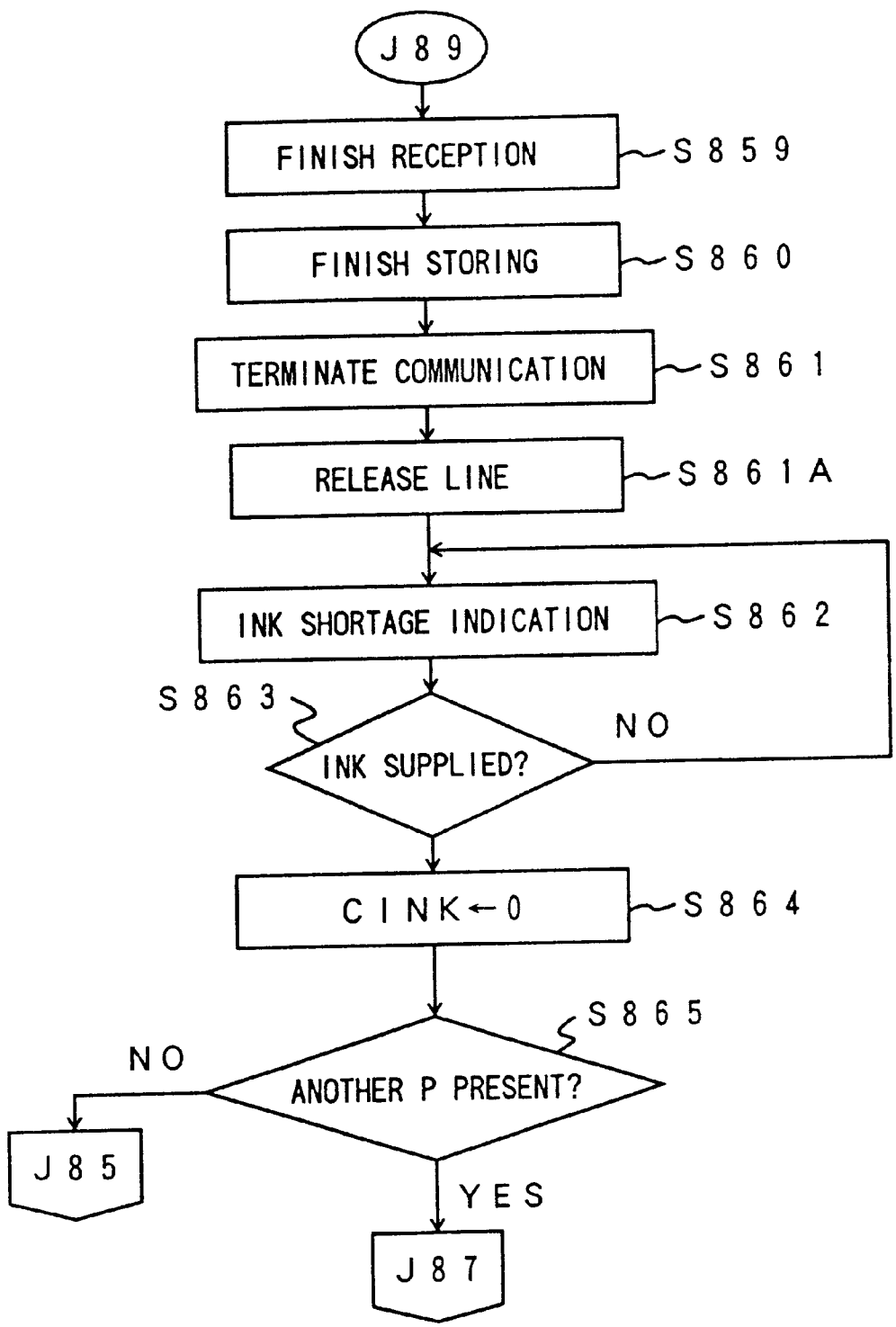

Further, operations of S859, S860, S861, S861A, S862, S863 and S865 shown in FIG. 37B correspond to S756, S757, S758, S758A, S759, S769 and S770 shown in FIG. 33B, respectively. However, S864 is inserted as contrasted with the operations show in FIG. 33B. Thus, the operations of S859, S860, S861, S861A, S862, S863, S864 and S865 shown in FIG. 37B are the same as those of S557, S558, S559, S559A, S560, S561, S562 and S563 shown in FIG. 23B.

A facsimile apparatus in an ninth embodiment of the present invention will now be described. The facsimile apparatus in the ninth embodiment is obtained as a result of modifying the above-described facsimile apparatus in the eighth embodiment. A manner as to how to modify the facsimile apparatus in the eighth embodiment so as to obtain the facsimile apparatus in the ninth embodiment is the same as a manner as to how to modify the facsimile apparatus in the fifth embodiment so as to obtain the facsimile apparatus in the sixth embodiment. That is, as a result of the modification, the facsimile apparatus in the ninth embodiment detects the ink nozzle blockage and then performs the blockage removal operation on the group of ink nozzles in the print head 18 in the plotter 5. The ink nozzle blockage detection is performed as a result of counting a number of days for which the facsimile apparatus has not performed the printing operations.

With reference to FIGS. 38, 39, 40, 41A and 41B, an example of an operation flow performed by the facsimile apparatus in the ninth embodiment of the present invention when the first facsimile apparatus has detected calling from the second facsimile apparatus will now be described. The second facsimile apparatus gives calling to the first facsimile apparatus so as to transmit a series of image information thereto. A structure of the facsimile apparatus in the ninth embodiment of the present invention is similar to that of the above-described facsimile apparatus in the eighth embodiment of the present invention. Therefore, the operation flow of the facsimile apparatus in the ninth embodiment of the present invention is similar to that of the above-described facsimile apparatus in the eighth embodiment of the present invention. Points at which the operation flow of the facsimile apparatus in the ninth embodiment of the present invention differs from that of the above-described facsimile apparatus in the eighth embodiment of the present invention will be mainly described.

Figure 38:
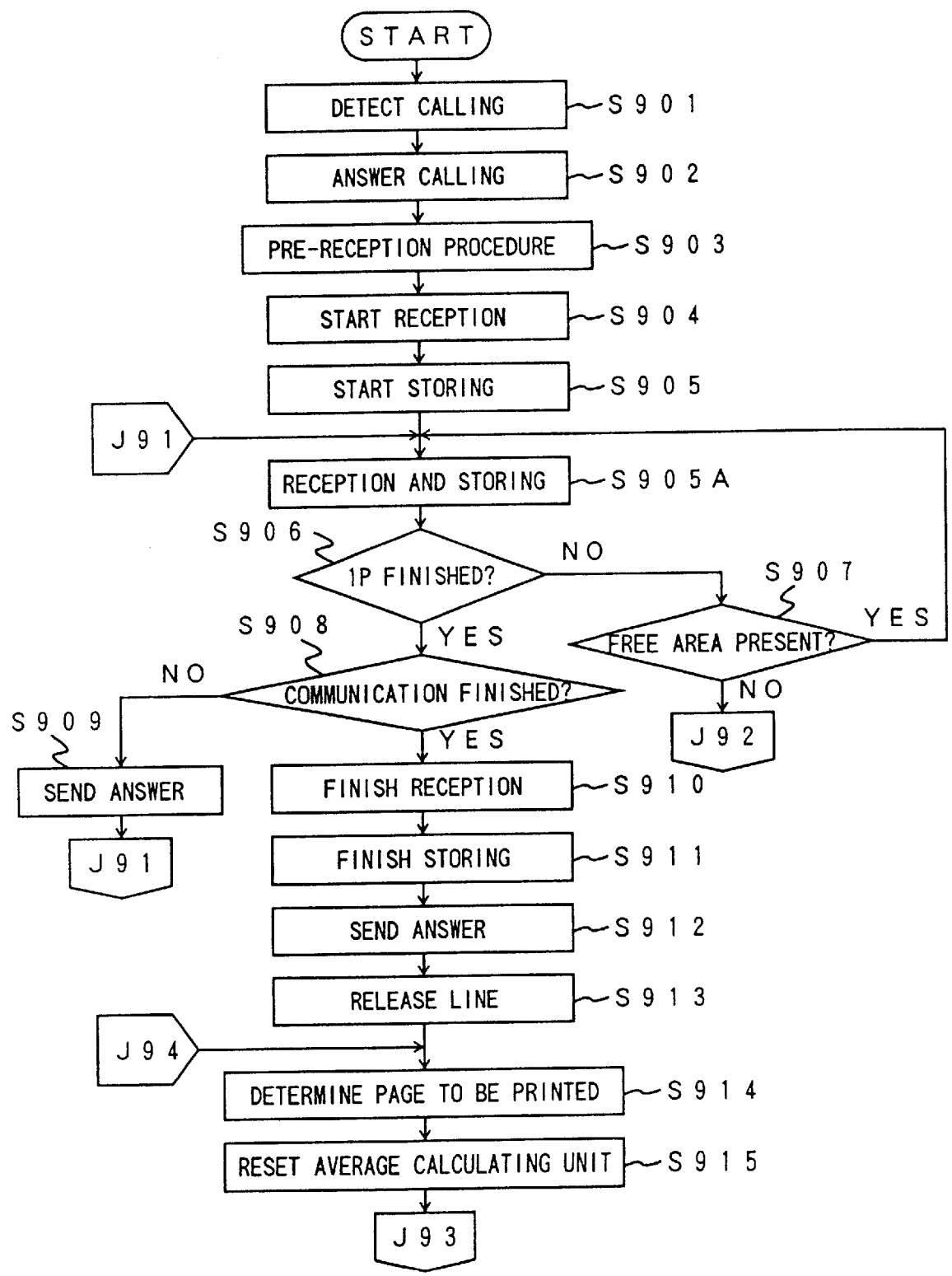
FIGS. 38, 39, 40, 41A and 41B show an example of an operating flow performed by the facsimile apparatus in the ninth embodiment of the present invention when detecting calling from another appears.

Operations in S901, S902, S903, S904, S905, S905A, S906, S907, S908, S909, S910, S911, S912, S913, S914 and S915 shown in FIG. 38 are the same as the operations in S801, S802, S803, S804, S805, S805A, S806, S807, S808, S809, S810, S811, S812, S813, S814 and S815 shown in FIG. 34.

Figure 39:
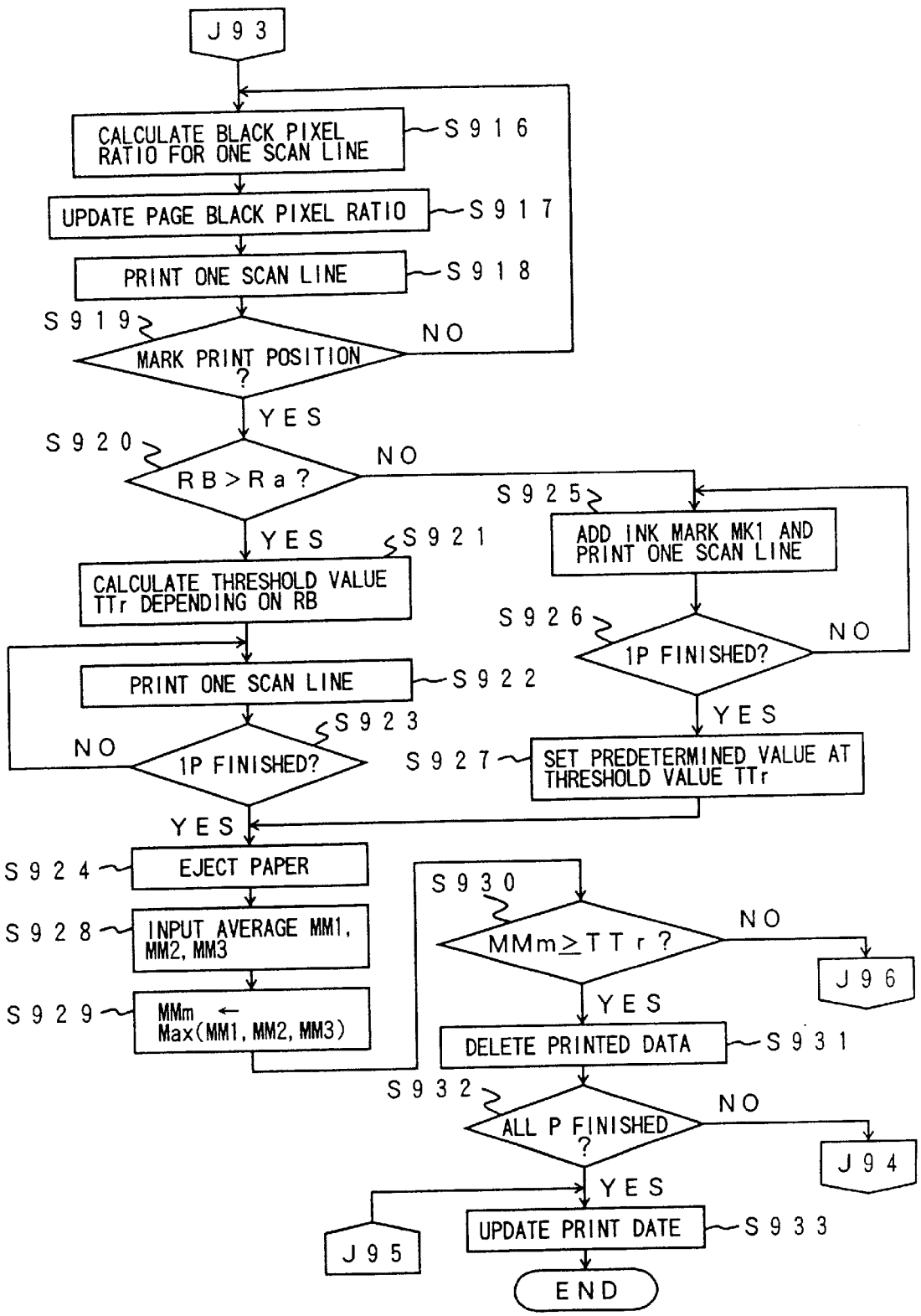

Operations in S916, S917, S918, S919, S920, S921, S922, S923, S924, S925, S926, S927, S928, S929, S930, S931 and S932 shown in FIG. 39 are the same as those of S816, S817, S818, S819, S820, S821, S822, S823, S824, S825, S826, S827, S828, S829, S830, S831 and S832 shown in FIG. 35. However, S933, an operation of which is the same as that of S632 shown in FIG. 35 of the facsimile apparatus in the sixth embodiment is inserted immediately after S932 corresponding to S832.

Figure 40:
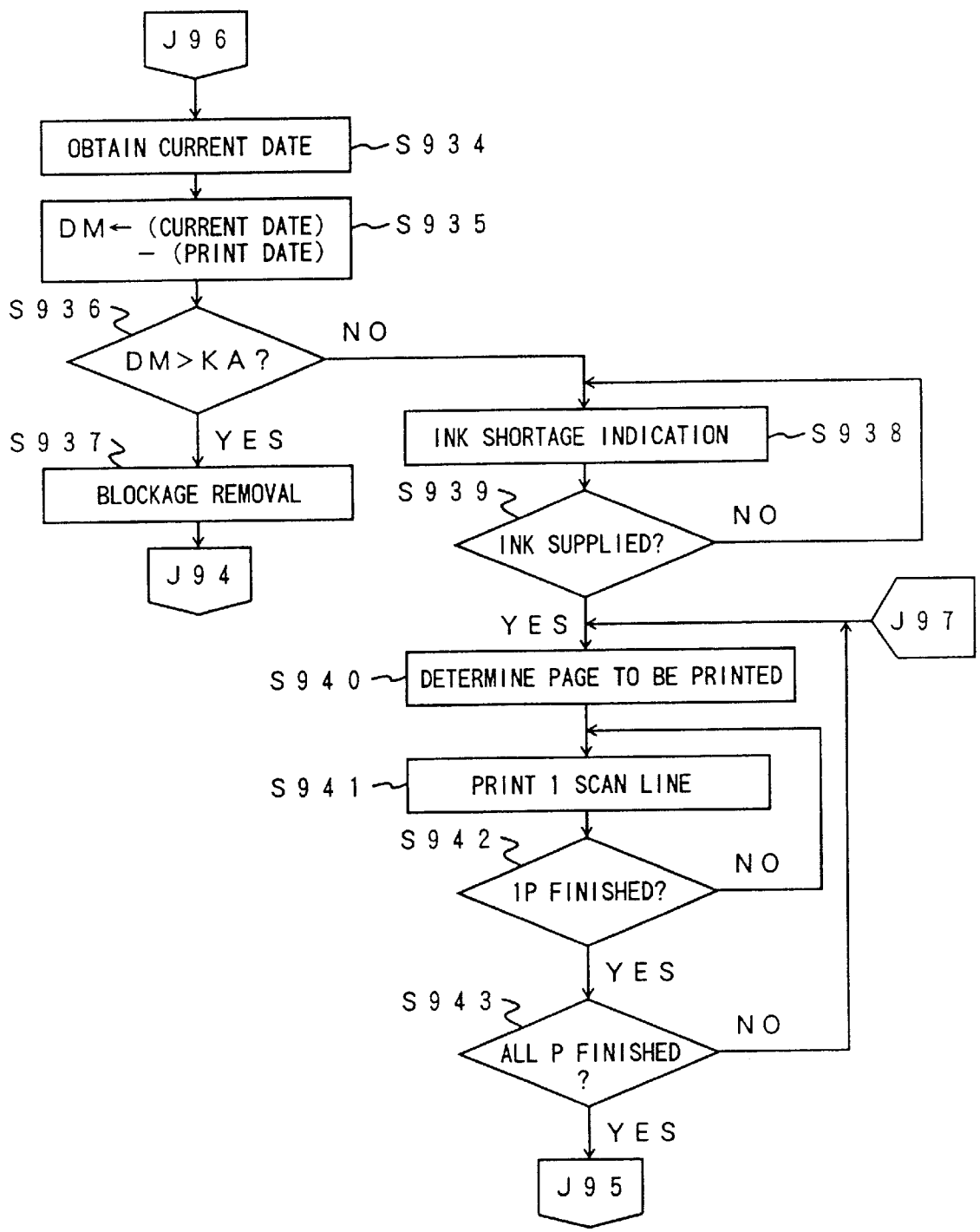

Operations in S934, S935, S936, S937, S938, S939, S940, S941, S942 and S943 shown in FIG. 40 are the same as the operations in S633, S634, S635, S636, S637, S638, S639, S640, S641 and S642 shown in FIG. 26 of the facsimile apparatus in the sixth embodiment. However, differently from the operation flow shown in FIGS. 25 and 26, if a result of S943 is YES, S933 is performed.

Figure 41A:
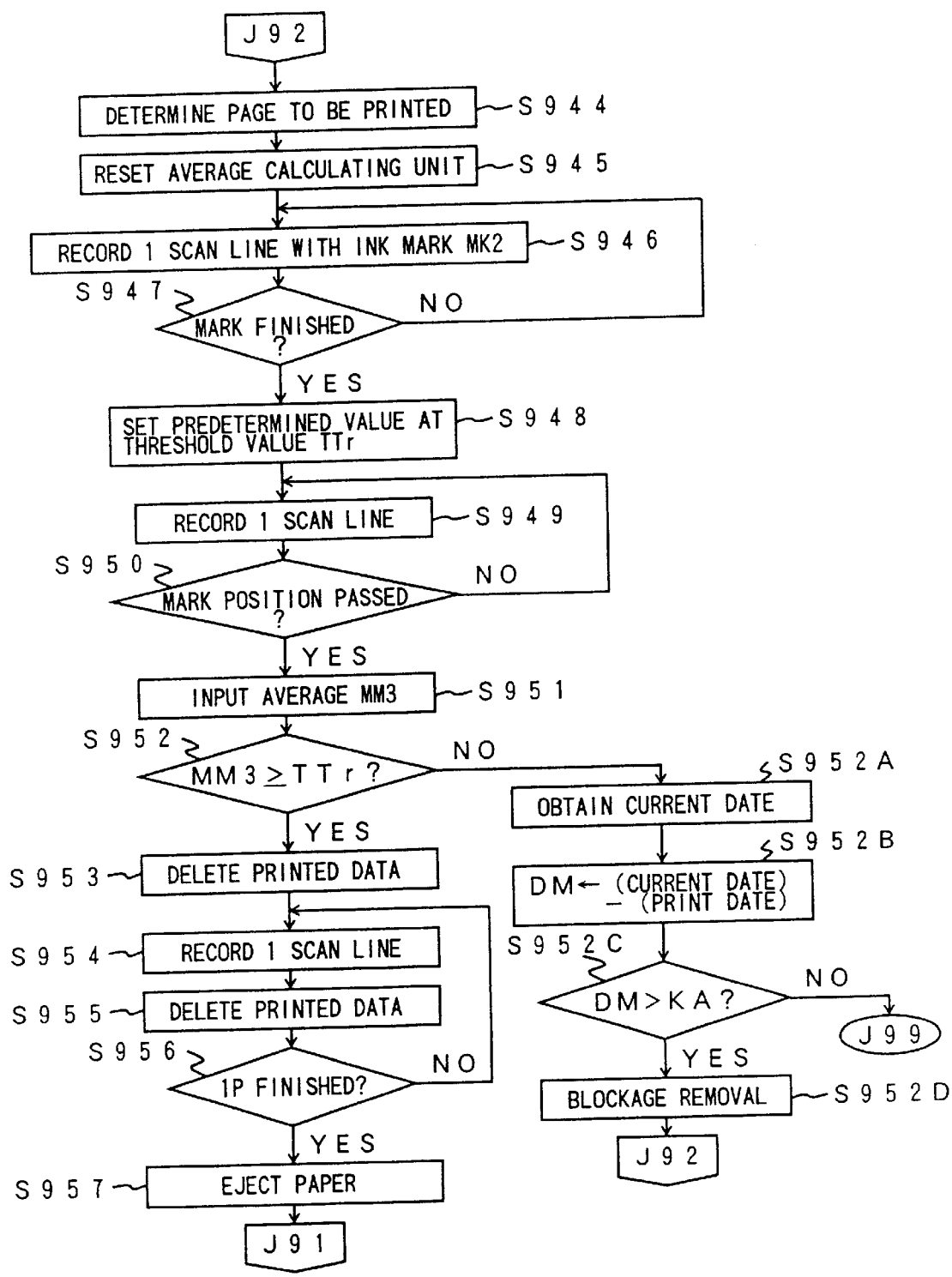
Figure 41B:
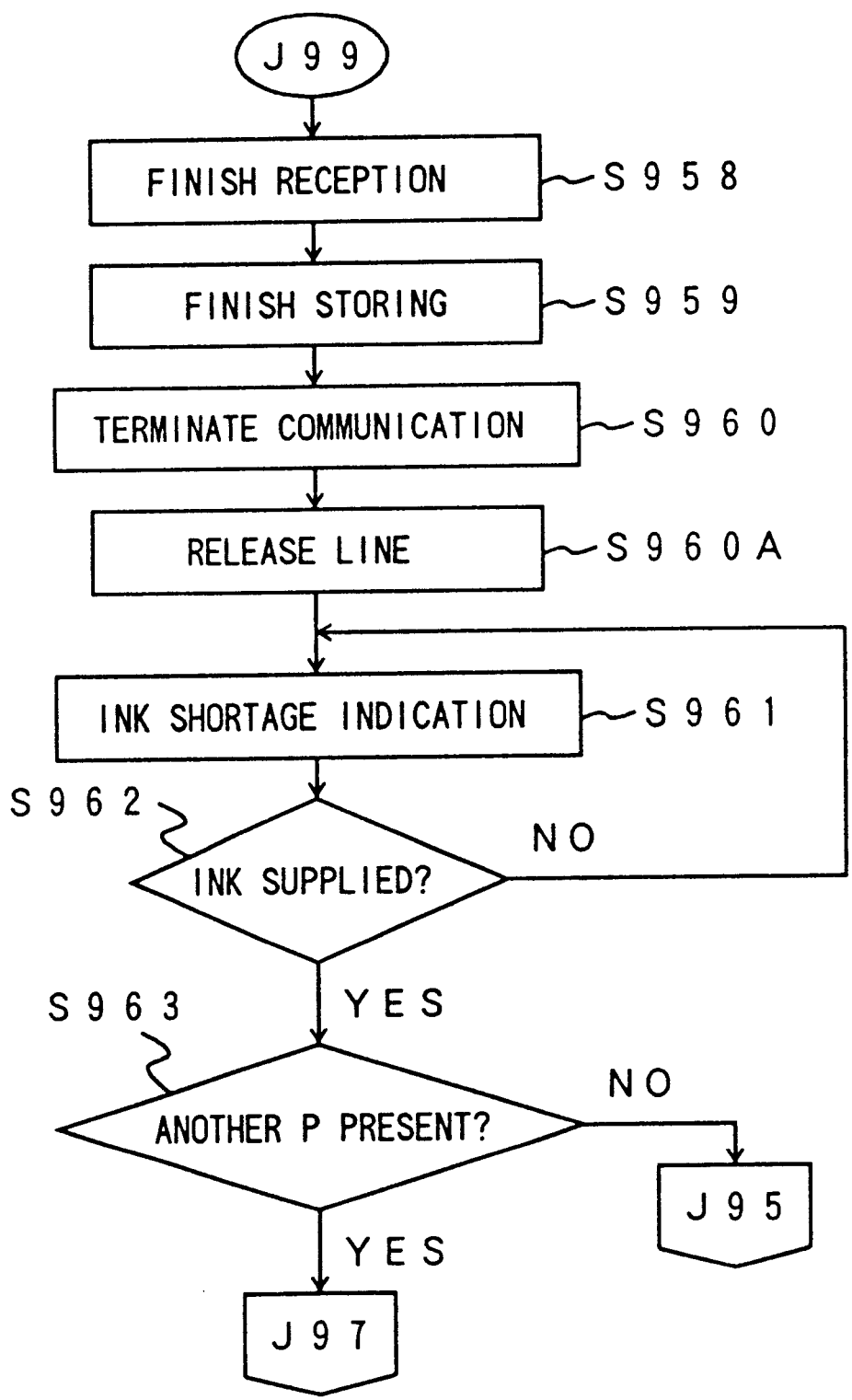

Operations in S944, S945, S946, S947, S948, S949, S950, S952A, S952B, S952C, S952D, S953, S954, S955, S956, S957, S958, S959, S960, S960A, S961, S962 and S963 shown in FIGS. 41A and 41B are the same as those S644, S645, S646, S647, S648, S649, S650, S652A, S652B, S652C, S652D, S653, S654, S655, S656, S657, S658, S659, S660, S660A, S661, S662 and S663 in shown in FIGS. 27A and 27B of the facsimile apparatus in the sixth embodiment. However, operations of S951 and S952 shown in FIG. 41A are different from those of S651 and S652 shown in FIG. 27A. S951 and S952 use the density average MM3 resulting from the reflectance signal PS13 supplied when the sensor S13 shown in FIG. 3 scans an image while S651 and S652 use the density average MM resulting from the reflectance signal PS1 supplied when the sensor S1 shown in FIG. 28 scans an image. With reference to FIGS. 3 and 28, a position in a paper sheet PA at which the sensor S1 scans is substantially the same as a position in the paper sheet PA at which the sensor S13 scans. Therefore, the operations of S951 and S952 are substantially the same as those of S651 and S652.

Thus, each of the facsimile apparatuses in the embodiments of the present invention determines a remaining ink amount based on actual image densities measured from a printed image either the ink mark or an image relevant received image information. Therefore, a time at which ink should be supplied can be appropriately determined. Further, the ink nozzle blockage is detected and then the blockage removal operation is automatically performed. Therefore, a user can be free from maintenance works, and also the facsimile apparatus can be efficiently used.

Further, if a free storage area in the image data storing unit is not sufficient, a printing operation to print out receiving image information is started. Simultaneously, a remaining ink amount is checked as a result of determining whether or not the low ink density situation is occurring. If it has been determined that the remaining ink amount is not sufficient, a currently performed communication operation is terminated at the same time. Therefore, the following situation is prevented from occurring: The received image information could not be printed out due to the ink amount shortage; however, the first facsimile apparatus informs the second facsimile apparatus that the relevant image information has been safely received; and thus the second facsimile apparatus determines that the relevant image information has been safely received by the first facsimile apparatus.

Applications of the present invention are not limited to the group 3 facsimile apparatuses described above. The present invention can be applied to other image forming apparatuses which have a function of printing out received image information.

The present invention can be applied to data communication apparatuses, other than facsimile apparatuses, which automatically operates and performs printing operations for providing hard copies. Such data communication apparatuses may be remotely controlled data collecting apparatuses or telemeter apparatuses.

The present invention can be applied to apparatuses having printers other than ink-jet printer. The present invention can be applied to, for example, printers using printing substance such as toner. Such printers may be electrophotographic printers. If the present invention is applied to an electrophotographic printer, the low ink density situation in the ink-jet printer is replaced with a low toner density situation, the ink tank in the ink-jet printer is replaced with a toner tank, and so forth.

Further, the present invention is not limited to the above-described embodiments, and variations and modifications may be made without departing from the scope of the present invention.

What is claimed is:

1. An image forming apparatus comprising:

printing means for printing out at least received image information by appropriately fixing a printing substance onto a sheet and printing a predetermined mark on the sheet;

density measuring means for measuring a density of said printing substance fixed on said sheet and producing a value of said printing substance's density by measuring a density of the predetermined mark provided on the sheet;

control means for generating control signals; and determining means for determining whether or not said value of said printing substance's density measured by and then obtained from said density measuring means is lower than a predetermined value, said density measuring means being controlled by a control signal from said control means for enabling said density measuring means to measure a density of said printing substance only at a time when said predetermined mark passes said density measuring means and disabling said density measuring means at other times.

2. The image forming apparatus according to claim 1, wherein said density of said printing substance measured by said density measuring means is a density of said printing substance representing a predetermined mark which has been printed by said printing means in addition to printing out said received image information.

3. The image forming apparatus according to claim 1, wherein said density of said printing substance measured by said density measuring means is a density of said printing substance representing said received image information.

4. The image forming apparatus according to claim 1, further comprising:

an image data storage for storing said received image information therein; and control means for storing said received image information in said image data storage;

said control means causing said printing means to print out said received image information;

said control means deleting said received image information from said image data storage if said determining means has determined that the value of said printing substance's density obtained from said density measuring means is not lower than said predetermined value; and said control means maintaining said received image information in said image data storage if said determining means has determined that the value of said printing substance's density obtained from said density measuring means is lower than said predetermined value.

5. The image forming apparatus according to claim 1, further comprising alarming means for alarming when said determining means has determined that the value of said printing substance's density obtained from said density measuring means is lower than said predetermined value.

6. The image forming apparatus according to claim 1, wherein said printing means comprises an ink-jet printer.

7. The image forming apparatus according to claim 1, further comprising:

an image data storage for storing said received image information therein;

blockage removal means for performing a blockage removal operation for removing any blockage which prevents said printing means from normally printing out said received image information; and control means for storing said received image information in said image data storage;

said control means causing said printing means to print out said received image information;

said control means causing said blockage removal means to perform said blockage removal operation if said determining means has determined that the value of said printing substance's density obtained from said density measuring means is lower than said predetermined value immediately after said printing substance is supplied to said printing means; and said control means alarming if said determining means has determined that the value of said printing substance's density obtained from said density measuring means is lower than said predetermined value after said printing means has performed at least two pages of printing operations.

8. The image forming apparatus according to claim 1, further comprising:

an image data storage for storing said received image information therein;

blockage removal means for performing a blockage removal operation for removing any blockage which prevents said printing means from normally printing out said received image information; and control means for storing said received image information in said image data storage;

said control means causing said printing means to print out said received image information;

said control means causing said blockage removal means to perform said blockage removal operation if said determining means has determined that the value of said printing substance's density obtained from said density measuring means is lower than said predetermined value after a predetermined time has elapsed since said printing means last performed a printing operation; and said control means alarming if said determining means has determined that the value of said printing substance's density obtained from said density measuring means is lower than said predetermined value if said predetermined time has not elapsed since said printing means performed a printing operation last.

9. The image forming apparatus according to claim 1, wherein said density measuring means measures said density of said printing substance at a predetermined position on a sheet on which said image has been printed.

10. The image forming apparatus according to claim 1, further comprising:

an image data storage for storing said received image information before said printing means prints out said received image information; and control means for causing said printing means to start printing out said received image information when a free storage area in said image data storage is smaller than a predetermined area even if said received image information is still being received, and said control means terminating further receiving of said received image information if said determining means has determined that a value of said printing substance's density obtained from said density measuring means is lower than a predetermined value.

11. An image forming apparatus as recited in claim 1, wherein the image forming apparatus prints the predetermined mark on the sheet at a predetermined time.

12. An image forming apparatus comprising:

printing means for printing out at least received image information by appropriately fixing a printing substance onto a sheet;

density measuring means for measuring a density of said printing substance fixed on said sheet and producing a value of said printing substance's density;

determining means for determining whether or not said value of said printing substance's density measured by and then obtained from said density measuring means is lower than a predetermined value;

an image data storage for storing said received image information therein;

coloring-pixel-ratio calculating means for calculating a coloring pixel ratio which is a ratio of a number of coloring pixels to a total number of pixels represented by said received image information; and control means for comparing said calculated coloring pixel ratio with a predetermined reference coloring pixel ratio, wherein if a comparison result is that said calculated coloring pixel ratio is larger than said predetermined reference coloring pixel ratio, said control means determining a first value to be used as said predetermined value which is to be used by said determining means, said first value being a value which is predetermined depending on said coloring pixel ratio calculated by said calculating means, said control means deleting said received image information from said image data storage if said determining means has determined that the value of said printing substance's density obtained from said density measuring means is not lower than said predetermined value, and said control means maintaining said received image information in said image data storage and also alarming if said determining means has determined that the value of said printing substance's density obtained from said density measuring means is lower than said predetermined value, said control means causing said printing means to print a predetermined mark if the comparison result is that said calculated coloring pixel ratio is not larger than said predetermined reference coloring pixel ratio, said control means deleting said received image information from said image data storage if said determining means has determined that the value of said printing substance's density obtained from said density measuring means is not lower than said predetermined value when said density measuring means measures a density of said printed predetermined mark, and said control means maintaining said received image information in said image data storage and also alarming if said determining means has determined that the value of said printing substance's density obtained from said density measuring means is lower than said predetermined value when said density measuring means measures the density of said printed predetermined mark.

13. An image forming apparatus comprising:

printing means for printing out at least received image information by appropriately fixing a printing substance onto a sheet;

density measuring means for measuring a density of said printing substance fixed on said sheet and producing a value of said printing substance's density;

determining means for determining whether or not said value of said printing substance's density measured by and then obtained from said density measuring means is lower than a predetermined value;

an image data storage for storing said received image information therein;

blockage removal means for performing a blockage removal operation for removing any blockage which prevents said printing means from normally printing out said received image information; and coloring-pixel-ratio calculating means for calculating a coloring pixel ratio which is a ratio of a number of coloring pixels to a total number of pixels represented by said received image information; and control means for comparing said calculated coloring pixel ratio with a predetermined reference coloring pixel ratio, wherein if a comparison result is that said calculated coloring pixel ratio is larger than said predetermined reference coloring pixel ratio, said control means determining a first value to be used as said predetermined value which is to be used by said determining means, said first value being a value which is predetermined depending on said coloring pixel ratio calculated by said calculating means, said control means storing said received image information in said image data storage, said control means causing said printing means to print out said received image information, said control means causing said blockage removal means to perform said blockage removal operation if said determining means has determined that the value of said printing substance's density obtained from said density measuring means is lower than said predetermined value immediately after said printing substance is supplied to said printing means, and said control means alarming if said determining means has determined that the value of said printing substance's density obtained from said density measuring means is lower than said predetermined value after said printing means has performed at least two pages of printing operations, said control means causing said printing means to print a predetermined mark if the comparison result is that said calculated coloring pixel ratio is not larger than said predetermined reference coloring pixel ratio, said control means causing said blockage removal means to perform said blockage removal operation if said determining means has determined that the value of said printing substance's density obtained from said density measuring means is lower than said predetermined value when said density measuring means has measured the density of said predetermined mark printed immediately after said printing substance is supplied to said printing means, and wherein said control means alarming if said determining means has determined that the value of said printing substance's density obtained from said density measuring means is lower than said predetermined value when said density measuring means measures the density of said predetermined mark printed after said printing means has performed at least two pages of printing operations after said printing substance was supplied.

14. An image forming apparatus comprising:

printing means for printing out at least received image information by appropriately fixing a printing substance onto a sheet;

density measuring means for measuring a density of said printing substance fixed on said sheet and producing a value of said printing substance's density;

determining means for determining whether or not said value of said printing substance's density measured by and then obtained from said density measuring means is lower than a predetermined value;

an image data storage for storing said received image information therein;

blockage removal means for performing a blockage removal operation for removing any blockage which prevents said printing means from normally printing out said received image information;

coloring-pixel-ratio calculating means for calculating a coloring pixel ratio which is a ratio of a number of coloring pixels to a total number of pixels represented by said received image information; and control means for comparing said calculated coloring pixel ratio with a predetermined reference coloring pixel ratio, wherein if a comparison result is that said coloring pixel ratio calculated is larger than said predetermined reference coloring pixel ratio, said controlling means determining a first value to be used as said predetermined value which is to be used by said determining means, said a first value being a value which is predetermined depending on said coloring pixel ratio calculated by said calculating means, said control means storing said received image information in said image data storage, said control means causing said printing means to print out said received image information, said control means causing said blockage removal means to perform said blockage removal operation if said determining means has determined that the value of said printing substance's density obtained from said density measuring means is lower than said predetermined value immediately after said printing substance being supplied to said printing means and, wherein said control means alarming if said determining means has determined that the value of said printing substance's density measured by and then obtained from said density measuring means is lower than said predetermined value after said printing means has performed printing operations at least twice after said printing substance was supplied, said control means causing said printing means to print a predetermined mark if the comparison result is that said calculated coloring pixel ratio is not larger than said predetermined reference coloring pixel ratio, said control means causing said blockage removal means to perform said blockage removal operation if said determining means has determined that the value of said printing substance's density obtained from said density measuring means is lower than said predetermined value when said density measuring means has measured the density of said predetermined mark printed immediately after a predetermined time has elapsed since said printing means last performed a printing operation, and, wherein said control means alarming if said determining means has determined that the value of said printing substance's density obtained from said density measuring means is lower than said predetermined value when said density measuring means measures the density of said predetermined time has not elapsed since said printing means last performed a printing operation.

15. An image forming apparatus comprising:

a printer for printing out at least received image information by appropriately fixing a printing substance onto a sheet and printing a predetermined mark on the sheet;

density measuring circuitry provided adjacent the sheet and including a light receiving unit receiving light reflected from the sheet for measuring a density of said printing substance fixed on said sheet and producing a value of said printing substance's density by measuring a density of the predetermined mark provided on the sheet;

a controller for generating control signals; and a comparison unit connected with the density measuring circuitry for receiving the value of the printing substance's density and determining whether or not said value of said printing substance's density measured by and then obtained from said density measuring circuitry is lower than a predetermined value, said density measuring circuitry being switched by a control signal from said controller for enabling said density measuring circuitry to measure a density of the printing substance only at a time when the predetermined mark passes the light receiving unit and disabling said density measuring circuitry at other times.

16. An image forming apparatus as recited in claim 15, wherein the image forming apparatus prints the predetermined mark on the sheet at a predetermined time.

17. A method of forming an image on an image forming apparatus comprising steps of:

printing out at least received image information by appropriately fixing a printing substance onto a sheet and printing a predetermined mark on the sheet;

measuring a density of said printing substance fixed on said sheet and producing a value of said printing substance's density by measuring a density of the predetermined mark provided on the sheet; and determining whether or not said value of said printing substance's density measured by and then obtained from said measuring step is lower than a predetermined value, said density measuring being enabled to be performed at a time when the predetermined mark is present at a predetermined position and being disabled at other times.

18. A method of forming an image as recited in claim 17, wherein the predetermined mark is printed on the sheet at a predetermined time.

19. An image forming apparatus comprising:

printing means for printing out at least received image information by appropriately fixing a printing substance onto a sheet and printing a predetermined mark on the sheet;

control means for detecting for a predetermined area on the sheet;

density measuring means for measuring a density of the printing substance fixed on the sheet and producing a value of the printing substance's density by measuring a density of the predetermined mark on the sheet at the predetermined area on the sheet, said control means enabling said density measuring means to measure density when said control means detects the predetermined area on the sheet and disabling said density measuring means at other times;

determining means for determining whether or not said value of said printing substance's density measured by and then obtained from said density measuring means is lower than a predetermined value.

20. An image forming apparatus comprising:

a printer for printing out at least received image information by appropriately fixing a printing substance onto a sheet and printing a predetermined mark on the sheet;

a controller for detecting for a predetermined area on the sheet;

density measuring circuitry provided adjacent the sheet and including a light receiving unit receiving light reflected from the sheet for measuring a density of the printing substance fixed on the sheet and producing a value of said printing substance's density by measuring a density of the predetermined mark on the sheet at the predetermined area on the sheet, said controller providing a control signal to said density measuring circuitry enabling said density measuring circuitry to measure density when said controller detects the predetermined area on the sheet and disabling said density measuring circuitry at other times;

a comparison unit connected with the density measuring circuitry for receiving the value of the printing substance's density and determining whether or not the value of the printing substance's density measured by and then obtained from said density measuring means is lower than a predetermined value.

21. An image forming method comprising:

printing out at least received image information by appropriately fixing a printing substance onto a sheet and printing a predetermined mark on the sheet;

detecting for a predetermined area on the sheet;

measuring a density of the printing substance fixed on the sheet and producing a value of the printing substance's density by measuring a density of the predetermined mark on the sheet at the predetermined area on the sheet, said density measuring being enabled to measure density when the predetermined area on the sheet is detected and disabled at all other times;

determining whether or not the value of the printing substance's density measured by and then obtained during said density measuring step is lower than a predetermined value.

* * * * *